(12) United States Patent
Watariguchi et al.

(10) Patent No.: US 9,921,499 B2
(45) Date of Patent: Mar. 20, 2018

(54) ELECTROPHOTOGRAPHIC PHOTOSENSITIVE MEMBER, PROCESS CARTRIDGE, ELECTROPHOTOGRAPHIC APPARATUS, AND PHTHALOCYANINE PIGMENT

(71) Applicant: CANON KABUSHIKI KAISHA, Tokyo (JP)

(72) Inventors: Kaname Watariguchi, Yokohama (JP); Shoma Hinata, Mishima (JP); Kazuko Sakuma, Suntou-gun (JP); Tsutomu Nishida, Mishima (JP); Jumpei Kuno, Yokohama (JP); Hirofumi Kumoi, Suntou-gun (JP); Masato Tanaka, Tagata-gun (JP); Masataka Kawahara, Mishima (JP); Yuto Ito, Koganei (JP); Isao Kawata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/334,884

(22) Filed: Oct. 26, 2016

(65) Prior Publication Data
US 2017/0123330 A1    May 4, 2017

(30) Foreign Application Priority Data

Oct. 28, 2015    (JP) .................................. 2015-212042

(51) Int. Cl.
*G03G 5/06*    (2006.01)
*C09B 47/04*    (2006.01)
(Continued)

(52) U.S. Cl.
CPC ........... *G03G 5/0696* (2013.01); *C09B 47/04* (2013.01); *C09B 47/045* (2013.01);
(Continued)

(58) Field of Classification Search
CPC .............. G03G 5/0696; C09B 67/0026; C09B 67/0023; C09B 47/045
See application file for complete search history.

(56) References Cited

U.S. PATENT DOCUMENTS

| 6,066,427 A * | 5/2000 | Black .................. C09B 67/0016 430/135 |
| 6,984,479 B2 * | 1/2006 | Yamazaki ............ G03G 5/0696 430/59.5 |

(Continued)

FOREIGN PATENT DOCUMENTS

| EP | 1426416 A1 * | 6/2004 | ......... C09B 67/0002 |
| JP | 7-319188 A | 12/1995 | |

(Continued)

OTHER PUBLICATIONS

Klofta, T.; Buttner, W.; Armstrong, N. "Effect of Crystallite Size and Hydrogen and Oxygen Uptake in the Photoelectrochemistries of Thin Films of Chlorogallium Phthalocyanine". J. Electrochem. Soc. (1986) vol. 133, issue 7, 1531-1532.*

(Continued)

*Primary Examiner* — Christopher D Rodee
(74) *Attorney, Agent, or Firm* — Canon U.S.A., Inc. IP Division

(57) ABSTRACT

An electrophotographic photosensitive member includes a substrate and a photosensitive layer containing a phthalocyanine pigment. The crystalline particles of the phthalocyanine pigment have a crystallite correlation length r and a particle size R of 400 nm or less, and a parameter k defined by r/R is in the range of 0.17 to 0.42.

8 Claims, 4 Drawing Sheets

(51) Int. Cl.
*C09B 67/50* (2006.01)
*C09B 47/067* (2006.01)
*C09B 67/00* (2006.01)

(52) U.S. Cl.
CPC ........ *C09B 47/067* (2013.01); *C09B 67/0023* (2013.01); *C09B 67/0026* (2013.01)

(56) References Cited

U.S. PATENT DOCUMENTS

| | | | | |
|---|---|---|---|---|
| 2004/0250734 | A1* | 12/2004 | Shiromaru | C09B 67/0026 540/122 |
| 2008/0009092 | A1* | 1/2008 | Koenemann | C09B 47/045 438/99 |
| 2010/0331460 | A1* | 12/2010 | Ootoshi | C09B 67/0002 106/412 |

FOREIGN PATENT DOCUMENTS

| | | |
|---|---|---|
| JP | 2000-147811 A | 5/2000 |
| JP | 2006-72304 A | 3/2006 |

OTHER PUBLICATIONS

Ofuji, M.; Ishikawa, K.; Takezoe, H.; Inaba, K.; Omote, K. "Crystallite size effect on the hole mobility of uniaxially aligned copper phthalocyanine thin-film field-effect transistors". Appl. Phys. Lett. (2005) 86, 062114.*
Hinch, G.; Haggquist, G. "Molecular Modeling Studies of Polymorphism in Titanyl Phthalocyanine". SPIE (1997) 3144, 16-25.*
Diamond, Arthur S (editor) Handbook of Imaging Materials. New York: Marcel-Dekker, Inc. (2002) pp. 145-164.*
Nakai, I. and Izumi, F., "Funmatsu X-sen kaiseki no jissai" (The Practice of Powder X-ray Analysis, in Japanese), Asakura Publishing Co., Ltd., pp. 63, 81, 82, 83, 84, 119, 120, 121, 122, 123, 140, 141, 142, and Table 14.1.

* cited by examiner

ELECTROPHOTOGRAPHIC PHOTOSENSITIVE MEMBER, PROCESS CARTRIDGE, ELECTROPHOTOGRAPHIC APPARATUS, AND PHTHALOCYANINE PIGMENT

BACKGROUND OF THE INVENTION

Field of the Invention

The present disclosure relates to an electrophotographic photosensitive member, a process cartridge, an electrophotographic apparatus, and a phthalocyanine pigment.

Description of the Related Art

Phthalocyanine pigments are superior in function as a photoconductor and are used as a material for electrophotographic photosensitive members, solar cells, sensors, switching elements, and the like. It has been known that phthalocyanine pigments exhibit different electrical properties, depending on the crystal form thereof, and also on the manufacturing process (which is different among treating methods, such as UV irradiation, pulverization, and using solvent, or among the synthesizing methods) even if the crystal form is the same.

Phthalocyanine pigments (particularly titanyl phthalocyanine and gallium phthalocyanine pigments) are highly sensitive to light in a wide range of wavelengths and are, accordingly, used as the charge generating material of the electrophotographic photosensitive member of electrophotographic apparatuses using a semiconductor laser capable of oscillation in a wide range of wavelengths from short wavelengths to long wavelengths as an image exposure device.

Unfortunately, in electrophotographic photosensitive members using a highly sensitive phthalocyanine pigment, photo carriers (holes and electrons) are likely to be retained in the photosensitive layer (charge generating layer) due to the high sensitivity of the phthalocyanine pigment. The retained photo carriers cause an undesired phenomenon of ghosting in output images. Ghosting may appear as positive ghosting or negative ghosting. The positive ghosting is a phenomenon that forms a portion having a higher image density only in an area of the output image irradiated with light when the electrophotographic photosensitive member has previously been rotated, and the negative ghosting is a phenomenon that forms a portion having a lower image density in that area.

Some approaches have been studied to reduce ghosting. Japanese Patent Laid-Open No. 2006-72304 discloses an electrophotographic photosensitive member adopting a technique in which a mixture of a phthalocyanine pigment, an organic electron accepter, and a specific solvent is pulverized in a wet process so that the organic electron accepter is taken into the surfaces of the phthalocyanine pigment particles and/or the vicinities of the surfaces while the crystal form of the phthalocyanine pigment is changed. This document states that the use of the electrophotographic photosensitive member reduces ghosting more effectively. According to other studies (Japanese Patent Laid-Open Nos. 7-319188 and 2000-147811), the particle size and crystal lattice distortion of phthalocyanine pigments used in electrophotographic photosensitive members can be controlled by varying the conditions of pulverizing or dispersing the pigment.

Japanese Patent Laid-Open Nos. 7-319188 discloses an electrophotographic photosensitive member including a photosensitive layer containing a binder resin and a titanyl phthalocyanine pigment dispersed in the binder resin. The titanyl phthalocyanine pigment exhibits a CuKα X-ray diffraction spectrum having the strongest peak at a Bragg angle 2θ of 26.3°±0.2° with a half-width of 0.4° or less. The charged potential of this electrophotographic photosensitive member is not much reduced even by repeated use, and thus the electrophotographic photosensitive member exhibits good electrical properties. The half-width depends on the manufacturing conditions, such as the time for pulverization or dispersion, the size and specific gravity of the pulverization or dispersion media used, such as beads or balls, and the rotational speed of the pulverization or dispersion mill, such as a ball mill. This cited document explains that this is because the crystal lattice of the titanyl phthalocyanine can be irregularly distorted by the stress placed thereon by pulverization or dispersion.

Japanese Patent Laid-Open No. 2000-147811 discloses an electrophotographic photosensitive member including a photosensitive layer containing a binder resin and particles of phthalocyanine-based compound as a charge generating material, dispersed in the binder resin and having an average particle size in the range of 0.3 μm to 2 μm. According to this cited document, the electrophotographic photosensitive member can prevent a memory phenomenon and a dot defect (black spot) and has a withstand voltage that photosensitive members should have. This cited document explains that the reason why the memory phenomenon does not occur is that phthalocyanine-based compound particles having an average particle size of 0.3 μm or more do not have many interfaces with the binder resin and accordingly reduce the probability that electrons will be trapped. Also, the document explains the reason of high withstand voltage and no dot defect as below: the binder resin imparts a required withstand voltage to the photosensitive layer, because the charge generating material having an average particle size of 2.0 μm or less has a certain conductivity and accordingly loses the effect of reducing the effective thickness of the photosensitive layer, and also because such a charge generating material easily causes charges to be locally concentrated and thus loses the effect of increasing the probability of electrical breakdown.

SUMMARY OF THE INVENTION

According to an aspect of the present disclosure, there is provided an electrophotographic photosensitive member including a substrate and a photosensitive layer containing a phthalocyanine pigment including crystalline particles. The crystalline particles have a crystallite correlation length r and a crystalline particle size R of 400 nm or less, and a parameter k defined by r/R is in the range of 0.17 to 0.42.

Further features of the present disclosure will become apparent from the following description of exemplary embodiments with reference to the attached drawings.

DESCRIPTION OF THE EMBODIMENTS

Phthalocyanine pigments have been improved in a variety of ways for use as a charge generating material in electrophotographic photosensitive members.

Now, it is required of electrophotographic photosensitive members to reduce the occurrence of ghosting in a variety of environments and conditions while maintaining the chargeability thereof, for higher image property and higher-speed image formation. According to a study of the present inventors, the electrophotographic photosensitive member disclosed in No. 2006-72304 cannot sufficiently reduce ghosting under severe environments such as low-temperature low-humidity environments or in repeated use for a long time.

In the electrophotographic photosensitive members containing the phthalocyanine pigment disclosed in disclosed in the above-cited Japanese Patent Laid-Open Nos. 7-319188 or the phthalocyanine-based compound (metal-free phthalocyanine or titanyl phthalocyanine) disclosed in Japanese Patent Laid-Open No. 2000-147811, ghosting is not sufficiently reduced and the chargeability is not sufficiently maintained.

Accordingly, the present disclosure provides an electrophotographic photosensitive member capable of reducing ghosting while maintaining a required chargeability even when it is used under low-temperature low-humidity environments or is repeatedly used for a long time, and a process cartridge and an electrophotographic apparatus each including the electrophotographic photosensitive member. The present disclosure also provides a phthalocyanine pigment having a superior function as a photoconductor.

The subject matter of the present disclosure will be described in detail in exemplary embodiments. The present inventors have conducted a research for further improving the function as a photoconductor of the phthalocyanine pigment and further enhancing the advantageous effect of the phthalocyanine pigment used as the charge generating material in an electrophotographic photosensitive member to reduce ghosting. Details will now be described.

Figure 1:
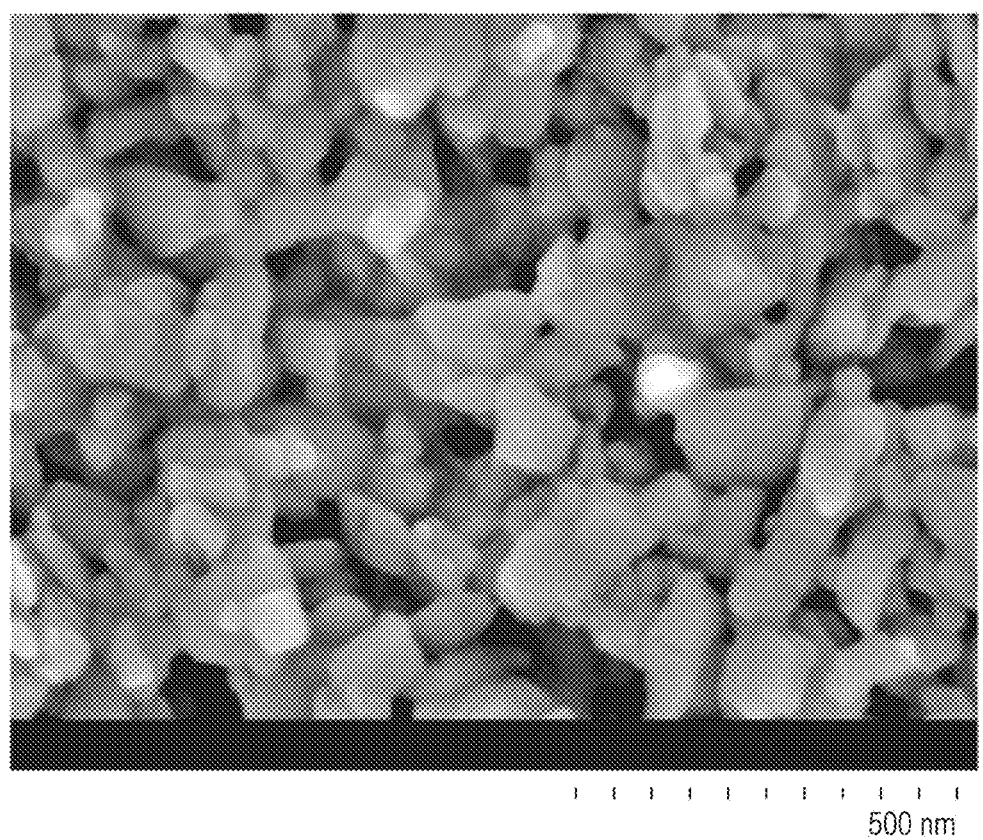
FIG. 1 is an SEM micrograph of the hydroxygallium phthalocyanine pigment produced in Example 43.

First, the terms "crystalline particle" and "crystallite correlation length" mentioned herein will be described. The "crystalline particle" of a phthalocyanine pigment mentioned herein refers to a primary particle of aggregates of molecules of a phthalocyanine pigment. FIG. 1 shows a scanning electron microscope (SEM) image of a phthalocyanine pigment. Each of the lumps shown in FIG. 1 is a crystalline particle. The term "crystalline particle size R" mentioned herein, which will be described in detail later, refers to the volume average particle size in the particle size distribution of the phthalocyanine pigment.

The term "crystallite correlation length" of a phthalocyanine pigment mentioned herein refers to the size of the portion of a particle of the phthalocyanine crystals that is considered to be a phthalocyanine single crystal. The crystallite correlation length depends on the crystal distortion defined as local irregularity in distance between crystal planes or orientation of crystal planes, and on the size of a crystallite defined as a portion that has a local irregularity but does not vary in distance between crystal planes or orientation of crystal planes in a broad regional sense (reference: Nakai, I, & Izumi, F. "Funmatsu X-sen kaiseki no jissai" (The Practice of Powder X-ray Analysis, in Japanese), p. 63, Asakura Publishing Co., Ltd.) Crystal distortion and crystallites cannot be recognized from the SEM micrograph shown in FIG. 1. In the present disclosure, the value "r" calculated from CuKα X-ray diffraction spectra of a phthalocyanine pigment by using the Scherrer equation is considered to be the "crystallite correlation length" of the phthalocyanine pigment. Details of this will be describe later.

As mentioned above, one of the causes of ghosting resulting from the electrophotographic photosensitive member is retention of photo carriers (holes and electrons) in the photosensitive layer (charge generating layer). The present inventors found through their study that photo carriers can retain in portions having a crystal distortion of the crystalline particles of the phthalocyanine pigment and in the interfaces between crystallites forming the crystalline particles. Hence, by reducing the numbers per unit volume of crystal distortions and interfaces between crystallites, ghosting can be reduced more effectively. That is, the phthalocyanine pigment can efficiently function as a photoconductor. The inventors also found that if the numbers per unit volume of crystal distortions and interfaces between crystallites are excessively reduced, the electrical resistance of the crystalline particles decreases to the extent that the resulting electrophotographic photosensitive member cannot have a required chargeability.

The present inventors further found through experiments based on the above findings that a phthalocyanine pigment capable of efficiently functioning as a photoconductor can be obtained by controlling parameter k defined by (crystallite correlation length r)/(crystalline particle size R), which has high correlations with the numbers per unit volume of crystal distortions and interfaces between crystallites, in the range of 0.17 to 0.42. More specifically, it was found that an electrophotographic photosensitive member capable of reducing ghosting very effectively while maintaining chargeability can be produced by using a phthalocyanine pigment having a parameter k value in the range of 0.17 to 0.42 as a charge generating material.

The parameter k defined by (crystallite correlation length r)/(crystalline particle size R) will be described below. As the numbers of crystal distortions and interfaces between crystallites are increased, the crystallite correlation length decreases. Hence, the lower the parameter k, the larger the numbers per unit volume of crystalline distortions and interfaces between crystallites. Thus, parameter k has high correlations with the numbers per unit volume of crystalline distortions in crystalline particles and interfaces between crystallites.

The present inventors found through their experiments that it is necessary to control parameter k in the range of 0.17 to 0.42 in order to produce the characteristic features of the present disclosure effectively. When k is lower than 0.17, the numbers of crystalline distortions and interfaces between crystallites increase. Accordingly, photo carriers retained in the crystalline distortions and the interfaces between crystallites increase to the extent that ghosting will occur in the resulting images. In contrast, when k is higher than 0.42, the electrical resistance of the crystalline particles decreases to the extent that the resulting electrophotographic photosensitive member cannot have a required chargeability, as described above. In addition, when k is higher than 0.42, the numbers of crystal distortions in the crystalline particles and interfaces between crystallites decrease. Accordingly, the crystalline particles become similar to single crystals; hence, the probability increases that the electrical conditions at the surfaces of the adjacent crystalline particles become similar to each other. Consequently, the crystalline particles are likely to aggregate and cause charges to concentrate, and thus the chargeability of the resulting electrophotographic photosensitive member can decrease.

The present inventors further found that if the crystalline particle size R is excessively large, charge concentration is easy to occur even when parameter k is in the range of 0.17 to 0.42, and that consequently, the chargeability of the resulting electrophotographic photosensitive member decreases. According to the experimental results of the present inventors, when R is larger than 400 nm, charges will concentrate to the extent that the resulting electrophotographic photosensitive member cannot have a required chargeability.

Thus, a phthalocyanine pigment satisfying both the requirements that parameter k defined by (crystallite correlation length r)/(crystalline particle size R) is in the range of 0.17 to 0.42 and that the crystalline particle size R is 400 nm or less can efficiently function as a photoconductor, and an electrophotographic photosensitive member containing such a phthalocyanine pigment as a charge generating material can reduce the occurrence of ghosting effectively while maintaining chargeability.

Phthalocyanine Pigment

As described above, the phthalocyanine pigment of the present disclosure has a crystalline particle size R of 400 nm and a crystallite correlation length r, and parameter k defined by r/R is in the range of 0.17 to 0.42.

The "crystalline particle size R", or the particle size of the crystals of the phthalocyanine pigment, is the volume average particle size in the particle size distribution. The particle size distribution of the phthalocyanine pigment can be determined by a method capable of measuring the primary particle size of crystals, such as dynamic light scattering, laser diffraction, gravitational sedimentation, ultrasonic attenuation, or imaging, if the primary particle size of the crystals can be measured. In Examples of the present disclosure, the particle size distribution of phthalocyanine pigment crystals was determined by SEM imaging.

More specifically, 10,000 or more crystalline particles are selected from the SEM micrograph of each sample of the phthalocyanine pigment with an image processing software program Photoshop (produced by Adobe). Subsequently, the area S of each crystalline particle was measured, and the diameter of a circle having the same area as area S, that is, $2 \times (S/\pi)^{1/2}$, is defined as the crystalline particle size $R_i$ of the corresponding crystalline particle.

Alternatively, the crystalline particle size $R_i$ may be calculated by using an electrophotographic photosensitive member containing the phthalocyanine pigment. In this case, the following operation is applied. First, the electrophotographic photosensitive member is processed so that the layer (photosensitive layer or charge generating layer) containing the phthalocyanine pigment can be exposed to the surrounding environment. For example, the layer(s) overlying the layer containing the phthalocyanine pigment is removed with by using a solvent. Then, the surface of the layer containing the phthalocyanine pigment is equally divided into 10 segments in the peripheral direction of the photosensitive member and into 25 segments in the axial direction of the photosensitive member. A randomly selected point in each of the 250 segments thus divided is observed by SEM (the magnification in FIG. 1 is 100 thousand times). Thus, crystalline particles are selected from the segments (40 or more particles from each segment, 10,000 or more particles in total), and the particle size $R_i$ of each crystalline particle is calculated as described above.

The particle size distribution is determined based on the crystalline particle sizes $R_i$ thus calculated (total number of particles N≥10,000), and the volume average particle size in the distribution is calculated as crystalline particle size R. More specifically, the crystalline particle size R of crystalline particles i (i=1, 2, 3, . . . , N) each having a diameter $R_i$ (nm) is calculated by using the following equation:

$$R = \frac{\sum_{i=1}^{N} R_i^4}{\sum_{i=1}^{N} R_i^3}$$

The crystallite correlation length r of a phthalocyanine pigment is a value calculated from the CuKα X-ray diffraction spectrum of the phthalocyanine pigment by using the Scherrer equation. How to calculate the crystallite correlation length r will be described in detail below.

The Scherrer equation is expressed by:

$$\tau = \frac{K\lambda}{\beta \cos\theta}$$

where: K represents Scherrer constant (shape factor); λ represents the X-ray wavelength (nm) (in the case of CuKα X-ray diffraction, λ=0.154 nm); β represents the integral breadth (in radians); and θ represents the Bragg angle.

Figure 2:
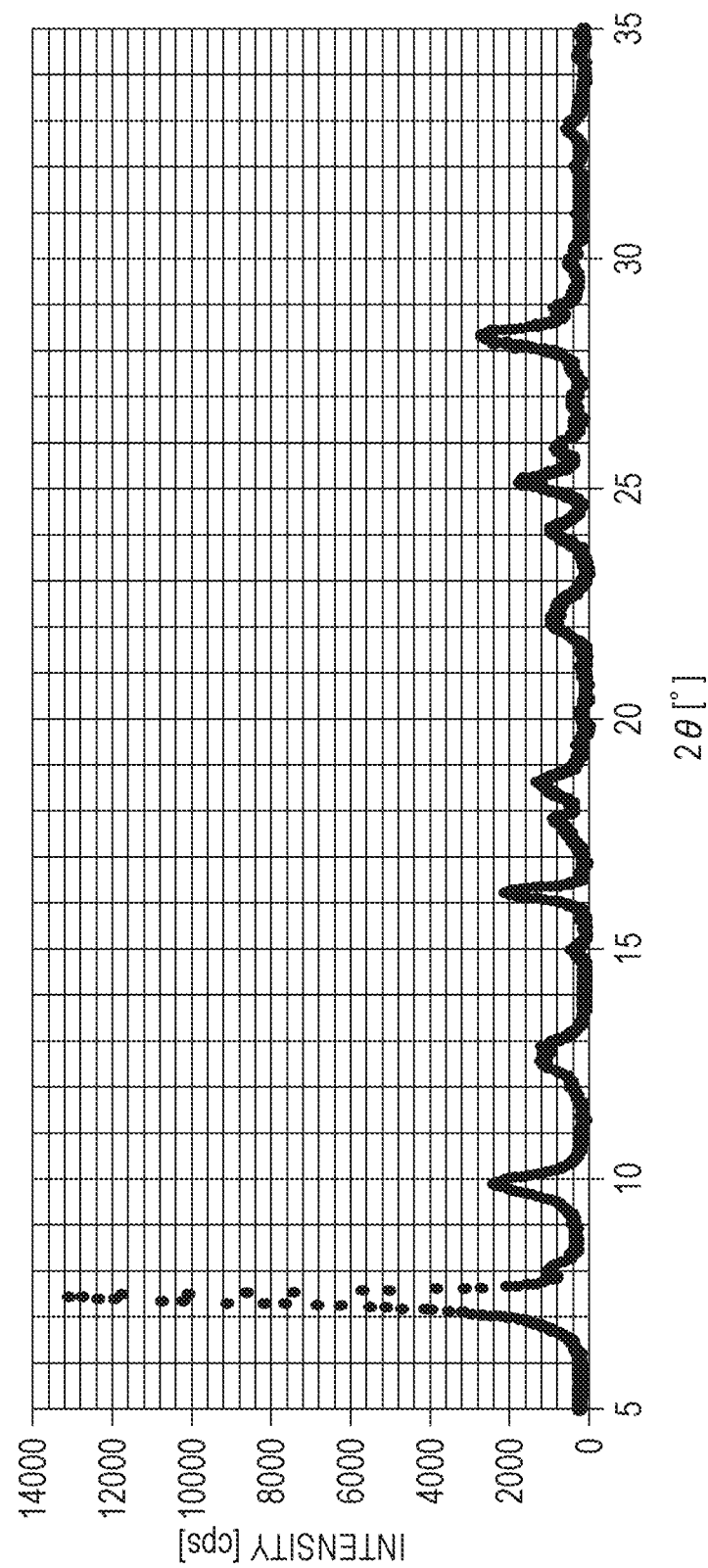
FIG. 2 is a CuKα X-ray diffraction spectrum of the hydroxygallium phthalocyanine pigment produced in Example 43.

The Bragg angle θ in this equation is the angle at which the CuKα X-ray diffraction spectrum of the phthalocyanine pigment exhibits the peak having the highest intensity. In general, the Bragg angle producing such a peak lies at 2θ in the range of 5° to 35° in X-ray spectra. In FIG. 2, for example, the Bragg angle showing the peak having the highest intensity lies around 2θ=7.5°. The integral breadth β is a value obtained by correcting the quotient of the peak area at the Bragg angle θ (represented as 2θ in X-ray diffraction spectra) divided by the peak height, using the reference material and correction formula described below. The positions, areas and heights of peaks can be determined by using profile parameters obtained by fitting with a profile function of the X-ray diffraction spectrum appropriately processed by, for example, eliminating the baseline. The profile functions that can be used here include Gaussian function, Lorentz function, Pearson VII function, Voigt function, pseudo-Voigt function, and functions asymmetric with respect to these functions (reference: Nakai, I, & Izumi, F. "Funmatsu X-sen kaiseki no jissai" (The Practice of Powder X-ray Analysis, in Japanese), pp. 120-123, Asakura Publishing Co., Ltd.)

In the Examples of the present disclosure, a pseudo-Voigt function was used as the profile function. Also, lanthanum boride $LaB_6$ (NIST 660b) was used as the reference material, and the peak at 2θ=21.3° was used as the reference profile. At this time, the integral breadth was corrected as below (reference: Nakai, I, & Izumi, F. "Funmatsu X-sen kaiseki no jissai" (The Practice of Powder X-ray Analysis, in Japanese), pp. 83-84 and 254, Asakura Publishing Co., Ltd.)

For each sample, Gaussian function components $X_{Pc,G}$ and $X_{ref,G}$ and Lorenz function components $X_{Pc,L}$ and $X_{ref,L}$ of the half-width of the pseudo-Voigt function are determined using the fitted parameters obtained by the profile fitting of the X-ray diffraction peaks of the phthalocyanine pigment and the reference material.

Subsequently, the Gaussian function components and Lorenz function components of the half-width are corrected by using the following equation:

$$X_G = \sqrt{X_{Pc,G}^2 - X_{ref,G}^2}$$

$$X_L = X_{Pc,L} - X_{ref,L}$$

Then, the corrected half-width X of the pseudo-Voigt function X and shape parameter η are calculated by using the following equations:

$$X = \left(X_G^5 + 2.69269 X_G^4 X_L + 2.42843 X_G^3 X_L^2 + 4.47163 X_G^2 X_L^3 + 0.07842 X_G X_L^4 + X_L^5\right)^{1/5}$$

$$\eta = 1.36603 \frac{X_L}{X} - 0.47719 \left(\frac{X_L}{X}\right)^2 + 0.1116 \left(\frac{X_L}{X}\right)^3$$

In Example 4 in the present disclosure, for example, the shape parameter η was 0.76. This suggests that the pseudo-Voigt function that is the profile function is closer to the Lorenz function than the Gaussian function. In the case where the profile function is a Gaussian function, the half-width is corrected by using the following equation:

$$X_G = \sqrt{X_{Pc,G}^2 - X_{ref,G}^2}$$

In the case where the profile function is a Lorenz function, the half-width should be corrected by using the following equation:

$$X_L = X_{Pc,L} - X_{ref,L}$$

In the present disclosure, the corrected value of the half-width lies between these two corrections, and the balance therebetween is determined by shape parameter 1.

Finally, the corrected integral breadth is calculated by using the following equation:

$$\beta = \frac{\pi X}{2\left[\sqrt{\pi \ln 2}\,(1-\eta) + \eta\right]}$$

Thus, the integral breadth of the sample itself is obtained from which the integral breadth derived from the apparatus has been eliminated by use of a reference material. Thus, the value τ calculated by using the Scherrer equation with Scherrer constant K=1 represents the "volume-weighted average thickness" (reference: Nakai, I, & Izumi, F. "Funmatsu X-sen kaiseki no jissai" (The Practice of Powder X-ray Analysis, in Japanese), pp. 81-82, Asakura Publishing Co., Ltd.). In the present disclosure, this value is defined as "crystallite correlation length r".

As described above, the crystalline particle size R and the crystallite correlation length r are each the average value in terms of volume. This is because it is thought that the amount of photo carriers generated per crystalline particle, concerning the occurrence of ghosting is proportional to the volume of the crystalline particle.

The CuKα X-ray diffraction spectra of phthalocyanine pigments can be obtained by characteristic powder X-ray diffraction. In order to eliminate the influence of preferred orientation on the measurement, Boro-Silicate capillary (70 mm in length, 0.01 mm in thickness, 0.7 mm in inner diameter, manufactured W. Muller) was used as the capillary (reference: Nakai, I, & Izumi, F. "Funmatsu X-sen kaiseki no jissai" (The Practice of Powder X-ray Analysis, in Japanese), pp. 119 and 140-142, Asakura Publishing Co., Ltd.) The phthalocyanine pigment is thus subjected to characteristic powder X-ray diffraction analysis in the capillary. Also, the capillary empty of the sample is subjected to the X-ray diffraction analysis in the same manner for background data.

In the present embodiment, desirably, the volume frequency v of occurrence of crystalline particles having a particle size $R_i$ in the range of 60 nm to 200 nm is 80% or more. More specifically, the volume frequency is determined by dividing the total volume of crystalline particles having a particle size in the range of 60 nm to 200 nm in the particle size distribution by the total volume of all the crystalline particles, as expressed by the following equation:

$$v = \frac{\Sigma_{60 \le Ri \le 200} R_i^3}{\Sigma_{i=1}^N R_i^3}$$

If the ratio of optical sensitivity to optical memory (S/N ratio) is reduced when the effect of reducing the occurrence of ghosting is examined with exposure to the electrophotographic photosensitive member at a constant potential, the effect is reduced. If the number of crystalline particles having a small particle size $R_i$ is increased, the crystallite correlation length of the crystals in the particles is inevitably reduced, and accordingly, optical sensitivity is reduced. If the number of crystalline particles having a large particle size $R_i$ is increased, the frequency of the encounters of carriers moving in the crystalline particles with a crystalline distortion or an interface between crystallites increases. In addition, the sensitivity is not improved as much as the increase of such trap sites because the distance that excitons can diffuse and the rate of excitation light absorbed by the crystalline particles are limited. Accordingly, the S/N ratio is reduced. Hence, as the number of crystalline particles having an excessively large size $R_i$ or having an excessively small size $R_i$ becomes smaller, decrease in S/N ratio is suppressed more effectively, and ghosting is reduced more effectively. The present inventors found from the results of their experiments that when the particle sizes $R_i$ of the crystalline particles whose volume frequency of occurrence is 80% or more are in the range of 60 nm to 200 nm, ghosting can be reduced still more effectively.

For producing a phthalocyanine pigment having parameters satisfying the requirements of the present disclosure, that is, a phthalocyanine pigment having a parameter k defined by r/R in the range of 0.17 to 0.42 and a crystalline particle size R of 400 nm or less, a specific pulverizing force (such as compressive force, impulsive force, frictional force, or shear force) may be applied for crystal transformation over a specific period of time by milling. The milling operation performed for producing such a phthalocyanine pigment is a treatment performed by using a milling machine such as a sand mill or a ball mill, containing or not containing a dispersing aid or dispersing media, such as glass beads, steal beads, or alumina balls. If the milling operation is performed at a reduced pulverizing force, stirring with a magnetic stirrer or ultrasonic dispersion may be applied as the milling operation. Two or more milling methods may be combined.

The present inventors found through their researches that the two-step milling operation of applying a strong pulverizing force in the early stage of crystal transformation and then applying a weak pulverizing force for a long time enables the phthalocyanine pigment of the present disclosure to be efficiently produced while facilitating the control of the crystal transformation. The present inventors think that the reason why the two-step milling operation is suitable for producing the phthalocyanine pigment is as below.

Crystal transformation consists of the early stage in which the crystals of crystalline particles are transformed throughout the pigment, and the later stage in which the crystalline particle size and the crystallite correlation length are varied while the crystals are being slightly transformed. The phthalocyanine pigment of the present disclosure has a smaller crystalline particle size and a larger crystallite correlation length than known phthalocyanine pigments. In general, however, it is difficult to apply a pulverizing force by which those two characteristic features can be satisfied in the first-stage crystal transformation. A high pulverizing force must be applied in order to reduce the crystalline particle size, whereas a low pulverizing force must be applied in order to increase the crystallite correlation length. In the above-described two-step milling operation, however, the crystalline particle size is sufficiently reduced in the early stage of the crystal transformation. Then, in the later stage, the crystalline particle size is further reduced even by a low pulverizing force and the crystallite correlation length can be slowly grown. Thus, the phthalocyanine pigment of the present disclosure has both of the above-described two characteristic features. As is clear from this mechanism, if the magnitudes of the pulverizing forces are reversed in the two-step milling operation, that is, if a low pulverizing force is applied in the early stage of the crystal transformation and then a high pulverizing force is applied for a long time, the phthalocyanine pigment of the present disclosure cannot be obtained. It is important to reduce the crystalline particle size in the early stage in which the crystals of the crystalline particles are transformed throughout the pigment. Therefore, a two-step milling operation where the early stage proceeds in a dry process without using a solvent required for crystal transformation cannot produce the phthalocyanine pigment of the present disclosure.

Electrophotographic Photosensitive Member

Figure 3:
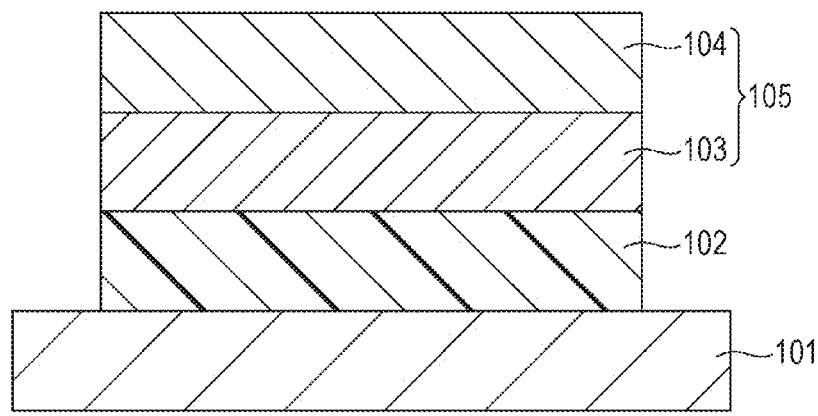
FIG. 3 is the multilayer structure of an electrophotographic photosensitive member according to an embodiment of the present disclosure.

The electrophotographic photosensitive member according to an embodiment of the present disclosure includes a support member and a photosensitive layer over the support member. FIG. 3 is an illustrative representation of the multilayer structure of an electrophotographic photosensitive member. The electrophotographic photosensitive member shown in FIG. 3 includes a support member 101, an undercoat layer 102, and a photosensitive layer (multilayer photosensitive layer) 105 including a charge generating layer 103 and a charge transport layer 104. In an embodiment of the present disclosure, the undercoat layer 102 may be omitted, and the photosensitive layer 105 may be composed of a single layer without being divided into the charge generating layer 103 and the charge transport layer 104.

Support Member

The support member is desirably electrically conductive (electroconductive support member), and may be made of a metal, such as aluminum, iron, copper, gold, stainless steel, nickel, or an alloy thereof. An insulating support member provided with an electroconductive coating film over the surface thereof may be used. The insulating support member may be made of a plastic, such as a polyester resin, a polycarbonate resin, or a polyimide resin, or glass or paper. The electroconductive coating film may be a metal thin film made of, for example, aluminum, chromium, silver, or gold, a thin film of any other electroconductive material such as indium oxide, tin oxide, or zinc oxide, or a thin film of an electroconductive ink containing silver nanowires.

The support member may be in the form of a cylinder, a film, or the like. In particular, a cylindrical aluminum support member is superior in mechanical strength, electrophotographic properties, and cost. A plain pipe may be used as it is the support member, or the surface of the plain pipe may be subjected to a physical treatment such as cutting, honing, or blast, anodization, or a chemical treatment with, for example, an acid, for improving the electrical characteristics or reducing interference fringes. A plain pipe support member treated so as to have a ten-point surface roughness Rzjis, specified in JIS B0601: 2001, of 0.8 µm or more by physical treatment, such as cutting, honing, or blast, can reduce interference fringes effectively.

Electroconductive Layer

The electrophotographic photosensitive member may optionally include an electroconductive layer between the support member and the photosensitive layer to cover the roughness of or defects in the support member or reduce interference fringes. Particularly in the case of using a plain pipe as the support member, forming the electroconductive layer is a simple way to reduce interference fringes. This is very advantageous in productivity and cost efficiency.

The electroconductive layer can be formed by applying a coating liquid prepared by dispersing electroconductive particles and a binder resin in a solvent to form a coating film and drying the coating film. For preparing the dispersion, for example, a paint shaker, a sand mill, a ball mill, or a high-speed liquid collision disperser may be used.

Examples of the electroconductive particles include carbon black, acetylene black, powder of metal such as aluminum, nickel, iron, Nichrome, copper, zinc or silver, and powder of a metal compound such as tin oxide, indium oxide, titanium oxide, or barium sulfate. The binder resin may be a polyester resin, a polycarbonate resin, a polyvinyl butyral resin, an acrylic resin, a silicone resin, an epoxy resin, a melamine resin, a urethane resin, a phenol resin, or an alkyd resin. Examples of the solvent of the coating liquid include ethers, such as tetrahydrofuran, dioxane, ethylene glycol monomethyl ether, and propylene glycol monomethyl ether; alcohols, such as methanol, ethanol, and isopropanol; ketones, such as acetone, methyl ethyl ketone, and cyclohexanone; esters, such as methyl acetate and ethyl acetate; and aromatic hydrocarbons, such as toluene and xylene. The coating liquid for the electroconductive layer may further contain roughing particles.

The thickness of the electroconductive layer is desirably in the range of 5 µm to 40 µm, such as in the range of 10 µm to 30 µm, from the viewpoint of reducing interference fringes and covering the defects in the surface of the support member.

Undercoat Layer

An undercoat layer acting as a barrier or an adhesive may optionally be disposed on the support member or the electroconductive layer. The undercoat layer can be formed by applying a coating liquid prepared by dissolving a resin in a solvent to form a coating film and drying the coating film.

Examples of the resin as the material of the undercoat layer include acrylic resin, allyl resin, alkyd resin, ethyl cellulose resin, methyl cellulose resin, ethylene-acrylic acid copolymer, epoxy resin, casein resin, silicone resin, gelatin resin, phenol resin, butyral resin, polyacrylate resin, polyacetal resin, polyamide-imide resin, polyamide resin, polyallyl ether resin, polyimide resin, polyurethane resin, polyester resin, polyethylene resin, polyethylene oxide resin, polycarbonate resin, polystyrene resin, polysulfone resin, polyvinyl alcohol resin, polybutadiene resin, polypropylene resin, urea resin, agarose resin, and cellulose resin. Among these, polyamide resin is advantageous for acting as a barrier or an adhesive.

The thickness of the undercoat layer may be in the range of 0.3 μm to 5 μm. The undercoat layer may have the commutation function of causing photo carriers to flow to the support member. In the case of a negative charging type, the undercoat layer is an electron transport film containing an electron transporting material and acts so that electrons flow to the support member from the photosensitive layer. More specifically, the undercoat layer may be defined by a cured film formed by curing an electron transporting material or a composition containing an electron transporting material, a film formed by drying a coating film of a coating liquid prepared by dissolving an electron transporting material, or a film containing an electron transporting pigment. Advantageously, the undercoat layer is a cured film from the viewpoint of preventing the elution of the electron transporting material to the charge generating layer. Desirably, the cured film is formed by curing the composition further containing a crosslinking agent. More desirably, the composition contains a crosslinking agent and a resin. Advantageously, the electron transporting material and the resin in the cured film are an electron transporting compound having a polymerizable functional group and a resin having a polymerizable functional group, respectively. Examples of the polymerizable functional group include hydroxy, thiol, amino, carboxy, and methoxy. The crosslinking agent may be a compound polymerizable or crosslinkable with one or both of the electron transporting compound having a polymerizable functional group and the resin having a polymerizable functional group.

Photosensitive Layer

The photosensitive layer, which contains the phthalocyanine pigment of an embodiment of the present disclosure as a charge generating material, is disposed on the support member, the electroconductive layer, or the undercoat layer. The photosensitive layer contains a charge transporting material so as to transport photo carriers generated from the charge generating material to the surface thereof or the support member.

Examples of the charge transporting material include triarylamine compounds, hydrazone compounds, stilbene compounds, pyrazoline compounds, oxazole compounds, thiazole compounds, and triallylmethane compounds. The charge transporting material may be a polymer having a group derived from these compounds in the main chain or a side chain thereof. Triarylamine compounds, styryl compounds, and benzidine compounds are advantageous as the charge transporting material, and triarylamine compounds are more advantageous. Charge transporting materials may be used singly or in combination.

If the photosensitive layer is defined by a single layer, the single-layer photosensitive layer is formed by applying a coating liquid prepared by dispersing the phthalocyanine pigment as a charge generating material, a charge transporting material, and a binder resin in a solvent to form a coating film and drying the coating film. For dispersing the materials, a disperser may be used, such as a sand mill, a ball mill or any other media disperser, a liquid collision disperser, or an ultrasonic disperser.

Examples of the binder resin used in the photosensitive layer include polyvinyl butyral resin, polycarbonate resin, polyester resin, polyvinyl acetal resin, acrylic resin, polyvinyl acetate resin, and urea resin. The binder resin may be composed of a single resin, or may be a mixture or a copolymer of two or more resins.

The solvent used in the coating liquid for forming the photosensitive layer may be an alcohol-based solvent, a sulfoxide-based solvent, a ketone-based solvent, an ether-based solvent, an ester-based solvent, or an aromatic hydrocarbon-based solvent. These solvents may be used singly or in combination.

If the photosensitive layer is defined by a single layer, the charge generating material content is desirably in the range of 3% by mass to 30% by mass relative to the total mass of the photosensitive layer. Also, the charge transporting material content is desirably in the range of 30% by mass to 70% by mass relative to the total mass of the photosensitive layer. The thickness of the single-layer photosensitive layer is desirably in the range of 5 μm to 40 μm, such as in the range of 10 μm to 30 μm.

Charge Generating Layer

If the photosensitive layer has a multilayer structure, the charge generating layer of the multilayer photosensitive layer is formed by applying a coating liquid prepared by dispersing the phthalocyanine pigment as a charge generating material and a binder resin in a solvent to form a coating film and drying the coating film.

The coating liquid for forming the charge generating layer may be prepared by dispersing only the charge generating material in a solvent and then adding a binder resin to the dispersion, or by dispersing the charge generating material and the binder resin together in the solvent.

For dispersing the materials, a disperser may be used, such as a sand mill, a ball mill or any other media disperser, a liquid collision disperser, or an ultrasonic disperser. Incidentally, the charge generating layer of the electrophotographic photosensitive member formed in each Example or Comparative Example was removed and pulverized into a powder, and the powder was dispersed using ultrasonic waves and subjected to powder X-ray diffraction analysis to estimate the crystallite correlation length. This crystallite correlation length was compared with the crystallite correlation length of the phthalocyanine pigment subjected to milling operation measured by power X-ray diffraction analysis before dispersing operation for preparing the coating liquid. Thus, it has been confirmed that the dispersing operation for preparing the coating liquid performed in Examples and Comparative Examples does not vary the crystallite correlation length of the phthalocyanine pigment of the present disclosure, except for the dispersion operation in Comparative Examples 67 and 68.

Examples of the binder resin used in the charge generating layer are insulating resins including polyvinyl butyral resin, polyvinyl acetal resin, polyarylate resin, polycarbonate resin, polyester resin, polyvinyl acetate resin, polysulfone resin, polystyrene resin, phenoxy resin, acrylic resin, polyacrylamide resin, polyvinyl pyridine resin, urethane resin, epoxy resin, agarose resin, cellulose resin, casein resin, polyvinyl alcohol resin, polyvinylpyrrolidone resin, polyvinylidene chloride resin, acrylonitrile copolymers, and polyvinyl benzal resin. Organic photoconductive polymers may also be used, such as poly-N-vinyl carbazol, polyvinyl anthracene, and polyvinyl pyrene. The binder resin may be composed of a single resin, or may be a mixture or a copolymer of two or more resins.

Examples of the solvent used in the coating liquid for forming the charge generating layer include toluene, xylene, tetralin, chlorobenzene, dichloromethane, chloroform, trichloroethylene, tetrachloroethylene, carbon tetrachloride, methyl acetate, ethyl acetate, propyl acetate, methyl formate, ethyl formate, acetone, methyl ethyl ketone, cyclohexanone, diethyl ether, dipropyl ether, propylene glycol monomethyl ether, dioxane, methylal, tetrahydrofuran, water, methanol, ethanol, n-propanol, isopropanol, butanol, methyl cellosolve, methoxypropanol, dimethylformamide, dimethylacetamide, and dimethyl sulfoxide. These solvents may be used singly or in combination.

The charge generating material content in the charge generating layer is desirably in the range of 30% by mass to 90% by mass, such as in the range of 50% by mass to 80% by mass, relative to the total mass of the charge generating layer.

The thickness of the charge generating layer may be in the range of 0.05 μm to 5 μm.

Phthalocyanine Pigment

The phthalocyanine pigment used as the charge generating material, which may a metal-free phthalocyanine or a metal phthalocyanine, may have a substituent or axial ligands. Titanyl phthalocyanine and gallium phthalocyanine are highly sensitive phthalocyanine pigments, but are likely to cause ghosting; hence, they are suitable for embodying the principles of the present disclosure for reducing the occurrence of ghosting.

Advantageously, the phthalocyanine pigment is a hydroxygallium phthalocyanine pigment including crystalline particles exhibiting peaks at Bragg angles 2θ of 7.4°±0.3° and 28.2°±0.3° in the CuKα X-ray diffraction spectrum thereof, or a chlorogallium phthalocyanine pigment including crystalline particles exhibiting peaks at Bragg angles 2θ of 7.4°±0.2°, 16.6°±0.2°, 25.5°±0.2°, and 28.3°±0.2° in the CuKα X-ray diffraction spectrum thereof. A titanyl phthalocyanine pigment is also advantageously used which includes crystalline particles exhibiting peaks at Bragg angles 2θ of 27.2°±0.2° in the CuKα X-ray diffraction spectrum thereof. Among these, the hydroxygallium phthalocyanine pigment is particularly advantageous.

More advantageously, the crystalline particles of the phthalocyanine pigment contain an amide compound represented by the following formula (A1):

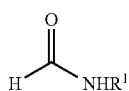

(A1)

where $R^1$ represents a methyl group, a propyl group, or a vinyl group.

Examples of the amide compound of formula (A1) include N-methylformamide, N-propylformamide, and N-vinylformamide.

The content of the amide compound of formula (A1) in the crystalline particles may be in the range of 0.1% by mass to 3.0% by mass relative to the mass of the crystalline particles and is desirably in the range of 0.1% by mass to 1.4% by mass. When the amide compound content is in the range of 0.1% by mass to 3.0% by mass, the size of the crystalline particles is not excessively reduced and the standard deviation of the particle size distribution is reduced. Accordingly, when parameter k and the amide compound content satisfy the above requirements, the volume frequency v of occurrence of the crystalline particles having a particle size in the range of 60 nm to 200 nm exceeds 85% even if crystalline particles are produced by a known pulverization or dispersion process performed under the conditions resulting in a crystalline particle size distribution in which the volume frequency v of those particles is about 80%. Furthermore, when the amide compound content is in the range of 0.1% by mass to 1.4% by mass, the volume frequency v exceeds 90%.

The hydroxygallium phthalocyanine pigment containing the amide compound of formula (A1) in the crystalline particles is produced in a process of crystal transformation performed by wet milling of a hydroxygallium phthalocyanine pigment produced by acid pasting and the amide compound of formula (A1).

If a dispersant is used for this wet milling, the mass of the dispersant is desirably 10 to 50 times that of the phthalocyanine pigment. Also, the solvent used for the wet milling may be an amide-based solvent, such as N,N-dimethylformamide, N,N-dimethylacetamide, a compound represented by formula (A1), N-methylacetamide, or N-methylpropionamide; a halogen-based solvent, such as chloroform; an ether-based solvent, such as tetrahydrofuran; or a sulfoxide-based solvent, such as dimethyl sulfoxide. The mass of the solvent to be used is desirably 5 to 30 times that of the phthalocyanine pigment.

The present inventors found that if a compound represented by formula (A1) is used as the solvent in the process of crystal transformation for producing the hydroxygallium phthalocyanine pigment including crystalline particles exhibiting peaks at Bragg angles 2θ of 7.4°±0.3° and 28.2°±0.3° in the CuKα X-ray diffraction spectrum, it takes a long time to transform the crystals of the pigment. For example, the time for the crystal transformation in the case of using N-methylformamide as the solvent is several times as long as that in the case of using N,N-dimethylformamide. Since the crystal transformation takes a long time, a time is given to reduce the crystalline particle size by the time of the completion of the crystal transformation. Thus, the phthalocyanine pigment of the present disclosure is more likely to be produced.

Consequently, by using a hydroxygallium phthalocyanine pigment including crystalline particles exhibiting peaks at Bragg angles 2θ of 7.4°±0.3° and 28.2°±0.3° in the CuKα X-ray diffraction spectrum, and further using an amide compound represented by formula (A1) as a solvent, the phthalocyanine pigment of the present disclosure can be produced through crystal transformation that can be performed under a wide range of conditions. Indeed, the present inventors found that the phthalocyanine pigment of the present disclosure can be produced by applying a specific pulverizing force to such a combination of a phthalocyanine pigment and a solvent by milling for a specific period of time without performing the above-described two-step milling operation.

It was examined by $^1$H-NMR measurement data analysis whether or not the crystalline particles of the hydroxygallium phthalocyanine pigments of the Examples contain an amide compound represented by formula (A1). Also, the content of the amide compound of formula (A1) in the crystalline particles was determined by $^1$H-NMR data analysis. For example, a hydroxygallium phthalocyanine pigment subjected to milling operation with a solvent capable of dissolving the amide compound of formula (A1) or washed with the solvent after milling operation is analyzed by $^1$H-NMR. If the amide compound of formula (A1) is detected, it can be determined that the crystalline particles contain the amide compound of formula (A1).

The powder X-ray diffraction and $^1$H-NMR analysis of phthalocyanine pigments for the electrophotographic photosensitive member of the present disclosure were performed under the following conditions:

Powder X-Ray Diffraction
  Apparatus: X-ray diffractometer RINT-TTR II, manufactured by Rigaku
  X-ray tube: Cu
  X-ray wavelength: K$\alpha$1
  Tube voltage: 50 kV
  Tube current: 300 mA
  Scanning: 2$\theta$ scan
  Scanning speed: 4.0°/min
  Sampling interval: 0.02°
  Start angle 2$\theta$: 5.0°
  Stop angle 2$\theta$: 35.0°
  Goniometer: Rotor horizontal goniometer (TTR-2)
  Attachment: capillary sample turn table
  Filter: none
  Detector: Scintillation counter
  Incident monochromator: used
  Slit: Variable slit (parallel beam method)
  Counter monochromator: not used
  Divergence slit: open
  Divergence vertical limit slit: 10.00 mm
  Scattering slit: open
  Receiving slit: open
1H-NMR Analysis
  Analyzer: AVANCE III 500, manufactured by BRUKER
  Solvent: bisulfuric acid ($D_2SO_4$)
  Integration count: 2,000

Charge Transport Layer

If the photosensitive layer has a multilayer structure, the charge transport layer of the multilayer photosensitive layer is formed by applying a coating liquid prepared by dispersing a charge transporting material and optionally a binder resin in a solvent to form a coating film and drying the coating film.

Examples of the charge transporting material include triarylamine compounds, hydrazone compounds, stilbene compounds, pyrazoline compounds, oxazole compounds, thiazole compounds, and triallylmethane compounds. The charge transporting material may be a polymer having a group derived from these compounds in the main chain or a side chain thereof. Triarylamine compounds, styryl compounds, and benzidine compounds are advantageous as the charge transporting material, and triarylamine compounds are more advantageous. Charge transporting materials may be used singly or in combination.

Examples of the binder resin used in the charge transport layer are insulating resins including polyvinyl butyral resin, polyvinyl acetal resin, polyarylate resin, polycarbonate resin, polyester resin, polyvinyl acetate resin, polysulfone resin, polystyrene resin, phenoxy resin, acrylic resin, polyacrylamide resin, polyamide resin, polyvinyl pyridine resin, urethane resin, epoxy resin, agarose resin, cellulose resin, casein resin, polyvinyl alcohol resin, polyvinylpyrrolidone resin, polyvinylidene chloride resin, acrylonitrile copolymers, and polyvinyl benzal resin. Organic photoconductive polymers may also be used, such as poly-N-vinyl carbazol, polyvinyl anthracene, and polyvinyl pyrene. Among these, polycarbonate resin and polyarylate resin are advantageous. The binder resin may be composed of a single resin, or may be a mixture or a copolymer of two or more resins. The copolymer may be in any form, such as block copolymer, random copolymer, or alternating copolymer. The weight average molecular weight (Mw) of the binder resin may be in the range of 10,000 to 300,000.

The charge transporting material content in the charge transport layer is desirably in the range of 20% by mass to 80% by mass, such as in the range of 30% by mass to 60% by mass, relative to the total mass of the charge transport layer.

The thickness of the charge transport layer may be in the range of 5 µm to 40 µm.

Protective Layer

A protective layer may be formed on the photosensitive layer, if necessary. The protective layer can be formed by applying a coating liquid prepared by dissolving a resin in a solvent to form a coating film and drying the coating film. Alternatively, the protective layer may be formed by heating the coating film or curing the coating film by, for example, electron beam or ultraviolet light irradiation.

Examples of the resin used in the protective layer include polyvinyl butyral resin, polyester resin, polycarbonate resin (polycarbonate Z, modified polycarbonate, etc.), nylon resin, polyimide resin, polyacrylate resin, polyurethane resin, styrene-butadiene copolymer, styrene-acrylic acid copolymer, and styrene-acrylonitrile copolymer.

To enable the protective layer to transport charges, the protective layer may be formed by curing a monomer capable of transporting charges by a polymerization reaction or a crosslinking reaction. For example, the protective layer may be formed by polymerizing or crosslinking a charge-transportable compound having a chain-polymerizable functional group to cure the compound.

The protective layer may contain electroconductive particles, a UV absorbent, or lubricative particles such as fluorine-containing organic particles. The electroconductive particles may be metal oxide particles such as zinc oxide particles. The thickness of the protective layer may be in the range of 0.05 µm to 20 µm.

The application of the coating liquid for each layer may be performed by dipping, spray coating, spinner coating, bead coating, blade coating, beam coating, or any other coating technique. From the viewpoint of efficiency and productivity, dipping is advantageous.

Process Cartridge and Electrophotographic Apparatus

Figure 4:
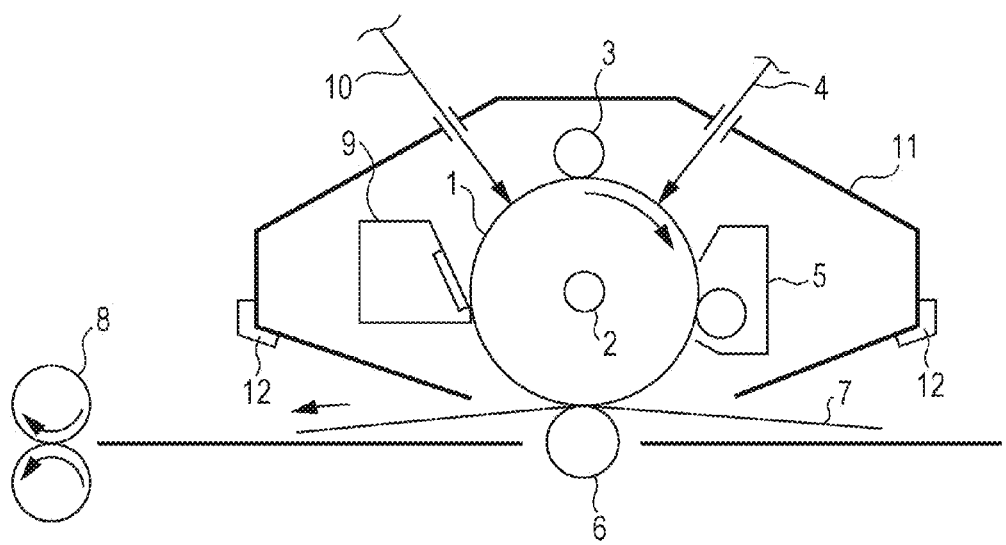
FIG. 4 is a schematic view of the structure of an electrophotographic apparatus provided with a process cartridge including an electrophotographic photosensitive member according to an embodiment of the present disclosure.

FIG. 4 is a schematic view of the structure of an electrophotographic apparatus provided with a process cartridge including an electrophotographic photosensitive member. This electrophotographic photosensitive member 1, which is cylindrical (drum-shaped), is driven for rotation on a shaft 2 in the direction indicated by the arrow at a predetermined peripheral speed (process speed).

When driven for rotation, the surface of the electrophotographic photosensitive member 1 is charged to a predetermined positive or negative potential with a charging device 3. Subsequently, an electrostatic latent image corresponding to targeted image information is formed on the surface of the charged electrophotographic photosensitive member 1 by irradiation with exposure light 4 from an exposure device (not shown). The exposure light 4 has been modulated in intensity according to the time-series electric digital image signals of the targeted image information output from the exposure device, such as a slit exposure device or a laser beam scanning exposure device.

The electrostatic latent image formed on the surface of the electrophotographic photosensitive member 1 is developed (normally developed or reversely developed) into a toner image with a toner contained in a developing device 5. The toner image on the surface of the electrophotographic photosensitive member 1 is transferred to a transfer medium 7 by a transfer device 6. At this time, a bias voltage having an opposite polarity to the charge of the toner is applied to the transfer device 6 from a bias source (not shown). When the transfer medium 7 is paper, it is fed to the portion between the electrophotographic photosensitive member 1 and the transfer device 6 from a paper feeder (not shown) in synchronization with the rotation of the electrophotographic photosensitive member 1.

The transfer medium 7 to which the toner image has been transferred from the electrophotographic photosensitive member 1 is separated from the surface of the electrophotographic photosensitive member 1 and then conveyed to a fixing device 8 for fixing the toner image, thus being ejected as an image-formed article (printed matter or copy).

The surface of the electrophotographic photosensitive member 1 from which the toner image has been transferred to the transfer medium 7 is cleaned with a cleaning device 9 to remove therefrom the toner or the like remaining after transfer. The use of a recently developed cleaning system allows the toner remaining after transfer to be directly removed by a developing device or the like. Then, the surface of the electrophotographic photosensitive member 1 is pre-exposed to pre-exposure light 10 from a pre-exposure device (not shown) to remove static electricity before being repeatedly used for forming images. If the charging device 3 is a contact charging type using a charging roller or the like, pre-exposure device is not necessarily required.

In an embodiment of the present disclosure, some of the components of the electrophotographic apparatus including the electrophotographic photosensitive member 1, the charging device 3, the developing device 5, and the cleaning device 9 are integrated in a container as a process cartridge. The process cartridge may be removably mounted to the body of the electrophotographic apparatus. For example, at least one selected from among the charging device 3, the developing device 5, and the cleaning device 9 is integrated with the electrophotographic photosensitive member 1 into a cartridge. The cartridge may be guided by a guide 12 such as a rail, thus being used as a process cartridge 11 removable from the body of the electrophotographic apparatus.

If the electrophotographic apparatus is a copy machine or a printer, the exposure light 4 may be reflected light from or transmitted light through an original image. Alternatively, the exposure light 4 may be light emitted by laser beam scanning operation according to the signals generated by reading the original image with a sensor, or light emitted from an LED array or a liquid crystal shutter array driven according to such signals.

The electrophotographic photosensitive member 1 disclosed herein can be widely applied to electrophotographic applications in the fields of, for example, laser beam printers, CRT printers, LED printers, FAX machines, liquid crystal printers, and laser plate making.

EXAMPLES

The subject matter of the present disclosure will be further described in detail with reference to the following examples. In the following description, the term "part(s)" refers to "part(s) by mass". It should be appreciated that the subject matter is not limited to the following Examples. The thicknesses of each layer of the electrophotographic photosensitive members of the Examples and Comparative Examples were determined by measurement using an eddy current thickness meter Fischerscope (manufactured by Fischer) or by calculation using specific gravity and mass per unit area.

Synthesis Examples 1

A reactor was charged with 5.46 parts of o-phthalonitrile and 45 parts of α-chloronaphthalene and was then heated to and kept at 30° C. in an atmosphere of nitrogen flow. Subsequently, 3.75 parts of gallium trichloride was added into the reactor at this temperature (30° C.). The water content in the resulting mixture at this time was 150 ppm. Then, the mixture was heated to 200° C. Subsequently, the mixture was subjected to a reaction at 200° C. for 4.5 hours in an atmosphere of nitrogen flow, followed by cooling to 150° C. Then, the reaction product was filtered out. The resulting filtration product was dispersed in N,N-dimethylformamide and washed at 140° C. for 2 hours, followed by filtration. The resulting filtration product was washed with methanol and dried to yield a chlorogallium phthalocyanine pigment with a yield of 71%.

Synthesis Examples 2

In 139.5 parts of concentrated sulfuric acid was dissolved at 10° C. 4.65 parts of the chlorogallium phthalocyanine pigment produced in Synthesis Example 1. The solution was dropped into 620 parts of ice water with stirring, and the precipitate was filtered using a filter press. For this filtration, No. 5C filter (manufactured by ADVANTEC) was used as the filter. The resulting wet cake (filtration product) was dispersed and washed in 2% ammonia solution for 30 minutes and then filtered using a filter press. Subsequently, the resulting wet cake (filtration product) was dispersed and washed in ion exchanged water and then filtered using a filter press. This operation was repeated three times. Finally, the product was freeze-dried to yield a hydroxygallium phthalocyanine pigment (solids content: 23%, hydrous hydroxygallium phthalocyanine pigment) with a yield of 97%.

Synthesis Examples 3

In a dryer HYPER-DRY HD-06R (oscillation frequency: 2455 MHz±15 MHz, manufactured by Biocon), 6.6 kg of the hydroxygallium phthalocyanine pigment produced in Synthesis Example 2 was dried as below.

The cake of the hydroxygallium phthalocyanine pigment removed from the filter press (hydrous cake thickness: 4 cm or less) was placed on a dedicated circular plastic tray, and the dryer was set so that the internal wall temperature would be 50° C. and that infrared radiation would be off. For microwave irradiation, the degree of vacuum in the dryer was set in the range of 4.0 kPa to 10.0 kPa by adjusting the vacuum pump and the leakage valve.

In the first step for the drying, the hydroxygallium phthalocyanine pigment was irradiated with microwaves of 4.8 kW for 50 minutes. After temporarily interrupting the microwave radiation, the dryer was evacuated to 2 kPa or less with the leakage valve closed. At this time, the solids content of the hydroxygallium phthalocyanine pigment was 88%. In the second step, the degree of vacuum (internal pressure of the dryer) was returned to the above-set range (4.0 kPa to 10.0 kPa) by adjusting the leakage valve. Then, the hydroxygallium phthalocyanine pigment was irradiated with microwaves of 1.2 kW for 5 minutes. After temporarily interrupting the microwave radiation, the dryer was evacuated to 2 kPa or less with the leakage valve closed. This second step was repeated once (total twice). At this time, the solids content of the hydroxygallium phthalocyanine pigment was 98%. Furthermore, in the third step, irradiation with microwaves was performed in the same manner as in the second step, except that the power of the microwaves was varied from 1.2 kW to 0.8 kW. This third step was repeated once (total twice). Furthermore, in the fourth step, the degree of vacuum (internal pressure of the dryer) was returned to the above-set range (4.0 kPa to 10.0 kPa) by adjusting the leakage valve. Then, the hydroxygallium phthalocyanine pigment was irradiated with microwaves of 0.4 kW for 3 minutes. After temporarily interrupting the microwave radiation, the dryer was evacuated to 2 kPa or less with the leakage valve closed. This fourth step was repeated seven times (total eight times). Thus, 1.52 kg of hydroxygallium phthalocyanine pigment (crystals) with a water content of 1% or less was produced over a period of 3 hours in total.

Synthesis Examples 4

With 200 parts of hydrochloric acid (35% by mass in terms of hydrogen chloride) of 23° C. in temperature was mixed 10 parts of the hydroxygallium phthalocyanine pigment produced in Synthesis Example 2. The mixture was stirred with a magnetic stirrer for 90 minutes. The ratio of the hydrogen chloride to the hydroxygallium phthalocyanine was 118 mol to 1 mol. After being stirred, the mixture was dropped into 1000 parts of ion exchanged water cooled with ice water, followed by stirring with a magnetic stirrer for 30 minutes. The resulting mixture was filtered under reduced pressure. For this filtration, No. 5C filter (manufactured by ADVANTEC) was used as the filter. Then, the filtration product was dispersed and washed in 23° C. ion exchanged water four times to yield 9 parts of a chlorogallium phthalocyanine pigment.

Synthesis Examples 5

In 100 g of α-chloronaphthalene, 5.0 g of o-phthalodinitrile and 2.0 g of titanium tetrachloride were stirred for 3 hours with heating at 200° C. Then, the mixture was cooled to 50° C. to precipitate crystals. The precipitate was separated by filtration to yield paste of a dichlorotitanium phthalocyanine. Subsequently, the paste was stirred and washed in 100 mL of N,N-dimethylformamide heated to 100° C. and then washed in 100 mL of 60° C. methanol twice, followed by filtration. Furthermore, the resulting paste was stirred in 100 mL of deionized water at 80° C. for 1 hour, and the liquid was subjected to filtration to yield 4.3 g of a blue titanyl phthalocyanine pigment.

Then, the resulting pigment was dissolved in 30 mL of concentrated sulfuric acid, and the solution was dropped into 300 mL of 20° C. deionized water with stirring for precipitation. The precipitate was filtered out and sufficiently washed with water to yield an amorphous titanyl phthalocyanine pigment. In 100 mL of methanol was suspended 4.0 g of the resulting amorphous titanyl phthalocyanine pigment at room temperature (22° C.) for 8 hours. The suspension was filtered, and the filtration product was dried under reduced pressure to yield a low-crystallinity titanyl phthalocyanine pigment.

Synthesis Examples 6

To 230 parts of dimethyl sulfoxide were added 30 parts of 1,3-diiminoisoindoline and 9.1 parts of gallium trichloride. The materials were subjected to a reaction at 160° C. for 6 hours with stirring to yield a purple-red pigment. The resulting pigment was washed with dimethyl sulfoxide and ion exchanged water in that order and then dried to yield 28 parts of a chlorogallium phthalocyanine pigment.

Synthesis Examples 7

The solution of 10 parts of the chlorogallium phthalocyanine pigment produced in the foregoing Synthesis Example 6 in 300 parts of 60° C. sulfuric acid (concentration: 97%) was dropped into the mixed solution of 600 parts of 25% ammonia water and 200 parts of ion exchanged water. After being collected by filtration, the pigment was washed with N,N-dimethylformamide and ion exchanged water and then dried to yield 8 parts of a chlorogallium phthalocyanine pigment.

Synthesis Examples 8

To 100 mL α-chloronaphthalene were added 10 g of gallium trichloride and 29.1 g of o-phthalonitrile in an atmosphere of nitrogen flow, and the materials were subjected to a reaction at 200° C. for 24 hours. Then, the reaction product was collected by filtration. The filtration product in the form of wet cake was dispersed in N,N-dimethylformamide at 150° C. for 30 minutes, followed by filtration. The resulting filtration product was washed with methanol and dried to yield a chlorogallium phthalocyanine pigment with a yield of 83%.

In 50 parts of concentrated sulfuric acid was dissolved 2 parts of this chlorogallium phthalocyanine pigment. After being stirred for 2 hours, the solution was dropped into the ice-cooled mixed solution of 170 mL of distilled water and 66 mL of concentrated ammonia solution to yield a precipitate. After being washed with distilled water, the precipitate was dried to yield 1.8 parts of a hydroxygallium phthalocyanine pigment.

Synthesis Examples 9

A reaction of 31.8 parts of phthalonitrile, 10.1 parts of gallium trimethoxide, and 150 mL of methylene glycol was performed at 200° C. for 24 hours in an atmosphere of nitrogen flow. Then, the reaction product was collected by filtration. The resulting product in the form of wet cake was washed with N,N-dimethylformamide and methanol in that order and then dried to yield 25.1 parts of a gallium phthalocyanine pigment.

In 50 parts of concentrated sulfuric acid was dissolved 2 parts of this gallium phthalocyanine pigment. After being stirred for 2 hours, the solution was dropped into the ice-cooled mixed solution of 170 mL of distilled water and 66 mL of concentrated ammonia solution to yield a precipitate. After being washed with distilled water, the precipitate was dried to yield 1.8 parts of a hydroxygallium phthalocyanine pigment.

Synthesis Examples 10

To 230 parts of dimethyl sulfoxide were added 30 parts of 1,3-diiminoisoindoline and 9.1 parts of gallium trichloride. The materials were subjected to a reaction at 160° C. for 4 hours with stirring to yield a purple-red pigment. The resulting pigment was washed with dimethyl sulfoxide and ion exchanged water in that order. The resulting wet cake was vacuum-dried at 80° C. for 24 hours to yield 28 parts of a chlorogallium phthalocyanine pigment.

Example 1

Support Member

An aluminum cylinder of 24 mm in diameter and 257 mm in length was used as a support member (cylindrical support member).

Electroconductive Layer

Then, in a ball mill were dispersed 60 parts of tin oxide-coated barium sulfate particles (PASTRAN PC1, produced by "Mitsui Mining & Smelting), 15 parts of titanium oxide particles (TITANIX JR, produced by Tayca), 43 parts of resol-type phenol resin (PHENOLITE J-325, produced by DIC, solids content: 70% by mass), 0.015 part of silicone oil (SH28PA, produced by Dow Corning Toray), 3.6 parts of silicone resin particles (TOSPEARL 120, produced by Momentive Performance Materials), 50 parts of 2-methoxy-1-propanol, and 50 parts of methanol for 20 hours to yield a coating liquid for the electroconductive layer. This coating liquid was applied to the surface of the support member by dipping. The resulting coating film was cured by heating at 145° C. for 1 hour to yield a 20 μm-thick electroconductive layer.

Undercoat Layer

Next, 25 parts of N-methoxymethylated nylon 6 (Toresin EF-30T, produced by Nagase Chemtex) was dissolved in 480 parts of methanol/n-butanol mixed solution with a proportion of 2/1 by heating at 65° C., and the resulting solution was cooled. Then, the solution was filtered through a membrane filter FP-022 (pore size: 0.22 μm, manufactured by Sumitomo Electric Industries) to yield a coating liquid for the undercoat layer. This coating liquid was applied to the surface of the electroconductive layer by dipping. The resulting coating film was heated to dry at 100° C. for 10 minutes to yield a 0.5 μm-thick undercoat layer.

Charge Generating Layer

Subsequently, 0.5 part of the hydroxygallium phthalocyanine pigment produced in Synthesis Example 3 and 9.5 parts of N-methylformamide F0059 (manufactured by Tokyo Chemical Industry) were subjected to milling (first milling operation) with 15 parts of glass beads of 0.9 mm in diameter with a paint shaker (manufactured by Toyo Seiki) at room temperature (23° C.) for 6 hours. For this operation, a standard bottle PS-6 (manufactured by Hakuyo Glass) was used as the container. The liquid subjected to the milling operation was filtered through a filter (N-NO. 125T, pore size: 133 μm, manufactured by NBC Meshtec) to remove the glass beads. The resulting liquid was further subjected to milling (second milling operation) at room temperature (23° C.) for 40 hours by using a ball mill machine. This operation was performed in the standard bottle PS-6 (manufactured by Hakuyo Glass) under the condition where the bottle was rotated at a speed of 120 rpm. In this operation, media, such as glass beads, were not used. After adding 30 parts of N-methylformamide to the resulting liquid, the mixture was filtered, and the filtration product remaining on the filter was sufficiently washed with tetrahydrofuran. Then, the resulting filtration product was vacuum-dried to yield 0.46 part of a hydroxygallium phthalocyanine pigment.

The resulting pigment was exhibited peaks at Bragg angles 2θ of 7.5°±0.2°, 9.9°±0.2°, 16.2°±0.2°, 18.6°±0.2°, 25.2°±0.2°, and 28.3°±0.2° in the CuKα X-ray diffraction spectrum thereof. The crystallite correlation length r, which was estimated from the peak at 7.5°±0.2° that was the strongest of the peaks in the range of 5° to 35°, was 31 nm. The content of the amide compound (N-methylformamide) represented by formula (A1) in the hydroxygallium phthalocyanine crystalline particles, which was estimated by $^1$H-NMR analysis, was 2.6% by mass relative to the mass of the hydroxygallium phthalocyanine.

Subsequently, 20 parts of the hydroxygallium phthalocyanine pigment subjected to the above-described milling operation, 10 parts of a polyvinyl butyral S-LEC BX-1 (produced by Sekisui Chemical), and 190 parts of cyclohexanone were dispersed in each other with 482 parts of glass beads of 0.9 mm in diameter in a sand mill K-800 (manufactured by Aimex, disk diameter: 70 mm, 5 disks) for 4 hours with cooling water of 18° C. This operation was performed under the condition where the disks were rotated at 1,800 rpm. To the resulting dispersion liquid were added 444 parts of cyclohexanone and 634 parts of ethyl acetate to yield a coating liquid for forming a charge generating layer. This coating liquid was applied to the surface of the undercoat layer by dipping. The resulting coating film was heated to dry at 100° C. for 10 minutes to yield a 0.16 μm-thick charge generating layer.

The volume average particle size R of the hydroxygallium phthalocyanine pigment in the charge generating layer, which was estimated from the particle size distribution obtained using the SEM micrograph, was 125 nm. In the particle size distribution, the volume frequency of the occurrence of particles having a particle size in the range of 60 nm to 200 nm was 88%. From the crystallite correlation length r and the volume average particle size R, parameter k (=r/R) was 0.25.

Charge Transport Layer

A coating liquid for forming a charge transport layer was prepared by dissolving in 630 pars of monochlorobenzene 70 parts of a triarylamine compound represented by the following formula:

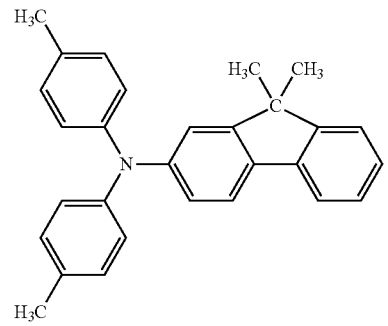 [SMILES: Cc1ccc(N(c2ccc(C)cc2)c2ccc3c(c2)C(C)(C)c2ccccc2-3)cc1]

10 parts of a triarylamine compound represented by the following formula:

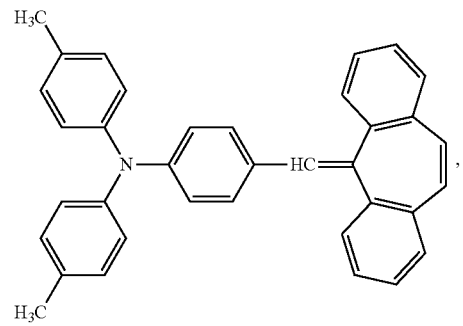 [SMILES: Cc1ccc(N(c2ccc(C)cc2)c2ccc(C=C3c4ccccc4C=Cc4ccccc43)cc2)cc1]

and 100 parts of polycarbonate IUPILON Z-200 (produced by Mitsubishi Engineering-Plastics). This coating liquid was applied to the surface of the charge generating layer by dipping. The resulting coating film was heated to dry at 120° C. for 1 hour to yield a 19 μm-thick charge transport layer.

The heating operation for the electroconductive layer, the undercoat layer, the charge generating layer, and the charge transport layer was performed at the respective temperatures in an oven. The same applies to the heating operation in the following Examples. Thus, a cylindrical (drum-shaped) electrophotographic photosensitive member of Example 1 was completed.

Example 2

An electrophotographic photosensitive member of Example 2 was produced in the same manner as in Example 1, except that the time for the second milling operation using the ball mill machine was changed from 40 hours to 100 hours. The crystallite correlation length r of the resulting pigment, which was estimated from the peak at 7.5°±0.2° that was the strongest of the peaks in the CuKα X-ray diffraction spectrum, was 31 nm. The content of the amide compound (N-methylformamide) represented by formula (A1) in the hydroxygallium phthalocyanine crystalline particles, which was estimated by $^1$H-NMR analysis, was 2.4% by mass relative to the hydroxygallium phthalocyanine.

The volume average particle size R of the hydroxygallium phthalocyanine pigment in the charge generating layer, which was estimated from the particle size distribution obtained using the SEM micrograph, was 118 nm. In the particle size distribution, the volume frequency of the occurrence of particles having a particle size in the range of 60 nm to 200 nm was 89%. From the crystallite correlation length r and the volume average particle size R, parameter k (=r/R) was 0.26.

Example 3

An electrophotographic photosensitive member of Example 3 was produced in the same manner as in Example 1, except that the time for the second milling operation using the ball mill machine was changed from 40 hours to 300 hours. The crystallite correlation length r of the resulting pigment, which was estimated from the peak at 7.5°±0.2° that was the strongest of the peaks in the CuKα X-ray diffraction spectrum, was 34 nm. The content of the amide compound (N-methylformamide) represented by formula (A1) in the hydroxygallium phthalocyanine crystalline particles, which was estimated by $^1$H-NMR analysis, was 2.2% by mass relative to the hydroxygallium phthalocyanine.

The volume average particle size R of the hydroxygallium phthalocyanine pigment in the charge generating layer, which was estimated from the particle size distribution obtained using the SEM micrograph, was 111 nm. In the particle size distribution, the volume frequency of the occurrence of particles having a particle size in the range of 60 nm to 200 nm was 90%. From the crystallite correlation length r and the volume average particle size R, parameter k (=r/R) was 0.30.

Example 4

An electrophotographic photosensitive member of Example 4 was produced in the same manner as in Example 1, except that the time for the second milling operation using the ball mill machine was changed from 40 hours to 1,000 hours. The crystallite correlation length r of the resulting pigment, which was estimated from the peak at 7.5°±0.2° that was the strongest of the peaks in the CuKα X-ray diffraction spectrum, was 34 nm. The content of the amide compound (N-methylformamide) represented by formula (A1) in the hydroxygallium phthalocyanine crystalline particles, which was estimated by $^1$H-NMR analysis, was 2.0% by mass relative to the hydroxygallium phthalocyanine.

The volume average particle size R of the hydroxygallium phthalocyanine pigment in the charge generating layer, which was estimated from the particle size distribution obtained using the SEM micrograph, was 105 nm. In the particle size distribution, the volume frequency of the occurrence of particles having a particle size in the range of 60 nm to 200 nm was 91%. From the crystallite correlation length r and the volume average particle size R, parameter k (=r/R) was 0.32.

Example 5

An electrophotographic photosensitive member of Example 5 was produced in the same manner as in Example 1, except that the time for the second milling operation using the ball mill machine was changed from 40 to 2,000 hours. The crystallite correlation length r of the resulting pigment, which was estimated from the peak at 7.5°±0.2° that was the strongest of the peaks in the CuKα X-ray diffraction spectrum, was 36 nm. The content of the amide compound (N-methylformamide) represented by formula (A1) in the hydroxygallium phthalocyanine crystalline particles, which was estimated by $^1$H-NMR analysis, was 1.9% by mass relative to the hydroxygallium phthalocyanine.

The volume average particle size R of the hydroxygallium phthalocyanine pigment in the charge generating layer, which was estimated from the particle size distribution obtained using the SEM micrograph, was 102 nm. In the particle size distribution, the volume frequency of the occurrence of particles having a particle size in the range of 60 nm to 200 nm was 92%. From the crystallite correlation length r and the volume average particle size R, parameter k (=r/R) was 0.35.

Example 6

An electrophotographic photosensitive member of Example 6 was produced in the same manner as in Example 1, except that the time for the first milling operation with the paint shaker was changed from 6 hours to 3 hours and the time for the second milling operation using the ball mill machine was chanted from 40 hours to 10 hours. The crystallite correlation length r of the resulting pigment, which was estimated from the peak at 7.5°±0.2° that was the strongest of the peaks in the CuKα X-ray diffraction spectrum, was 27 nm. The content of the amide compound (N-methylformamide) represented by formula (A1) in the hydroxygallium phthalocyanine crystalline particles, which was estimated by $^1$H-NMR analysis, was 3.2% by mass relative to the hydroxygallium phthalocyanine.

The volume average particle size R of the hydroxygallium phthalocyanine pigment in the charge generating layer, which was estimated from the particle size distribution obtained using the SEM micrograph, was 148 nm. In the particle size distribution, the volume frequency of the occurrence of particles having a particle size in the range of 60 nm to 200 nm was 77%. From the crystallite correlation length r and the volume average particle size R, parameter k (=r/R) was 0.18.

Example 7

An electrophotographic photosensitive member of Example 7 was produced in the same manner as in Example 6, except that the time for the second milling operation using the ball mill machine was changed from 10 hours to 20 hours. The crystallite correlation length r of the resulting pigment, which was estimated from the peak at 7.5°±0.2° that was the strongest of the peaks in the CuKα X-ray diffraction spectrum, was 27 nm. The content of the amide compound (N-methylformamide) represented by formula (A1) in the hydroxygallium phthalocyanine crystalline particles, which was estimated by $^1$H-NMR analysis, was 3.1% by mass relative to the hydroxygallium phthalocyanine.

The volume average particle size R of the hydroxygallium phthalocyanine pigment in the charge generating layer, which was estimated from the particle size distribution obtained using the SEM micrograph, was 145 nm. In the particle size distribution, the volume frequency of the occurrence of particles having a particle size in the range of 60 nm to 200 nm was 79%. From the crystallite correlation length r and the volume average particle size R, parameter k (=r/R) was 0.19.

Example 8

An electrophotographic photosensitive member of Example 8 was produced in the same manner as in Example 6, except that the time for the second milling operation using the ball mill machine was changed from 10 hours to 40 hours. The crystallite correlation length r of the resulting pigment, which was estimated from the peak at 7.5°±0.2° that was the strongest of the peaks in the CuKα X-ray diffraction spectrum, was 29 nm. The content of the amide compound (N-methylformamide) represented by formula (A1) in the hydroxygallium phthalocyanine crystalline particles, which was estimated by $^1$H-NMR analysis, was 2.7% by mass relative to the hydroxygallium phthalocyanine.

The volume average particle size R of the hydroxygallium phthalocyanine pigment in the charge generating layer, which was estimated from the particle size distribution obtained using the SEM micrograph, was 138 nm. In the particle size distribution, the volume frequency of the occurrence of particles having a particle size in the range of 60 nm to 200 nm was 83%. From the crystallite correlation length r and the volume average particle size R, parameter k (=r/R) was 0.21.

Example 9

An electrophotographic photosensitive member of Example 9 was produced in the same manner as in Example 6, except that the time for the second milling operation using the ball mill machine was changed from 10 hours to 100 hours. The crystallite correlation length r of the resulting pigment, which was estimated from the peak at 7.5°±0.2° that was the strongest of the peaks in the CuKα X-ray diffraction spectrum, was 31 nm. The content of the amide compound (N-methylformamide) represented by formula (A1) in the hydroxygallium phthalocyanine crystalline particles, which was estimated by $^1$H-NMR analysis, was 2.4% by mass relative to the hydroxygallium phthalocyanine.

The volume average particle size R of the hydroxygallium phthalocyanine pigment in the charge generating layer, which was estimated from the particle size distribution obtained using the SEM micrograph, was 133 nm. In the particle size distribution, the volume frequency of the occurrence of particles having a particle size in the range of 60 nm to 200 nm was 85%. From the crystallite correlation length r and the volume average particle size R, parameter k (=r/R) was 0.23.

Example 10

An electrophotographic photosensitive member of Example 10 was produced in the same manner as in Example 6, except that the time for the second milling operation using the ball mill machine was changed from 10 hours to 300 hours. The crystallite correlation length r of the resulting pigment, which was estimated from the peak at 7.5°±0.2° that was the strongest of the peaks in the CuKα X-ray diffraction spectrum, was 31 nm. The content of the amide compound (N-methylformamide) represented by formula (A1) in the hydroxygallium phthalocyanine crystalline particles, which was estimated by $^1$H-NMR analysis, was 2.3% by mass relative to the hydroxygallium phthalocyanine.

The volume average particle size R of the hydroxygallium phthalocyanine pigment in the charge generating layer, which was estimated from the particle size distribution obtained using the SEM micrograph, was 121 nm. In the particle size distribution, the volume frequency of the occurrence of particles having a particle size in the range of 60 nm to 200 nm was 88%. From the crystallite correlation length r and the volume average particle size R, parameter k (=r/R) was 0.26.

Example 11

An electrophotographic photosensitive member of Example 11 was produced in the same manner as in Example 6, except that the time for the second milling operation using the ball mill was changed from 10 hours to 1,000 hours. The crystallite correlation length r of the resulting pigment, which was estimated from the peak at 7.5°±0.2° that was the strongest of the peaks in the CuKα X-ray diffraction spectrum, was 34 nm. The content of the amide compound (N-methylformamide) represented by formula (A1) in the hydroxygallium phthalocyanine crystalline particles, which was estimated by 1H-NMR analysis, was 2.1% by mass relative to the hydroxygallium phthalocyanine.

The volume average particle size R of the hydroxygallium phthalocyanine pigment in the charge generating layer, which was estimated from the particle size distribution obtained using the SEM micrograph, was 115 nm. In the particle size distribution, the volume frequency of the occurrence of particles having a particle size in the range of 60 nm to 200 nm was 89%. From the crystallite correlation length r and the volume average particle size R, parameter k (=r/R) was 0.29.

Example 12

An electrophotographic photosensitive member of Example 12 was produced in the same manner as in Example 6, except that the time for the second milling operation using the ball mill machine was changed from 10 hours to 2,000 hours. The crystallite correlation length r of the resulting pigment, which was estimated from the peak at 7.5°±0.2° that was the strongest of the peaks in the CuKα X-ray diffraction spectrum, was 34 nm. The content of the amide compound (N-methylformamide) represented by formula (A1) in the hydroxygallium phthalocyanine crystalline particles, which was estimated by $^1$H-NMR analysis, was 2.0% by mass relative to the hydroxygallium phthalocyanine.

The volume average particle size R of the hydroxygallium phthalocyanine pigment in the charge generating layer, which was estimated from the particle size distribution obtained using the SEM micrograph, was 110 nm. In the particle size distribution, the volume frequency of the occurrence of particles having a particle size in the range of 60 nm to 200 nm was 90%. From the crystallite correlation length r and the volume average particle size R, parameter k (=r/R) was 0.31.

Example 13

An electrophotographic photosensitive member of Example 13 was produced in the same manner as in Example 1, except that the time for the first milling operation with the paint shaker was changed from 6 hours to 1 hour and the time for the second milling operation using the ball mill machine was chanted from 40 hours to 20 hours. The crystallite correlation length r of the resulting pigment, which was estimated from the peak at 7.5°±0.2° that was the strongest of the peaks in the CuKα X-ray diffraction spectrum, was 25 nm. The content of the amide compound (N-methylformamide) represented by formula (A1) in the hydroxygallium phthalocyanine crystalline particles, which was estimated by $^1$H-NMR analysis, was 3.2% by mass relative to the hydroxygallium phthalocyanine.

The volume average particle size R of the hydroxygallium phthalocyanine pigment in the charge generating layer, which was estimated from the particle size distribution obtained using the SEM micrograph, was 143 nm. In the particle size distribution, the volume frequency of range of 60 nm to 200 nm was 77%. From the crystallite correlation length r and the volume average particle size R, parameter k (=r/R) was 0.17.

Example 14

An electrophotographic photosensitive member of Example 14 was produced in the same manner as in Example 13, except that the time for the second milling operation using the ball mill machine was changed from 20 hours to 40 hours. The crystallite correlation length r of the resulting pigment, which was estimated from the peak at 7.5°±0.2° that was the strongest of the peaks in the CuKα X-ray diffraction spectrum, was 27 nm. The content of the amide compound (N-methylformamide) represented by formula (A1) in the hydroxygallium phthalocyanine crystalline particles, which was estimated by $^1$H-NMR analysis, was 2.8% by mass relative to the hydroxygallium phthalocyanine.

The volume average particle size R of the hydroxygallium phthalocyanine pigment in the charge generating layer, which was estimated from the particle size distribution obtained using the SEM micrograph, was 141 nm. In the particle size distribution, the volume frequency of the occurrence of particles having a particle size in the range of 60 nm to 200 nm was 81%. From the crystallite correlation length r and the volume average particle size R, parameter k (=r/R) was 0.19.

Example 15

An electrophotographic photosensitive member of Example 15 was produced in the same manner as in Example 13, except that the time for the second milling operation using the ball mill machine was changed from 20 hours to 100 hours. The crystallite correlation length r of the resulting pigment, which was estimated from the peak at 7.5°±0.2° that was the strongest of the peaks in the CuKα X-ray diffraction spectrum, was 27 nm. The content of the amide compound (N-methylformamide) represented by formula (A1) in the hydroxygallium phthalocyanine crystalline particles, which was estimated by $^1$H-NMR analysis, was 2.7% by mass relative to the hydroxygallium phthalocyanine.

The volume average particle size R of the hydroxygallium phthalocyanine pigment in the charge generating layer, which was estimated from the particle size distribution obtained using the SEM micrograph, was 140 nm. In the particle size distribution, the volume frequency of the occurrence of particles having a particle size in the range of 60 nm to 200 nm was 83%. From the crystallite correlation length r and the volume average particle size R, parameter k (=r/R) was 0.19.

Example 16

An electrophotographic photosensitive member of Example 16 was produced in the same manner as in Example 13, except that the time for the second milling operation using the ball mill machine was changed from 20 hours to 300 hours. The crystallite correlation length r of the resulting pigment, which was estimated from the peak at 7.5°±0.2° that was the strongest of the peaks in the CuKα X-ray diffraction spectrum, was 29 nm. The content of the amide compound (N-methylformamide) represented by formula (A1) in the hydroxygallium phthalocyanine crystalline particles, which was estimated by $^1$H-NMR analysis, was 2.4% by mass relative to the hydroxygallium phthalocyanine.

The volume average particle size R of the hydroxygallium phthalocyanine pigment in the charge generating layer, which was estimated from the particle size distribution obtained using the SEM micrograph, was 139 nm. In the particle size distribution, the volume frequency of the occurrence of particles having a particle size in the range of 60 nm to 200 nm was 85%. From the crystallite correlation length r and the volume average particle size R, parameter k (=r/R) was 0.21.

Example 17

An electrophotographic photosensitive member of Example 17 was produced in the same manner as in Example 13, except that the time for the second milling operation using the ball mill machine was changed from 20 hours to 1,000 hours. The crystallite correlation length r of the resulting pigment, which was estimated from the peak at 7.5°±0.2° that was the strongest of the peaks in the CuKα X-ray diffraction spectrum, was 31 nm. The content of the amide compound (N-methylformamide) represented by formula (A1) in the hydroxygallium phthalocyanine crystalline particles, which was estimated by $^1$H-NMR analysis, was 2.2% by mass relative to the hydroxygallium phthalocyanine.

The volume average particle size R of the hydroxygallium phthalocyanine pigment in the charge generating layer, which was estimated from the particle size distribution obtained using the SEM micrograph, was 137 nm. In the particle size distribution, the volume frequency of the occurrence of particles having a particle size in the range of 60 nm to 200 nm was 87%. From the crystallite correlation length r and the volume average particle size R, parameter k (=r/R) was 0.23.

Example 18

An electrophotographic photosensitive member of Example 18 was produced in the same manner as in Example 13, except that the time for the second milling operation using the ball mill machine was changed from 20 hours to 2,000 hours. The crystallite correlation length r of the resulting pigment, which was estimated from the peak at 7.5°±0.2° that was the strongest of the peaks in the CuKα X-ray diffraction spectrum, was 31 nm. The content of the amide compound (N-methylformamide) represented by formula (A1) in the hydroxygallium phthalocyanine crystalline particles, which was estimated by $^1$H-NMR analysis, was 2.0% by mass relative to the hydroxygallium phthalocyanine.

The volume average particle size R of the hydroxygallium phthalocyanine pigment in the charge generating layer, which was estimated from the particle size distribution obtained using the SEM micrograph, was 135 nm. In the particle size distribution, the volume frequency of the occurrence of particles having a particle size in the range of 60 nm to 200 nm was 88%. From the crystallite correlation length r and the volume average particle size R, parameter k (=r/R) was 0.23.

Example 19

An electrophotographic photosensitive member of Example 19 was produced in the same manner as in Example 1, except that the second milling operation in the process for producing the hydroxygallium phthalocyanine pigment was changed as below.

In the first milling operation, 0.5 part of the hydroxygallium phthalocyanine pigment produced in Synthesis Example 3 and 9.5 parts of N-methylformamide F0059 (manufactured by Tokyo Chemical Industry) were subjected to milling with 15 parts of glass beads of 0.9 mm in diameter with a paint shaker (manufactured by Toyo Seiki) at room temperature (23° C.) for 6 hours.

For this operation, a standard bottle PS-6 (manufactured by Hakuyo Glass) was used as the container. The resulting liquid was further subjected to milling (second milling operation) at room temperature (23° C.) for 40 hours by using a ball mill machine. For this operation, the container was set to the ball mill machine as it was without removing the contents therefrom, and the container was rotated at a speed of 120 rpm. Hence, both the first and the second milling operation were performed with the same glass beads. The liquid subjected to the milling operation was passed through a filter (N-NO. 125T, pore size: 133 μm, manufactured by NBC Meshtec) to remove the glass beads. After adding 30 parts of N-methylformamide to the resulting liquid, the mixture was filtered, and the filtration product remaining on the filter was sufficiently washed with tetrahydrofuran. Then, the resulting filtration product was vacuum-dried to yield 0.46 part of a hydroxygallium phthalocyanine pigment. The resulting pigment was exhibited peaks at Bragg angles 2θ of 7.5°±0.2°, 9.9°±0.2°, 16.2°±0.2°, 18.6°±0.2°, 25.2°±0.2°, and 28.3°±0.2° in the CuKα X-ray diffraction spectrum thereof. The crystallite correlation length r, which was estimated from the peak at 7.5°±0.2° that was the strongest of the peaks in the range of 5° to 35°, was 27 nm. The content of the amide compound (N-methylformamide) represented by formula (A1) in the hydroxygallium phthalocyanine crystalline particles, which was estimated by $^1$H-NMR analysis, was 2.3% by mass relative to the hydroxygallium phthalocyanine.

The volume average particle size R of the hydroxygallium phthalocyanine pigment in the charge generating layer, which was estimated from the particle size distribution obtained using the SEM micrograph, was 121 nm. In the particle size distribution, the volume frequency of the occurrence of particles having a particle size in the range of 60 nm to 200 nm was 89%. From the crystallite correlation length r and the volume average particle size R, parameter k (=r/R) was 0.22.

Example 20

An electrophotographic photosensitive member of Example 20 was produced in the same manner as in Example 19, except that the time for the second milling operation using the ball mill machine was changed from 40 hours to 100 hours. The crystallite correlation length r of the resulting pigment, which was estimated from the peak at 7.5°±0.2° that was the strongest of the peaks in the CuKα X-ray diffraction spectrum, was 29 nm. The content of the amide compound (N-methylformamide) represented by formula (A1) in the hydroxygallium phthalocyanine crystalline particles, which was estimated by $^1$H-NMR analysis, was 1.9% by mass relative to the hydroxygallium phthalocyanine.

The volume average particle size R of the hydroxygallium phthalocyanine pigment in the charge generating layer, which was estimated from the particle size distribution obtained using the SEM micrograph, was 110 nm. In the particle size distribution, the volume frequency of the occurrence of particles having a particle size in the range of 60 nm to 200 nm was 90%. From the crystallite correlation length r and the volume average particle size R, parameter k (=r/R) was 0.26.

Example 21

An electrophotographic photosensitive member of Example 21 was produced in the same manner as in Example 19, except that the time for the second milling operation using the ball mill machine was changed from 40 hours to 300 hours. The crystallite correlation length r of the resulting pigment, which was estimated from the peak at 7.5°±0.2° that was the strongest of the peaks in the CuKα X-ray diffraction spectrum, was 29 nm. The content of the amide compound (N-methylformamide) represented by formula (A1) in the hydroxygallium phthalocyanine crystalline particles, which was estimated by $^1$H-NMR analysis, was 1.5% by mass relative to the hydroxygallium phthalocyanine.

The volume average particle size R of the hydroxygallium phthalocyanine pigment in the charge generating layer, which was estimated from the particle size distribution obtained using the SEM micrograph, was 93 nm. In the particle size distribution, the volume frequency of the occurrence of particles having a particle size in the range of 60 nm to 200 nm was 91%. From the crystallite correlation length r and the volume average particle size R, parameter k (=r/R) was 0.31.

Example 22

An electrophotographic photosensitive member of Example 22 was produced in the same manner as in Example 19, except that the time for the second milling operation using the ball mill machine was changed from 40 hours to 1,000 hours. The crystallite correlation length r of the resulting pigment, which was estimated from the peak at 7.5°±0.2° that was the strongest of the peaks in the CuKα X-ray diffraction spectrum, was 31 nm. The content of the amide compound (N-methylformamide) represented by formula (A1) in the hydroxygallium phthalocyanine crystalline particles, which was estimated by ¹H-NMR analysis, was 0.7% by mass relative to the hydroxygallium phthalocyanine.

The volume average particle size R of the hydroxygallium phthalocyanine pigment in the charge generating layer, which was estimated from the particle size distribution obtained using the SEM micrograph, was 83 nm. In the particle size distribution, the volume frequency of the occurrence of particles having a particle size in the range of 60 nm to 200 nm was 93%. From the crystallite correlation length r and the volume average particle size R, parameter k (=r/R) was 0.38.

Example 23

An electrophotographic photosensitive member of Example 23 was produced in the same manner as in Example 19, except that the time for the second milling operation using the ball mill machine was changed from 40 hours to 2,000 hours. The crystallite correlation length r of the resulting pigment, which was estimated from the peak at 7.5°±0.2° that was the strongest of the peaks in the CuKα X-ray diffraction spectrum, was 34 nm. The content of the amide compound (N-methylformamide) represented by formula (A1) in the hydroxygallium phthalocyanine crystalline particles, which was estimated by ¹H-NMR analysis, was 0.6% by mass relative to the hydroxygallium phthalocyanine.

The volume average particle size R of the hydroxygallium phthalocyanine pigment in the charge generating layer, which was estimated from the particle size distribution obtained using the SEM micrograph, was 81 nm. In the particle size distribution, the volume frequency of the occurrence of particles having a particle size in the range of 60 nm to 200 nm was 95%. From the crystallite correlation length r and the volume average particle size R, parameter k (=r/R) was 0.41.

Example 24

An electrophotographic photosensitive member of Example 24 was produced in the same manner as in Example 1, except that the first milling operation in the process for producing the hydroxygallium phthalocyanine pigment was changed as below.

In the first milling operation, 1 part of the hydroxygallium phthalocyanine pigment produced in Synthesis Example 3 and 9 parts of N-methylformamide F0059 (manufactured by Tokyo Chemical Industry) were subjected to milling for 30 hours with 15 parts of glass beads of 0.9 mm in diameter by using a sand mill machine K-800 (manufactured by Aimex, disk diameter: 70 mm, 5 disks) with cooling water of 18° C. This operation was performed under the condition where the disks were rotated at 800 rpm. The liquid subjected to the milling operation was filtered through a filter (N-NO. 125T, pore size: 133 μm, manufactured by NBC Meshtec) to remove the glass beads. The resulting liquid was further subjected to milling (second milling operation) at room temperature (23° C.) for 40 hours by using a ball mill machine. This operation was performed in the standard bottle PS-6 (manufactured by Hakuyo Glass) under the condition where the bottle was rotated at a speed of 120 rpm. In this operation, media, such as glass beads, were not used. After adding 30 parts of N-methylformamide to the resulting liquid, the mixture was filtered, and the filtration product remaining on the filter was sufficiently washed with tetrahydrofuran. Then, the resulting filtration product was vacuum-dried to yield 0.45 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 27 nm. The content of the amide compound (N-methylformamide) represented by formula (A1) in the hydroxygallium phthalocyanine crystalline particles, which was estimated by ¹H-NMR analysis, was 2.1% by mass relative to the hydroxygallium phthalocyanine.

The volume average particle size R of the hydroxygallium phthalocyanine pigment in the charge generating layer, which was estimated from the particle size distribution obtained using the SEM micrograph, was 131 nm. In the particle size distribution, the volume frequency of the occurrence of particles having a particle size in the range of 60 nm to 200 nm was 86%. From the crystallite correlation length r and the volume average particle size R, parameter k (=r/R) was 0.21.

Example 25

An electrophotographic photosensitive member of Example 25 was produced in the same manner as in Example 24, except that the time for the second milling operation using the ball mill machine was chanted from 40 hours to 100 hours. The crystallite correlation length r of the resulting pigment, which was estimated from the peak at 7.5°±0.2° that was the strongest of the peaks in the CuKα X-ray diffraction spectrum, was 29 nm. The content of the amide compound (N-methylformamide) represented by formula (A1) in the hydroxygallium phthalocyanine crystalline particles, which was estimated by ¹H-NMR analysis, was 2.0% by mass relative to the hydroxygallium phthalocyanine.

The volume average particle size R of the hydroxygallium phthalocyanine pigment in the charge generating layer, which was estimated from the particle size distribution obtained using the SEM micrograph, was 125 nm. In the particle size distribution, the volume frequency of the occurrence of particles having a particle size in the range of 60 nm to 200 nm was 87%. From the crystallite correlation length r and the volume average particle size R, parameter k (=r/R) was 0.23.

Example 26

An electrophotographic photosensitive member of Example 26 was produced in the same manner as in Example 24, except that the time for the second milling operation using the ball mill machine was chanted from 40 hours to 300 hours. The crystallite correlation length r of the resulting pigment, which was estimated from the peak at 7.5°±0.2° that was the strongest of the peaks in the CuKα X-ray diffraction spectrum, was 31 nm. The content of the amide compound (N-methylformamide) represented by formula (A1) in the hydroxygallium phthalocyanine crystalline particles, which was estimated by ¹H-NMR analysis, was 1.8% by mass relative to the hydroxygallium phthalocyanine.

The volume average particle size R of the hydroxygallium phthalocyanine pigment in the charge generating layer, which was estimated from the particle size distribution obtained using the SEM micrograph, was 115 nm. In the particle size distribution, the volume frequency of the occurrence of particles having a particle size in the range of 60 nm

Example 27

An electrophotographic photosensitive member of Example 27 was produced in the same manner as in Example 24, except that the time for the second milling operation using the ball mill machine was changed from 40 hours to 1,000 hours. The crystallite correlation length r of the resulting pigment, which was estimated from the peak at 7.5°±0.2° that was the strongest of the peaks in the CuKα X-ray diffraction spectrum, was 31 nm. The content of the amide compound (N-methylformamide) represented by formula (A1) in the hydroxygallium phthalocyanine crystalline particles, which was estimated by $^1$H-NMR analysis, was 1.5% by mass relative to the hydroxygallium phthalocyanine.

The volume average particle size R of the hydroxygallium phthalocyanine pigment in the charge generating layer, which was estimated from the particle size distribution obtained using the SEM micrograph, was 111 nm. In the particle size distribution, the volume frequency of the occurrence of particles having a particle size in the range of 60 nm to 200 nm was 90%. From the crystallite correlation length r and the volume average particle size R, parameter k (=r/R) was 0.28.

Example 28

An electrophotographic photosensitive member of Example 28 was produced in the same manner as in Example 24, except that the time for the second milling operation using the ball mill machine was changed from 40 hours to 2,000 hours. The crystallite correlation length r of the resulting pigment, which was estimated from the peak at 7.5°±0.2° that was the strongest of the peaks in the CuKα X-ray diffraction spectrum, was 34 nm. The content of the amide compound (N-methylformamide) represented by formula (A1) in the hydroxygallium phthalocyanine crystalline particles, which was estimated by $^1$H-NMR analysis, was 1.3% by mass relative to the hydroxygallium phthalocyanine.

The volume average particle size R of the hydroxygallium phthalocyanine pigment in the charge generating layer, which was estimated from the particle size distribution obtained using the SEM micrograph, was 110 nm. In the particle size distribution, the volume frequency of the occurrence of particles having a particle size in the range of 60 nm to 200 nm was 93%. From the crystallite correlation length r and the volume average particle size R, parameter k (=r/R) was 0.31.

Example 29

An electrophotographic photosensitive member of Example 29 was produced in the same manner as in Example 24, except that the second milling operation in the process for producing the hydroxygallium phthalocyanine pigment was changed as below.

In the first milling operation, 1 part of the hydroxygallium phthalocyanine pigment produced in Synthesis Example 3 and 9 parts of N-methylformamide F0059 (manufactured by Tokyo Chemical Industry) were subjected to milling for 30 hours with 15 parts of glass beads of 0.9 mm in diameter by using a sand mill machine K-800 (manufactured by Aimex, disk diameter: 70 mm, 5 disks) with cooling water of 18° C. This operation was performed under the condition where the disks were rotated at 800 rpm. The resulting liquid was further subjected to milling (second milling operation) at room temperature (23° C.) for 40 hours by using a ball mill machine. For this operation, the liquid subjected to the milling operation using the sand mill machine, including the glass beads, was removed to a container, and the container was rotated at a speed of 120 rpm. Hence, both the first and the second milling operation were performed with the same glass beads. The container used for this operation was the standard bottle PS-6 (manufactured by Hakuyo Glass). The liquid subjected to the milling operation was passed through a filter (N-NO. 125T, pore size: 133 μm, manufactured by NBC Meshtec) to remove the glass beads. After adding 30 parts of N-methylformamide to the resulting liquid, the mixture was filtered, and the filtration product remaining on the filter was sufficiently washed with tetrahydrofuran. Then, the resulting filtration product was vacuum-dried to yield 0.45 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 25 nm. The content of the amide compound (N-methylformamide) represented by formula (A1) in the hydroxygallium phthalocyanine crystalline particles, which was estimated by $^1$H-NMR analysis, was 2.0% by mass relative to the hydroxygallium phthalocyanine.

The volume average particle size R of the hydroxygallium phthalocyanine pigment in the charge generating layer, which was estimated from the particle size distribution obtained using the SEM micrograph, was 124 nm. In the particle size distribution, the volume frequency of the occurrence of particles having a particle size in the range of 60 nm to 200 nm was 85%. From the crystallite correlation length r and the volume average particle size R, parameter k (=r/R) was 0.20.

Example 30

An electrophotographic photosensitive member of Example 30 was produced in the same manner as in Example 29, except that the time for the second milling operation using the ball mill machine was changed from 40 hours to 100 hours. The crystallite correlation length r of the resulting pigment, which was estimated from the peak at 7.5°±0.2° that was the strongest of the peaks in the CuKα X-ray diffraction spectrum, was 27 nm. The content of the amide compound (N-methylformamide) represented by formula (A1) in the hydroxygallium phthalocyanine crystalline particles, which was estimated by $^1$H-NMR analysis, was 1.7% by mass relative to the hydroxygallium phthalocyanine.

The volume average particle size R of the hydroxygallium phthalocyanine pigment in the charge generating layer, which was estimated from the particle size distribution obtained using the SEM micrograph, was 115 nm. In the particle size distribution, the volume frequency of the occurrence of particles having a particle size in the range of 60 nm to 200 nm was 88%. From the crystallite correlation length r and the volume average particle size R, parameter k (=r/R) was 0.23.

Example 31

An electrophotographic photosensitive member of Example 31 was produced in the same manner as in Example 29, except that the time for the second milling operation using the ball mill machine was changed from 40 hours to 300 hours. The crystallite correlation length r of the resulting pigment, which was estimated from the peak at 7.5°±0.2° that was the strongest of the peaks in the CuKα X-ray diffraction spectrum, was 29 nm. The content of the amide compound (N-methylformamide) represented by formula (A1) in the hydroxygallium phthalocyanine crystalline particles, which was estimated by $^1$H-NMR analysis, was 1.3% by mass relative to the hydroxygallium phthalocyanine.

The volume average particle size R of the hydroxygallium phthalocyanine pigment in the charge generating layer, which was estimated from the particle size distribution obtained using the SEM micrograph, was 95 nm. In the particle size distribution, the volume frequency of the occurrence of particles having a particle size in the range of 60 nm to 200 nm was 91%. From the crystallite correlation length r and the volume average particle size R, parameter k (=r/R) was 0.31.

Example 32

An electrophotographic photosensitive member of Example 32 was produced in the same manner as in Example 29, except that the time for the second milling operation using the ball mill machine was changed from 40 hours to 1,000 hours. The crystallite correlation length r of the resulting pigment, which was estimated from the peak at 7.5°+0.2° that was the strongest of the peaks in the CuKα X-ray diffraction spectrum, was 31 nm. The content of the amide compound (N-methylformamide) represented by formula (A1) in the hydroxygallium phthalocyanine crystalline particles, which was estimated by $^1$H-NMR analysis, was 0.8% by mass relative to the hydroxygallium phthalocyanine.

The volume average particle size R of the hydroxygallium phthalocyanine pigment in the charge generating layer, which was estimated from the particle size distribution obtained using the SEM micrograph, was 87 nm. In the particle size distribution, the volume frequency of the occurrence of particles having a particle size in the range of 60 nm to 200 nm was 92%. From the crystallite correlation length r and the volume average particle size R, parameter k (=r/R) was 0.36.

Example 33

An electrophotographic photosensitive member of Example 33 was produced in the same manner as in Example 29, except that the time for the second milling operation using the ball mill machine was changed from 40 hours to 2,000 hours. The crystallite correlation length r of the resulting pigment, which was estimated from the peak at 7.5°+0.2° that was the strongest of the peaks in the CuKα X-ray diffraction spectrum, was 34 nm. The content of the amide compound (N-methylformamide) represented by formula (A1) in the hydroxygallium phthalocyanine crystalline particles, which was estimated by $^1$H-NMR analysis, was 0.6% by mass relative to the hydroxygallium phthalocyanine.

The volume average particle size R of the hydroxygallium phthalocyanine pigment in the charge generating layer, which was estimated from the particle size distribution obtained using the SEM micrograph, was 84 nm. In the particle size distribution, the volume frequency of the occurrence of particles having a particle size in the range of 60 nm to 200 nm was 94%. From the crystallite correlation length r and the volume average particle size R, parameter k (=r/R) was 0.40.

Example 34

An electrophotographic photosensitive member of Example 34 was produced in the same manner as in Example 1, except that the second milling operation in the process for producing the hydroxygallium phthalocyanine pigment was changed as below.

In the first milling operation, 0.5 part of the hydroxygallium phthalocyanine pigment produced in Synthesis Example 3 and 9.5 parts of N-methylformamide F0059 (manufactured by Tokyo Chemical Industry) were subjected to milling with 15 parts of glass beads of 0.9 mm in diameter with a paint shaker (manufactured by Toyo Seiki) at room temperature (23° C.) for 6 hours. For this operation, a standard bottle PS-6 (manufactured by Hakuyo Glass) was used as the container. The liquid subjected to the milling operation was filtered through a filter (N-NO. 125T, pore size: 133 µm, manufactured by NBC Meshtec) to remove the glass beads. The resulting liquid was further subjected to milling (second milling operation) with a magnetic stirrer at room temperature (23° C.) for 10 hours. This operation was performed in the standard bottle PS-6 (manufactured by Hakuyo Glass) under the condition where the stirring bar was rotated at a speed of 1,500 rpm. In this operation, media, such as glass beads, were not used. After adding 30 parts of N-methylformamide to the resulting liquid, the mixture was filtered, and the filtration product remaining on the filter was sufficiently washed with tetrahydrofuran. Then, the resulting filtration product was vacuum-dried to yield 0.46 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 29 nm. The content of the amide compound (N-methylformamide) represented by formula (A1) in the hydroxygallium phthalocyanine crystalline particles, which was estimated by 1H-NMR analysis, was 3.2% by mass relative to the hydroxygallium phthalocyanine.

The volume average particle size R of the hydroxygallium phthalocyanine pigment in the charge generating layer, which was estimated from the particle size distribution obtained using the SEM micrograph, was 132 nm. In the particle size distribution, the volume frequency of the occurrence of particles having a particle size in the range of 60 nm to 200 nm was 77%. From the crystallite correlation length r and the volume average particle size R, parameter k (=r/R) was 0.22.

Example 35

An electrophotographic photosensitive member of Example 35 was produced in the same manner as in Example 34, except that the time for the second milling operation using the magnetic stirrer was changed from 10 hours to 20 hours. The crystallite correlation length r of the resulting pigment, which was estimated from the peak at 7.5°±0.2° that was the strongest of the peaks in the CuKα X-ray diffraction spectrum, was 31 nm. The content of the amide compound (N-methylformamide) represented by formula (A1) in the hydroxygallium phthalocyanine crystalline particles, which was estimated by $^1$H-NMR analysis, was 3.1% by mass relative to the hydroxygallium phthalocyanine.

The volume average particle size R of the hydroxygallium phthalocyanine pigment in the charge generating layer, which was estimated from the particle size distribution obtained using the SEM micrograph, was 128 nm. In the particle size distribution, the volume frequency of the occurrence of particles having a particle size in the range of 60 nm to 200 nm was 79%. From the crystallite correlation length r and the volume average particle size R, parameter k (=r/R) was 0.24.

Example 36

An electrophotographic photosensitive member of Example 36 was produced in the same manner as in Example 34, except that the time for the second milling operation using the magnetic stirrer was changed from 10 hours to 40 hours. The crystallite correlation length r of the resulting pigment, which was estimated from the peak at 7.5°±0.2° that was the strongest of the peaks in the CuKα X-ray diffraction spectrum, was 34 nm. The content of the amide compound (N-methylformamide) represented by formula (A1) in the hydroxygallium phthalocyanine crystalline particles, which was estimated by $^1$H-NMR analysis, was 2.8% by mass relative to the hydroxygallium phthalocyanine.

The volume average particle size R of the hydroxygallium phthalocyanine pigment in the charge generating layer, which was estimated from the particle size distribution obtained using the SEM micrograph, was 126 nm. In the particle size distribution, the volume frequency of the occurrence of particles having a particle size in the range of 60 nm to 200 nm was 81%. From the crystallite correlation length r and the volume average particle size R, parameter k (=r/R) was 0.27.

Example 37

An electrophotographic photosensitive member of Example 37 was produced in the same manner as in Example 34, except that the time for the second milling operation using the magnetic stirrer was changed from 10 hours to 100 hours. The crystallite correlation length r of the resulting pigment, which was estimated from the peak at 7.5°±0.2° that was the strongest of the peaks in the CuKα X-ray diffraction spectrum, was 34 nm. The content of the amide compound (N-methylformamide) represented by formula (A1) in the hydroxygallium phthalocyanine crystalline particles, which was estimated by $^1$H-NMR analysis, was 2.7% by mass relative to the hydroxygallium phthalocyanine.

The volume average particle size R of the hydroxygallium phthalocyanine pigment in the charge generating layer, which was estimated from the particle size distribution obtained using the SEM micrograph, was 125 nm. In the particle size distribution, the volume frequency of the occurrence of particles having a particle size in the range of 60 nm to 200 nm was 82%. From the crystallite correlation length r and the volume average particle size R, parameter k (=r/R) was 0.27.

Example 38

An electrophotographic photosensitive member of Example 38 was produced in the same manner as in Example 34, except that the time for the second milling operation using the magnetic stirrer was changed from 10 hours to 300 hours. The crystallite correlation length r of the resulting pigment, which was estimated from the peak at 7.5°±0.2° that was the strongest of the peaks in the CuKα X-ray diffraction spectrum, was 34 nm. The content of the amide compound (N-methylformamide) represented by formula (A1) in the hydroxygallium phthalocyanine crystalline particles, which was estimated by $^1$H-NMR analysis, was 2.5% by mass relative to the hydroxygallium phthalocyanine.

The volume average particle size R of the hydroxygallium phthalocyanine pigment in the charge generating layer, which was estimated from the particle size distribution obtained using the SEM micrograph, was 122 nm. In the particle size distribution, the volume frequency of the occurrence of particles having a particle size in the range of 60 nm to 200 nm was 85%. From the crystallite correlation length r and the volume average particle size R, parameter k (=r/R) was 0.28.

Example 39

An electrophotographic photosensitive member of Example 39 was produced in the same manner as in Example 1, except that the second milling operation in the process for producing the hydroxygallium phthalocyanine pigment was changed as below.

In the first milling operation, 0.5 part of the hydroxygallium phthalocyanine pigment produced in Synthesis Example 3 and 9.5 parts of N-methylformamide F0059 (manufactured by Tokyo Chemical Industry) were subjected to milling with 15 parts of glass beads of 0.9 mm in diameter with a paint shaker (manufactured by Toyo Seiki) at room temperature (23° C.) for 6 hours. For this operation, a standard bottle PS-6 (manufactured by Hakuyo Glass) was used as the container. The liquid subjected to the milling operation was filtered through a filter (N-NO. 125T, pore size: 133 μm, manufactured by NBC Meshtec) to remove the glass beads. The resulting liquid was further subjected to milling (second milling operation) with an ultrasonic disperser UT-205 (manufactured by Sharp) at room temperature (23° C.) for 1 hour. For this operation, a standard bottle PS-6 (manufactured by Hakuyo Glass) was used as the container, and the power of the ultrasonic disperser was 100%. In this operation, media, such as glass beads, were not used. After adding 30 parts of N-methylformamide to the resulting liquid, the mixture was filtered, and the filtration product remaining on the filter was sufficiently washed with tetrahydrofuran. Then, the resulting filtration product was vacuum-dried to yield 0.46 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 27 nm. The content of the amide compound (N-methylformamide) represented by formula (A1) in the hydroxygallium phthalocyanine crystalline particles, which was estimated by $^1$H-NMR analysis, was 3.3% by mass relative to the hydroxygallium phthalocyanine.

The volume average particle size R of the hydroxygallium phthalocyanine pigment in the charge generating layer, which was estimated from the particle size distribution obtained using the SEM micrograph, was 143 nm. In the particle size distribution, the volume frequency of the occurrence of particles having a particle size in the range of 60 nm to 200 nm was 74%. From the crystallite correlation length r and the volume average particle size R, parameter k (=r/R) was 0.19.

Example 40

An electrophotographic photosensitive member of Example 40 was produced in the same manner as in Example 39, except that the time for the second milling operation using the ultrasonic disperser was changed from 1 hour to 3 hours. The crystallite correlation length r of the resulting pigment, which was estimated from the peak at 7.5°±0.2° that was the strongest of the peaks in the CuKα X-ray diffraction spectrum, was 27 nm. The content of the amide compound (N-methylformamide) represented by formula (A1) in the hydroxygallium phthalocyanine crystalline particles, which was estimated by $^1$H-NMR analysis, was 3.1% by mass relative to the hydroxygallium phthalocyanine.

The volume average particle size R of the hydroxygallium phthalocyanine pigment in the charge generating layer, which was estimated from the particle size distribution obtained using the SEM micrograph, was 139 nm. In the particle size distribution, the volume frequency of the occurrence of particles having a particle size in the range of 60 nm to 200 nm was 76%. From the crystallite correlation length r and the volume average particle size R, parameter k (=r/R) was 0.19.

Example 41

An electrophotographic photosensitive member of Example 41 was produced in the same manner as in Example 39, except that the time for the second milling operation using the ultrasonic disperser was changed from 1 hour to 10 hours. The crystallite correlation length r of the resulting pigment, which was estimated from the peak at 7.5°±0.2° that was the strongest of the peaks in the CuKα X-ray diffraction spectrum, was 29 nm. The content of the amide compound (N-methylformamide) represented by formula (A1) in the hydroxygallium phthalocyanine crystalline particles, which was estimated by $^1$H-NMR analysis, was 2.9% by mass relative to the hydroxygallium phthalocyanine.

The volume average particle size R of the hydroxygallium phthalocyanine pigment in the charge generating layer, which was estimated from the particle size distribution obtained using the SEM micrograph, was 137 nm. In the particle size distribution, the volume frequency of the occurrence of particles having a particle size in the range of 60 nm to 200 nm was 82%. From the crystallite correlation length r and the volume average particle size R, parameter k (=r/R) was 0.21.

Example 42

An electrophotographic photosensitive member of Example 42 was produced in the same manner as in Example 39, except that the time for the second milling operation using the ultrasonic disperser was changed from 1 hour to 30 hours. The crystallite correlation length r of the resulting pigment, which was estimated from the peak at 7.5°±0.2° that was the strongest of the peaks in the CuKα X-ray diffraction spectrum, was 29 nm. The content of the amide compound (N-methylformamide) represented by formula (A1) in the hydroxygallium phthalocyanine crystalline particles, which was estimated by 1H-NMR analysis, was 2.7% by mass relative to the hydroxygallium phthalocyanine.

The volume average particle size R of the hydroxygallium phthalocyanine pigment in the charge generating layer, which was estimated from the particle size distribution obtained using the SEM micrograph, was 134 nm. In the particle size distribution, the volume frequency of the occurrence of particles having a particle size in the range of 60 nm to 200 nm was 83%. From the crystallite correlation length r and the volume average particle size R, parameter k (=r/R) was 0.22.

Example 43

An electrophotographic photosensitive member of Example 43 was produced in the same manner as in Example 1, except that the process for producing the hydroxygallium phthalocyanine pigment was changed as below. In a sand mill K-800 (manufactured by Aimex, disk diameter: 70 mm, 5 disks) with cooling water of 18° C., 1 part of the hydroxygallium phthalocyanine pigment produced in Synthesis Example 3 and 9 parts of N-methylformamide F0059 (manufactured by Tokyo Chemical Industry) were subjected to milling for 70 hours with 15 parts of glass beads of 0.9 mm in diameter. This operation was performed under the condition where the disks were rotated at 400 rpm. After adding 30 parts of N-methylformamide to the resulting liquid, the mixture was filtered, and the filtration product remaining on the filter was sufficiently washed with tetrahydrofuran. Then, the resulting filtration product was vacuum-dried to yield 0.45 part of a hydroxygallium phthalocyanine pigment. The resulting pigment was exhibited peaks at Bragg angles 2θ of 7.5°±0.2°, 9.9°±0.2°, 16.2°±0.2°, 18.6°±0.2°, 25.2°±0.2°, and 28.3°±0.2° in the CuKα X-ray diffraction spectrum thereof (FIG. 2). The crystallite correlation length r, which was estimated from the peak at 7.5°±0.2° that was the strongest of the peaks in the range of 5° to 35°, was 27 nm. The content of the amide compound (N-methylformamide) represented by formula (A1) in the hydroxygallium phthalocyanine crystalline particles, which was estimated by $^1$H-NMR analysis, was 1.5% by mass relative to the hydroxygallium phthalocyanine.

The volume average particle size R of the hydroxygallium phthalocyanine pigment in the charge generating layer, which was estimated from the particle size distribution obtained using the SEM micrograph (FIG. 1), was 122 nm. In the particle size distribution, the volume frequency of the occurrence of particles having a particle size in the range of 60 nm to 200 nm was 86%. From the crystallite correlation length r and the volume average particle size R, parameter k (=r/R) was 0.22.

Example 44

An electrophotographic photosensitive member of Example 44 was produced in the same manner as in Example 43, except that the time for the milling operation using the sand mill was changed from 70 hours to 100 hours. The crystallite correlation length r of the resulting pigment, which was estimated from the peak at 7.5°±0.2° that was the strongest of the peaks in the CuKα X-ray diffraction spectrum, was 27 nm. The content of the amide compound (N-methylformamide) represented by formula (A1) in the hydroxygallium phthalocyanine crystalline particles, which was estimated by $^1$H-NMR analysis, was 0.9% by mass relative to the hydroxygallium phthalocyanine.

The volume average particle size R of the hydroxygallium phthalocyanine pigment in the charge generating layer, which was estimated from the particle size distribution obtained using the SEM micrograph, was 143 nm. In the particle size distribution, the volume frequency of the occurrence of particles having a particle size in the range of 60 nm to 200 nm was 91%. From the crystallite correlation length r and the volume average particle size R, parameter k (=r/R) was 0.19.

Example 45

An electrophotographic photosensitive member of Example 45 was produced in the same manner as in Example 1, except that the process for producing the hydroxygallium phthalocyanine pigment was changed as below.

In the first milling operation, 0.5 part of the hydroxygallium phthalocyanine pigment produced in Synthesis Example 3 and 9.5 parts of N,N-dimethylformamide D0722 (manufactured by Tokyo Chemical Industry) were subjected to milling with 15 parts of glass beads of 0.9 mm in diameter with a paint shaker (manufactured by Toyo Seiki) at room temperature (23° C.) for 6 hours. For this operation, a standard bottle PS-6 (manufactured by Hakuyo Glass) was used as the container. The liquid subjected to the milling operation was filtered through a filter (N-NO. 125T, pore size: 133 μm, manufactured by NBC Meshtec) to remove the glass beads. The resulting liquid was further subjected to milling (second milling operation) at room temperature (23° C.) for 40 hours by using a ball mill machine. This operation was performed in the standard bottle PS-6 (manufactured by Hakuyo Glass) under the condition where the bottle was rotated at a speed of 120 rpm. In this operation, media, such as glass beads, were not used. After adding 30 parts of N,N-dimethylformamide to the resulting liquid, the mixture was filtered, and the filtration product remaining on the filter was sufficiently washed with tetrahydrofuran. Then, the resulting filtration product was vacuum-dried to yield 0.48 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 31 nm.

The volume average particle size R of the hydroxygallium phthalocyanine pigment in the charge generating layer, which was estimated from the particle size distribution obtained using the SEM micrograph, was 158 nm. In the particle size distribution, the volume frequency of the occurrence of particles having a particle size in the range of 60 nm to 200 nm was 77%. From the crystallite correlation length r and the volume average particle size R, parameter k (=r/R) was 0.19.

Example 46

An electrophotographic photosensitive member of Example 46 was produced in the same manner as in Example 45, except that the time for the second milling operation using the ball mill machine was changed from 40 hours to 100 hours. The crystallite correlation length r of the resulting pigment, which was estimated from the peak at 7.5°±0.2° that was the strongest of the peaks in the CuKα X-ray diffraction spectrum, was 31 nm.

The volume average particle size R of the hydroxygallium phthalocyanine pigment in the charge generating layer, which was estimated from the particle size distribution obtained using the SEM micrograph, was 155 nm. In the particle size distribution, the volume frequency of the occurrence of particles having a particle size in the range of 60 nm to 200 nm was 78%. From the crystallite correlation length r and the volume average particle size R, parameter k (=r/R) was 0.20.

Example 47

An electrophotographic photosensitive member of Example 47 was produced in the same manner as in Example 45, except that the time for the second milling operation using the ball mill machine was changed from 40 hours to 300 hours. The crystallite correlation length r of the resulting pigment, which was estimated from the peak at 7.5°±0.2° that was the strongest of the peaks in the CuKα X-ray diffraction spectrum, was 34 nm.

The volume average particle size R of the hydroxygallium phthalocyanine pigment in the charge generating layer, which was estimated from the particle size distribution obtained using the SEM micrograph, was 152 nm. In the particle size distribution, the volume frequency of the occurrence of particles having a particle size in the range of 60 nm to 200 nm was 80%. From the crystallite correlation length r and the volume average particle size R, parameter k (=r/R) was 0.22.

Example 48

An electrophotographic photosensitive member of Example 48 was produced in the same manner as in Example 45, except that the time for the second milling operation using the ball mill machine was changed from 40 hours to 1,000 hours. The crystallite correlation length r of the resulting pigment, which was estimated from the peak at 7.5°±0.2° that was the strongest of the peaks in the CuKα X-ray diffraction spectrum, was 36 nm.

The volume average particle size R of the hydroxygallium phthalocyanine pigment in the charge generating layer, which was estimated from the particle size distribution obtained using the SEM micrograph, was 148 nm. In the particle size distribution, the volume frequency of the occurrence of particles having a particle size in the range of 60 nm to 200 nm was 81%. From the crystallite correlation length r and the volume average particle size R, parameter k (=r/R) was 0.24.

Example 49

An electrophotographic photosensitive member of Example 49 was produced in the same manner as in Example 45, except that the time for the second milling operation using the ball mill machine was changed from 40 hours to 2,000 hours. The crystallite correlation length r of the resulting pigment, which was estimated from the peak at 7.5°±0.2° that was the strongest of the peaks in the CuKα X-ray diffraction spectrum, was 36 nm.

The volume average particle size R of the hydroxygallium phthalocyanine pigment in the charge generating layer, which was estimated from the particle size distribution obtained using the SEM micrograph, was 147 nm. In the particle size distribution, the volume frequency of the occurrence of particles having a particle size in the range of 60 nm to 200 nm was 81%. From the crystallite correlation length r and the volume average particle size R, parameter k (=r/R) was 0.25.

Example 50

An electrophotographic photosensitive member of Example 50 was produced in the same manner as in Example 45, except that the second milling operation in the process for producing the hydroxygallium phthalocyanine pigment was changed as below.

In the first milling operation, 0.5 part of the hydroxygallium phthalocyanine pigment produced in Synthesis Example 3 and 9.5 parts of N,N-dimethylformamide D0722 (manufactured by Tokyo Chemical Industry) were subjected to milling with 15 parts of glass beads of 0.9 mm in diameter with a paint shaker (manufactured by Toyo Seiki) at room temperature (23° C.) for 6 hours. For this operation, a standard bottle PS-6 (manufactured by Hakuyo Glass) was used as the container. The resulting liquid was further subjected to milling (second milling operation) at room temperature (23° C.) for 40 hours by using a ball mill machine. For this operation, the container was set to the ball mill machine as it was without removing the contents therefrom, and the container was rotated at a speed of 120 rpm. Hence, both the first and the second milling operation were performed with the same glass beads. The liquid subjected to the milling operation was passed through a filter (N-NO. 125T, pore size: 133 μm, manufactured by NBC Meshtec) to remove the glass beads. After adding 30 parts of N,N-dimethylformamide to the resulting liquid, the mixture was filtered, and the filtration product remaining on the filter was sufficiently washed with tetrahydrofuran. Then, the resulting filtration product was vacuum-dried to yield 0.48 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 31 nm.

The volume average particle size R of the hydroxygallium phthalocyanine pigment in the charge generating layer, which was estimated from the particle size distribution obtained using the SEM micrograph, was 148 nm. In the particle size distribution, the volume frequency of the occurrence of particles having a particle size in the range of 60 nm to 200 nm was 78%. From the crystallite correlation length r and the volume average particle size R, parameter k (=r/R) was 0.21.

Example 51

An electrophotographic photosensitive member of Example 51 was produced in the same manner as in Example 50, except that the time for the second milling operation using the ball mill machine was changed from 40 hours to 100 hours. The crystallite correlation length r of the resulting pigment, which was estimated from the peak at 7.5°±0.2° that was the strongest of the peaks in the CuKα X-ray diffraction spectrum, was 34 nm.

The volume average particle size R of the hydroxygallium phthalocyanine pigment in the charge generating layer, which was estimated from the particle size distribution obtained using the SEM micrograph, was 147 nm. In the particle size distribution, the volume frequency of the occurrence of particles having a particle size in the range of 60 nm to 200 nm was 79%. From the crystallite correlation length r and the volume average particle size R, parameter k (=r/R) was 0.23.

Example 52

An electrophotographic photosensitive member of Example 52 was produced in the same manner as in Example 50, except that the time for the second milling operation using the ball mill machine was changed from 40 hours to 300 hours. The crystallite correlation length r of the resulting pigment, which was estimated from the peak at 7.5°±0.2° that was the strongest of the peaks in the CuKα X-ray diffraction spectrum, was 36 nm.

The volume average particle size R of the hydroxygallium phthalocyanine pigment in the charge generating layer, which was estimated from the particle size distribution obtained using the SEM micrograph, was 143 nm. In the particle size distribution, the volume frequency of the occurrence of particles having a particle size in the range of 60 nm to 200 nm was 81%. From the crystallite correlation length r and the volume average particle size R, parameter k (=r/R) was 0.25.

Example 53

An electrophotographic photosensitive member of Example 53 was produced in the same manner as in Example 50, except that the time for the second milling operation using the ball mill machine was changed from 40 hours to 1,000 hours. The crystallite correlation length r of the resulting pigment, which was estimated from the peak at 7.5°±0.2° that was the strongest of the peaks in the CuKα X-ray diffraction spectrum, was 36 nm.

The volume average particle size R of the hydroxygallium phthalocyanine pigment in the charge generating layer, which was estimated from the particle size distribution obtained using the SEM micrograph, was 140 nm. In the particle size distribution, the volume frequency of the occurrence of particles having a particle size in the range of 60 nm to 200 nm was 81%. From the crystallite correlation length r and the volume average particle size R, parameter k (=r/R) was 0.26.

Example 54

An electrophotographic photosensitive member of Example 54 was produced in the same manner as in Example 50, except that the time for the second milling operation using the ball mill machine was changed from 40 hours to 2,000 hours. The crystallite correlation length r of the resulting pigment, which was estimated from the peak at 7.5°±0.2° that was the strongest of the peaks in the CuKα X-ray diffraction spectrum, was 39 nm.

The volume average particle size R of the hydroxygallium phthalocyanine pigment in the charge generating layer, which was estimated from the particle size distribution obtained using the SEM micrograph, was 136 nm. In the particle size distribution, the volume frequency of the occurrence of particles having a particle size in the range of 60 nm to 200 nm was 82%. From the crystallite correlation length r and the volume average particle size R, parameter k (=r/R) was 0.28.

Example 55

An electrophotographic photosensitive member of Example 55 was produced in the same manner as in Example 1, except that the process for producing the hydroxygallium phthalocyanine pigment was changed as below.

In the first milling operation, 0.5 part of the hydroxygallium phthalocyanine pigment produced in Synthesis Example 3 and 9.5 parts of dimethyl sulfoxide D0798 (manufactured by Tokyo Chemical Industry) were subjected to milling with 15 parts of glass beads of 0.9 mm in diameter with a paint shaker (manufactured by Toyo Seiki) at room temperature (23° C.) for 6 hours. For this operation, a standard bottle PS-6 (manufactured by Hakuyo Glass) was used as the container. The liquid subjected to the milling operation was filtered through a filter (N-NO. 125T, pore size: 133 μm, manufactured by NBC Meshtec) to remove the glass beads. The resulting liquid was further subjected to milling (second milling operation) at room temperature (23° C.) for 100 hours by using a ball mill machine. This operation was performed in the standard bottle PS-6 (manufactured by Hakuyo Glass) under the condition where the bottle was rotated at a speed of 120 rpm. In this operation, media, such as glass beads, were not used. After adding 30 parts of dimethyl sulfoxide to the resulting liquid, the mixture was filtered, and the filtration product remaining on the filter was sufficiently washed with tetrahydrofuran. Then, the resulting filtration product was vacuum-dried to yield 0.47 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 32 nm.

The volume average particle size R of the hydroxygallium phthalocyanine pigment in the charge generating layer, which was estimated from the particle size distribution obtained using the SEM micrograph, was 168 nm. In the particle size distribution, the volume frequency of the occurrence of particles having a particle size in the range of 60 nm to 200 nm was 73%. From the crystallite correlation length r and the volume average particle size R, parameter k (=r/R) was 0.19.

Example 56

An electrophotographic photosensitive member of Example 56 was produced in the same manner as in Example 55, except that the time for the second milling operation using the ball mill machine was changed from 100 hours to 300 hours. The crystallite correlation length r of the resulting pigment, which was estimated from the peak at 7.5°±0.2° that was the strongest of the peaks in the CuKα X-ray diffraction spectrum, was 31 nm.

The volume average particle size R of the hydroxygallium phthalocyanine pigment in the charge generating layer, which was estimated from the particle size distribution obtained using the SEM micrograph, was 166 nm. In the particle size distribution, the volume frequency of the occurrence of particles having a particle size in the range of 60 nm to 200 nm was 75%. From the crystallite correlation length r and the volume average particle size R, parameter k (=r/R) was 0.19.

Example 57

An electrophotographic photosensitive member of Example 57 was produced in the same manner as in Example 55, except that the time for the second milling operation using the ball mill machine was changed from 100 hours to 1,000 hours. The crystallite correlation length r of the resulting pigment, which was estimated from the peak at 7.5°±0.2° that was the strongest of the peaks in the CuKα X-ray diffraction spectrum, was 34 nm.

The volume average particle size R of the hydroxygallium phthalocyanine pigment in the charge generating layer, which was estimated from the particle size distribution obtained using the SEM micrograph, was 164 nm. In the particle size distribution, the volume frequency of the occurrence of particles having a particle size in the range of 60 nm to 200 nm was 78%. From the crystallite correlation length r and the volume average particle size R, parameter k (=r/R) was 0.20.

Example 58

An electrophotographic photosensitive member of Example 58 was produced in the same manner as in Example 55, except that the time for the second milling operation using the ball mill machine was changed from 100 hours to 2,000 hours. The crystallite correlation length r of the resulting pigment, which was estimated from the peak at 7.5°±0.2° that was the strongest of the peaks in the CuKα X-ray diffraction spectrum, was 36 nm.

The volume average particle size R of the hydroxygallium phthalocyanine pigment in the charge generating layer, which was estimated from the particle size distribution obtained using the SEM micrograph, was 163 nm. In the particle size distribution, the volume frequency of the occurrence of particles having a particle size in the range of 60 nm to 200 nm was 79%. From the crystallite correlation length r and the volume average particle size R, parameter k (=r/R) was 0.22.

Example 59

An electrophotographic photosensitive member of Example 59 was produced in the same manner as in Example 55, except that the second milling operation in the process for producing the hydroxygallium phthalocyanine pigment was changed as below.

In the first milling operation, 0.5 part of the hydroxygallium phthalocyanine pigment produced in Synthesis Example 3 and 9.5 parts of dimethyl sulfoxide D0798 (manufactured by Tokyo Chemical Industry) were subjected to milling with 15 parts of glass beads of 0.9 mm in diameter with a paint shaker (manufactured by Toyo Seiki) at room temperature (23° C.) for 6 hours. For this operation, a standard bottle PS-6 (manufactured by Hakuyo Glass) was used as the container. The resulting liquid was further subjected to milling (second milling operation) at room temperature (23° C.) for 40 hours by using a ball mill machine. For this operation, the container was set to the ball mill machine as it was without removing the contents therefrom, and the container was rotated at a speed of 120 rpm. Hence, both the first and the second milling operation were performed with the same glass beads. The liquid subjected to the milling operation was passed through a filter (N-NO. 125T, pore size: 133 μm, manufactured by NBC Meshtec) to remove the glass beads. After adding 30 parts of dimethyl sulfoxide to the resulting liquid, the mixture was filtered, and the filtration product remaining on the filter was sufficiently washed with tetrahydrofuran. Then, the resulting filtration product was vacuum-dried to yield 0.47 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 31 nm.

The volume average particle size R of the hydroxygallium phthalocyanine pigment in the charge generating layer, which was estimated from the particle size distribution obtained using the SEM micrograph, was 162 nm. In the particle size distribution, the volume frequency of the occurrence of particles having a particle size in the range of 60 nm to 200 nm was 72%. From the crystallite correlation length r and the volume average particle size R, parameter k (=r/R) was 0.19.

Example 60

An electrophotographic photosensitive member of Example 60 was produced in the same manner as in Example 59, except that the time for the second milling operation using the ball mill machine was changed from 40 hours to 100 hours. The crystallite correlation length r of the resulting pigment, which was estimated from the peak at 7.5°±0.2° that was the strongest of the peaks in the CuKα X-ray diffraction spectrum, was 31 nm.

The volume average particle size R of the hydroxygallium phthalocyanine pigment in the charge generating layer, which was estimated from the particle size distribution obtained using the SEM micrograph, was 161 nm. In the particle size distribution, the volume frequency of the occurrence of particles having a particle size in the range of 60 nm to 200 nm was 74%. From the crystallite correlation length r and the volume average particle size R, parameter k (=r/R) was 0.19.

Example 61

An electrophotographic photosensitive member of Example 61 was produced in the same manner as in Example 59, except that the time for the second milling operation using the ball mill machine was changed from 40 hours to 300 hours. The crystallite correlation length r of the resulting pigment, which was estimated from the peak at 7.5°±0.2° that was the strongest of the peaks in the CuKα X-ray diffraction spectrum, was 34 nm.

The volume average particle size R of the hydroxygallium phthalocyanine pigment in the charge generating layer, which was estimated from the particle size distribution obtained using the SEM micrograph, was 158 nm. In the particle size distribution, the volume frequency of the occurrence of particles having a particle size in the range of 60 nm to 200 nm was 76%. From the crystallite correlation length r and the volume average particle size R, parameter k (=r/R) was 0.21.

Example 62

An electrophotographic photosensitive member of Example 62 was produced in the same manner as in Example 59, except that the time for the second milling operation using the ball mill machine was changed from 40 hours to 1,000 hours. The crystallite correlation length r of the resulting pigment, which was estimated from the peak at 7.5°±0.2° that was the strongest of the peaks in the CuKα X-ray diffraction spectrum, was 34 nm.

The volume average particle size R of the hydroxygallium phthalocyanine pigment in the charge generating layer, which was estimated from the particle size distribution obtained using the SEM micrograph, was 155 nm. In the particle size distribution, the volume frequency of the occurrence of particles having a particle size in the range of 60 nm to 200 nm was 79%. From the crystallite correlation length r and the volume average particle size R, parameter k (=r/R) was 0.22.

Example 63

An electrophotographic photosensitive member of Example 63 was produced in the same manner as in Example 59, except that the time for the second milling operation using the ball mill machine was changed from 40 hours to 2,000 hours. The crystallite correlation length r of the resulting pigment, which was estimated from the peak at 7.5°±0.2° that was the strongest of the peaks in the CuKα X-ray diffraction spectrum, was 36 nm.

The volume average particle size R of the hydroxygallium phthalocyanine pigment in the charge generating layer, which was estimated from the particle size distribution obtained using the SEM micrograph, was 151 nm. In the particle size distribution, the volume frequency of the occurrence of particles having a particle size in the range of 60 nm to 200 nm was 81%. From the crystallite correlation length r and the volume average particle size R, parameter k (=r/R) was 0.24.

Example 64

An electrophotographic photosensitive member of Example 64 was produced in the same manner as in Example 1, except that the process for forming the charge generating layer was changed as below.

In the first milling operation, 0.5 part of the chlorogallium phthalocyanine pigment produced in Synthesis Example 4 and 10 parts of N,N-dimethylformamide D0722 (manufactured by Tokyo Chemical Industry) were subjected to milling with 15 parts of glass beads of 0.9 mm in diameter with a paint shaker (manufactured by Toyo Seiki) at room temperature (23° C.) for 1 hour.

For this operation, a standard bottle PS-6 (manufactured by Hakuyo Glass) was used as the container. The liquid subjected to the milling operation was filtered through a filter (N-NO. 125T, pore size: 133 μm, manufactured by NBC Meshtec) to remove the glass beads. The resulting liquid was further subjected to milling (second milling operation) at room temperature (23° C.) for 20 hours by using a ball mill machine. This operation was performed in the standard bottle PS-6 (manufactured by Hakuyo Glass) under the condition where the bottle was rotated at a speed of 120 rpm. In this operation, media, such as glass beads, were not used. After adding 30 parts of N,N-dimethylformamide to the resulting liquid, the mixture was filtered, and the filtration product remaining on the filter was sufficiently washed with tetrahydrofuran. Then, the washed filtration product was vacuum-dried to yield 0.47 part of a chlorogallium phthalocyanine pigment.

The resulting pigment was exhibited peaks at Bragg angles 2θ of 7.4°±0.2°, 16.6°±0.2°, 25.5°±0.2°, and 28.3°±0.2° in the CuKα X-ray diffraction spectrum thereof. The crystallite correlation length r, which was estimated from the peak at 7.4° that was the strongest of the peaks in the range of 5° to 35°, was 29 nm. Subsequently, 30 parts of the chlorogallium phthalocyanine pigment subjected to the above-described milling operation, 10 parts of a polyvinyl butyral S-LEC BX-1 (produced by Sekisui Chemical), and 253 parts of cyclohexanone were dispersed in each other with 643 parts of glass beads of 0.9 mm in diameter in a sand mill K-800 (manufactured by Aimex, disk diameter: 70 mm, 5 disks) for 4 hours with cooling water of 18° C. This operation was performed under the condition where the disks were rotated at 1,800 rpm. To the resulting dispersion liquid were added 592 parts of cyclohexanone and 845 parts of ethyl acetate to yield a coating liquid for forming a charge generating layer. This coating liquid was applied to the surface of the undercoat layer by dipping. The resulting coating film was heated to dry at 100° C. for 10 minutes to yield a 0.19 μm-thick charge generating layer.

The volume average particle size R of the chlorogallium phthalocyanine pigment in the charge generating layer, which was estimated from the particle size distribution obtained using the SEM micrograph, was 132 nm. In the particle size distribution, the volume frequency of range of 60 nm to 200 nm was 79%. From the crystallite correlation length r and the volume average particle size R, parameter k (=r/R) was 0.22.

Example 65

An electrophotographic photosensitive member of Example 65 was produced in the same manner as in Example 64, except that the time for the second milling operation using the ball mill machine was changed from 20 hours to 40 hours. The crystallite correlation length r of the resulting pigment, which was estimated from the peak at 7.4° that was the strongest of the peaks in the CuKα X-ray diffraction spectrum, was 31 nm.

The volume average particle size R of the chlorogallium phthalocyanine pigment in the charge generating layer, which was estimated from the particle size distribution obtained using the SEM micrograph, was 128 nm. In the particle size distribution, the volume frequency of the occurrence of particles having a particle size in the range of 60 nm to 200 nm was 81%. From the crystallite correlation length r and the volume average particle size R, parameter k (=r/R) was 0.24.

Example 66

An electrophotographic photosensitive member of Example 66 was produced in the same manner as in Example 64, except that the time for the second milling operation using the ball mill machine was changed from 20 hours to 100 hours. The crystallite correlation length r of the resulting pigment, which was estimated from the peak at 7.4° that was the strongest of the peaks in the CuKα X-ray diffraction spectrum, was 34 nm.

The volume average particle size R of the chlorogallium phthalocyanine pigment in the charge generating layer, which was estimated from the particle size distribution obtained using the SEM micrograph, was 123 nm. In the particle size distribution, the volume frequency of the occurrence of particles having a particle size in the range of 60 nm to 200 nm was 82%. From the crystallite correlation length r and the volume average particle size R, parameter k (=r/R) was 0.27.

Example 67

An electrophotographic photosensitive member of Example 67 was produced in the same manner as in Example 64, except that the time for the second milling operation using the ball mill machine was changed from 20 hours to 300 hours. The crystallite correlation length r of the resulting pigment, which was estimated from the peak at 7.4° that was the strongest of the peaks in the CuKα X-ray diffraction spectrum, was 34 nm.

The volume average particle size R of the chlorogallium phthalocyanine pigment in the charge generating layer, which was estimated from the particle size distribution obtained using the SEM micrograph, was 120 nm. In the particle size distribution, the volume frequency of the occurrence of particles having a particle size in the range of 60 nm to 200 nm was 84%. From the crystallite correlation length r and the volume average particle size R, parameter k (=r/R) was 0.28.

Example 68

An electrophotographic photosensitive member of Example 68 was produced in the same manner as in Example 64, except that the second milling operation in the process for producing the chlorogallium phthalocyanine pigment was changed as below.

In the first milling operation, 0.5 part of the chlorogallium phthalocyanine pigment produced in Synthesis Example 4 and 10 parts of N,N-dimethylformamide D0722 (manufactured by Tokyo Chemical Industry) were subjected to milling with 15 parts of glass beads of 0.9 mm in diameter with a paint shaker (manufactured by Toyo Seiki) at room temperature (23° C.) for 1 hour.

For this operation, a standard bottle PS-6 (manufactured by Hakuyo Glass) was used as the container. The resulting liquid was further subjected to milling (second milling operation) at room temperature (23° C.) for 20 hours by using a ball mill machine. For this operation, the container was set to the ball mill machine as it was without removing the contents therefrom, and the container was rotated at a speed of 120 rpm. Hence, both the first and the second milling operation were performed with the same glass beads. The liquid subjected to the milling operation was passed through a filter (N-NO. 125T, pore size: 133 μm, manufactured by NBC Meshtec) to remove the glass beads. After adding 30 parts of N,N-dimethylformamide to the resulting liquid, the mixture was filtered, and the filtration product remaining on the filter was sufficiently washed with tetrahydrofuran. Then, the washed filtration product was vacuum-dried to yield 0.47 part of a chlorogallium phthalocyanine pigment. The crystallite correlation length r of the resulting pigment, which was estimated from the peak at 7.4° that was the strongest of the peaks in the CuKα X-ray diffraction spectrum, was 31 nm.

The volume average particle size R of the chlorogallium phthalocyanine pigment in the charge generating layer, which was estimated from the particle size distribution obtained using the SEM micrograph, was 127 nm. In the particle size distribution, the volume frequency of the occurrence of particles having a particle size in the range of 60 nm to 200 nm was 81%. From the crystallite correlation length r and the volume average particle size R, parameter k (=r/R) was 0.25.

Example 69

An electrophotographic photosensitive member of Example 69 was produced in the same manner as in Example 68, except that the time for the second milling operation using the ball mill machine was changed from 20 hours to 40 hours. The crystallite correlation length r of the resulting pigment, which was estimated from the peak at 7.4° that was the strongest of the peaks in the CuKα X-ray diffraction spectrum, was 34 nm.

The volume average particle size R of the chlorogallium phthalocyanine pigment in the charge generating layer, which was estimated from the particle size distribution obtained using the SEM micrograph, was 124 nm. In the particle size distribution, the volume frequency of the occurrence of particles having a particle size in the range of 60 nm to 200 nm was 83%. From the crystallite correlation length r and the volume average particle size R, parameter k (=r/R) was 0.27.

Example 70

An electrophotographic photosensitive member of Example 70 was produced in the same manner as in Example 68, except that the time for the second milling operation using the ball mill machine was changed from 20 hours to 100 hours. The crystallite correlation length r of the resulting pigment, which was estimated from the peak at 7.4° that was the strongest of the peaks in the CuKα X-ray diffraction spectrum, was 36 nm.

The volume average particle size R of the chlorogallium phthalocyanine pigment in the charge generating layer, which was estimated from the particle size distribution obtained using the SEM micrograph, was 120 nm. In the particle size distribution, the volume frequency of the occurrence of particles having a particle size in the range of 60 nm to 200 nm was 86%. From the crystallite correlation length r and the volume average particle size R, parameter k (=r/R) was 0.30.

Example 71

An electrophotographic photosensitive member of Example 71 was produced in the same manner as in Example 68, except that the time for the second milling operation using the ball mill machine was changed from 20 hours to 300 hours. The crystallite correlation length r of the resulting pigment, which was estimated from the peak at 7.4° that was the strongest of the peaks in the CuKα X-ray diffraction spectrum, was 36 nm.

The volume average particle size R of the chlorogallium phthalocyanine pigment in the charge generating layer, which was estimated from the particle size distribution obtained using the SEM micrograph, was 118 nm. In the particle size distribution, the volume frequency of the occurrence of particles having a particle size in the range of 60 nm to 200 nm was 88%. From the crystallite correlation length r and the volume average particle size R, parameter k (=r/R) was 0.31.

Example 72

An electrophotographic photosensitive member of Example 72 was produced in the same manner as in Example 64, except that the second milling operation in the process for producing the chlorogallium phthalocyanine pigment was changed as below.

In the first milling operation, 0.5 part of the chlorogallium phthalocyanine pigment produced in Synthesis Example 4 and 10 parts of N,N-dimethylformamide D0722 (manufactured by Tokyo Chemical Industry) were subjected to milling with 15 parts of glass beads of 0.9 mm in diameter with a paint shaker (manufactured by Toyo Seiki) at room temperature (23° C.) for 1 hour. For this operation, a standard bottle PS-6 (manufactured by Hakuyo Glass) was used as the container. The liquid subjected to the milling operation was filtered through a filter (N-NO. 125T, pore size: 133 μm, manufactured by NBC Meshtec) to remove the glass beads. The resulting liquid was further subjected to milling (second milling operation) with a magnetic stirrer at room temperature (23° C.) for 10 hours. This operation was performed in the standard bottle PS-6 (manufactured by Hakuyo Glass) under the condition where the stirring bar was rotated at a speed of 1,500 rpm. In this operation, media, such as glass beads, were not used. After adding 30 parts of N,N-dimethylformamide to the resulting liquid, the mixture was filtered, and the filtration product remaining on the filter was sufficiently washed with tetrahydrofuran. Then, the washed filtration product was vacuum-dried to yield 0.47 part of a chlorogallium phthalocyanine pigment. The crystallite correlation length r of the resulting pigment, which was estimated from the peak at 7.4° that was the strongest of the peaks in the CuKα X-ray diffraction spectrum, was 27 nm.

The volume average particle size R of the chlorogallium phthalocyanine pigment in the charge generating layer, which was estimated from the particle size distribution obtained using the SEM micrograph, was 135 nm. In the particle size distribution, the volume frequency of the occurrence of particles having a particle size in the range of 60 nm to 200 nm was 78%. From the crystallite correlation length r and the volume average particle size R, parameter k (=r/R) was 0.20.

Example 73

An electrophotographic photosensitive member of Example 73 was produced in the same manner as in Example 72, except that the time for the second milling operation using the magnetic stirrer was changed from 10 hours to 20 hours. The crystallite correlation length r of the resulting pigment, which was estimated from the peak at 7.4° that was the strongest of the peaks in the CuKα X-ray diffraction spectrum, was 29 nm.

The volume average particle size R of the chlorogallium phthalocyanine pigment in the charge generating layer, which was estimated from the particle size distribution obtained using the SEM micrograph, was 133 nm. In the particle size distribution, the volume frequency of the occurrence of particles having a particle size in the range of 60 nm to 200 nm was 80%. From the crystallite correlation length r and the volume average particle size R, parameter k (=r/R) was 0.22.

Example 74

An electrophotographic photosensitive member of Example 74 was produced in the same manner as in Example 72, except that the time for the second milling operation using the magnetic stirrer was changed from 10 hours to 40 hours. The crystallite correlation length r of the resulting pigment, which was estimated from the peak at 7.4° that was the strongest of the peaks in the CuKα X-ray diffraction spectrum, was 29 nm.

The volume average particle size R of the chlorogallium phthalocyanine pigment in the charge generating layer, which was estimated from the particle size distribution obtained using the SEM micrograph, was 130 nm. In the particle size distribution, the volume frequency of the occurrence of particles having a particle size in the range of 60 nm to 200 nm was 82%. From the crystallite correlation length r and the volume average particle size R, parameter k (=r/R) was 0.22.

Example 75

An electrophotographic photosensitive member of Example 75 was produced in the same manner as in Example 64, except that the second milling operation in the process for producing the chlorogallium phthalocyanine pigment was changed as below.

In the first milling operation, 0.5 part of the chlorogallium phthalocyanine pigment produced in Synthesis Example 4 and 10 parts of N,N-dimethylformamide D0722 (manufactured by Tokyo Chemical Industry) were subjected to milling with 15 parts of glass beads of 0.9 mm in diameter with a paint shaker (manufactured by Toyo Seiki) at room temperature (23° C.) for 1 hour.

For this operation, a standard bottle PS-6 (manufactured by Hakuyo Glass) was used as the container. The liquid subjected to the milling operation was filtered through a filter (N-NO. 125T, pore size: 133 μm, manufactured by NBC Meshtec) to remove the glass beads. The resulting liquid was further subjected to milling (second milling operation) with an ultrasonic disperser UT-205 (manufactured by Sharp) at room temperature (23° C.) for 1 hour. For this operation, a standard bottle PS-6 (manufactured by Hakuyo Glass) was used as the container, and the power of the ultrasonic disperser was 100%. In this operation, media, such as glass beads, were not used. After adding 30 parts of N,N-dimethylformamide to the resulting liquid, the mixture was filtered, and the filtration product remaining on the filter was sufficiently washed with tetrahydrofuran. Then, the washed filtration product was vacuum-dried to yield 0.47 part of a chlorogallium phthalocyanine pigment. The crystallite correlation length r of the resulting pigment, which was estimated from the peak at 7.4° that was the strongest of the peaks in the CuKα X-ray diffraction spectrum, was 29 nm.

The volume average particle size R of the chlorogallium phthalocyanine pigment in the charge generating layer, which was estimated from the particle size distribution obtained using the SEM micrograph, was 134 nm. In the particle size distribution, the volume frequency of the occurrence of particles having a particle size in the range of 60 nm to 200 nm was 81%. From the crystallite correlation length r and the volume average particle size R, parameter k (=r/R) was 0.22.

Example 76

An electrophotographic photosensitive member of Example 76 was produced in the same manner as in Example 75, except that the time for the second milling operation using the ultrasonic disperser was changed from 1 hour to 5 hours. The crystallite correlation length r of the resulting pigment, which was estimated from the peak at 7.4° that was the strongest of the peaks in the CuKα X-ray diffraction spectrum, was 31 nm.

The volume average particle size R of the chlorogallium phthalocyanine pigment in the charge generating layer, which was estimated from the particle size distribution obtained using the SEM micrograph, was 127 nm. In the particle size distribution, the volume frequency of the occurrence of particles having a particle size in the range of 60 nm to 200 nm was 82%. From the crystallite correlation length r and the volume average particle size R, parameter k (=r/R) was 0.25.

Example 77

An electrophotographic photosensitive member of Example 77 was produced in the same manner as in Example 64, except that the process for producing the chlorogallium phthalocyanine pigment was changed as below.

In the first milling operation, 0.5 part of the chlorogallium phthalocyanine pigment produced in Synthesis Example 4 and 10 parts of N-methylformamide F0059 (manufactured by Tokyo Chemical Industry) were subjected to milling with 15 parts of glass beads of 0.9 mm in diameter with a paint shaker (manufactured by Toyo Seiki) at room temperature (23° C.) for 1 hour. For this operation, a standard bottle PS-6 (manufactured by Hakuyo Glass) was used as the container. The liquid subjected to the milling operation was filtered through a filter (N-NO. 125T, pore size: 133 μm, manufactured by NBC Meshtec) to remove the glass beads. The resulting liquid was further subjected to milling (second milling operation) at room temperature (23° C.) for 20 hours by using a ball mill machine. This operation was performed in the standard bottle PS-6 (manufactured by Hakuyo Glass) under the condition where the bottle was rotated at a speed of 120 rpm. In this operation, media, such as glass beads, were not used. After adding 30 parts of N-methylformamide to the resulting liquid, the mixture was filtered, and the filtration product remaining on the filter was sufficiently washed with tetrahydrofuran. Then, the washed filtration product was vacuum-dried to yield 0.46 part of a chlorogallium phthalocyanine pigment. The crystallite correlation length r of the resulting pigment, which was estimated from the peak at 7.4° that was the strongest of the peaks in the CuKα X-ray diffraction spectrum, was 27 nm.

The volume average particle size R of the chlorogallium phthalocyanine pigment in the charge generating layer, which was estimated from the particle size distribution obtained using the SEM micrograph, was 144 nm. In the particle size distribution, the volume frequency of the occurrence of particles having a particle size in the range of 60 nm to 200 nm was 74%. From the crystallite correlation length r and the volume average particle size R, parameter k (=r/R) was 0.19.

Example 78

An electrophotographic photosensitive member of Example 78 was produced in the same manner as in Example 77, except that the time for the second milling operation using the ball mill was changed from 20 hours to 40 hours. The crystallite correlation length r of the resulting pigment, which was estimated from the peak at 7.4° that was the strongest of the peaks in the CuKα X-ray diffraction spectrum, was 27 nm.

The volume average particle size R of the chlorogallium phthalocyanine pigment in the charge generating layer, which was estimated from the particle size distribution obtained using the SEM micrograph, was 141 nm. In the particle size distribution, the volume frequency of the occurrence of particles having a particle size in the range of 60 nm to 200 nm was 77%. From the crystallite correlation length r and the volume average particle size R, parameter k (=r/R) was 0.19.

Example 79

An electrophotographic photosensitive member of Example 79 was produced in the same manner as in Example 77, except that the time for the second milling operation using the ball mill was changed from 20 hours to 100 hours. The crystallite correlation length r of the resulting pigment, which was estimated from the peak at 7.4° that was the strongest of the peaks in the CuKα X-ray diffraction spectrum, was 29 nm.

The volume average particle size R of the chlorogallium phthalocyanine pigment in the charge generating layer, which was estimated from the particle size distribution obtained using the SEM micrograph, was 139 nm. In the particle size distribution, the volume frequency of the occurrence of particles having a particle size in the range of 60 nm to 200 nm was 79%. From the crystallite correlation length r and the volume average particle size R, parameter k (=r/R) was 0.21.

Example 80

An electrophotographic photosensitive member of Example 80 was produced in the same manner as in Example 77, except that the time for the second milling operation using the ball mill was changed from 20 hours to 300 hours. The crystallite correlation length r of the resulting pigment, which was estimated from the peak at 7.4° that was the strongest of the peaks in the CuKα X-ray diffraction spectrum, was 31 nm.

The volume average particle size R of the chlorogallium phthalocyanine pigment in the charge generating layer, which was estimated from the particle size distribution obtained using the SEM micrograph, was 135 nm. In the particle size distribution, the volume frequency of the occurrence of particles having a particle size in the range of 60 nm to 200 nm was 82%. From the crystallite correlation length r and the volume average particle size R, parameter k (=r/R) was 0.23.

Example 81

An electrophotographic photosensitive member of Example 81 was produced in the same manner as in Example 77, except that the second milling operation in the process for producing the chlorogallium phthalocyanine pigment was changed as below.

In the first milling operation, 0.5 part of the chlorogallium phthalocyanine pigment produced in Synthesis Example 4 and 10 parts of N-methylformamide F0059 (manufactured by Tokyo Chemical Industry) were subjected to milling with 15 parts of glass beads of 0.9 mm in diameter with a paint shaker (manufactured by Toyo Seiki) at room temperature (23° C.) for 1 hour. For this operation, a standard bottle PS-6 (manufactured by Hakuyo Glass) was used as the container. The resulting liquid was further subjected to milling (second milling operation) at room temperature (23° C.) for 20 hours by using a ball mill machine. For this operation, the container was set to the ball mill machine as it was without removing the contents therefrom, and the container was rotated at a speed of 120 rpm. Hence, both the first and the second milling operation were performed with the same glass beads. The liquid subjected to the milling operation was passed through a filter (N-NO. 125T, pore size: 133 μm, manufactured by NBC Meshtec) to remove the glass beads. After adding 30 parts of N-methylformamide to the resulting liquid, the mixture was filtered, and the filtration product remaining on the filter was sufficiently washed with tetrahydrofuran. Then, the washed filtration product was vacuum-dried to yield 0.46 part of a chlorogallium phthalocyanine pigment. The crystallite correlation length r of the resulting pigment, which was estimated from the peak at 7.4° that was the strongest of the peaks in the CuKα X-ray diffraction spectrum, was 29 nm.

The volume average particle size R of the chlorogallium phthalocyanine pigment in the charge generating layer, which was estimated from the particle size distribution obtained using the SEM micrograph, was 140 nm. In the particle size distribution, the volume frequency of the occurrence of particles having a particle size in the range of 60 nm to 200 nm was 78%. From the crystallite correlation length r and the volume average particle size R, parameter k (=r/R) was 0.21.

Example 82

An electrophotographic photosensitive member of Example 82 was produced in the same manner as in Example 81, except that the time for the second milling operation using the ball mill machine was changed from 20 hours to 40 hours. The crystallite correlation length r of the resulting pigment, which was estimated from the peak at 7.4° that was the strongest of the peaks in the CuKα X-ray diffraction spectrum, was 29 nm.

The volume average particle size R of the chlorogallium phthalocyanine pigment in the charge generating layer, which was estimated from the particle size distribution obtained using the SEM micrograph, was 137 nm. In the particle size distribution, the volume frequency of the occurrence of particles having a particle size in the range of 60 nm to 200 nm was 79%. From the crystallite correlation length r and the volume average particle size R, parameter k (=r/R) was 0.21.

Example 83

An electrophotographic photosensitive member of Example 83 was produced in the same manner as in Example 81, except that the time for the second milling operation using the ball mill machine was changed from 20 hours to 100 hours. The crystallite correlation length r of the resulting pigment, which was estimated from the peak at 7.4° that was the strongest of the peaks in the CuKα X-ray diffraction spectrum, was 31 nm.

The volume average particle size R of the chlorogallium phthalocyanine pigment in the charge generating layer, which was estimated from the particle size distribution obtained using the SEM micrograph, was 135 nm. In the particle size distribution, the volume frequency of the occurrence of particles having a particle size in the range of 60 nm to 200 nm was 81%. From the crystallite correlation length r and the volume average particle size R, parameter k (=r/R) was 0.23.

Example 84

An electrophotographic photosensitive member of Example 84 was produced in the same manner as in Example 81, except that the time for the second milling operation using the ball mill machine was changed from 20 hours to 300 hours. The crystallite correlation length r of the resulting pigment, which was estimated from the peak at 7.4° that was the strongest of the peaks in the CuKα X-ray diffraction spectrum, was 34 nm.

The volume average particle size R of the chlorogallium phthalocyanine pigment in the charge generating layer, which was estimated from the particle size distribution obtained using the SEM micrograph, was 131 nm. In the particle size distribution, the volume frequency of the occurrence of particles having a particle size in the range of 60 nm to 200 nm was 83%. From the crystallite correlation length r and the volume average particle size R, parameter k (=r/R) was 0.26.

Example 85

An electrophotographic photosensitive member of Example 85 was produced in the same manner as in Example 64, except that the process for producing the chlorogallium phthalocyanine pigment was changed as below.

In the first milling operation, 0.5 part of the chlorogallium phthalocyanine pigment produced in Synthesis Example 4 and 10 parts of dimethyl sulfoxide D0798 (manufactured by Tokyo Chemical Industry) were subjected to milling with 15 parts of glass beads of 0.9 mm in diameter with a paint shaker (manufactured by Toyo Seiki) at room temperature (23° C.) for 1 hour. For this operation, a standard bottle PS-6 (manufactured by Hakuyo Glass) was used as the container. The liquid subjected to the milling operation was filtered through a filter (N-NO. 125T, pore size: 133 µm, manufactured by NBC Meshtec) to remove the glass beads. The resulting liquid was further subjected to milling (second milling operation) at room temperature (23° C.) for 20 hours by using a ball mill machine. This operation was performed in the standard bottle PS-6 (manufactured by Hakuyo Glass) under the condition where the bottle was rotated at a speed of 120 rpm. In this operation, media, such as glass beads, were not used. After adding 30 parts of dimethyl sulfoxide to the resulting liquid, the mixture was filtered, and the filtration product remaining on the filter was sufficiently washed with tetrahydrofuran. Then, the washed filtration product was vacuum-dried to yield 0.46 part of a chlorogallium phthalocyanine pigment. The crystallite correlation length r of the resulting pigment, which was estimated from the peak at 7.4° that was the strongest of the peaks in the CuKα X-ray diffraction spectrum, was 27 nm.

The volume average particle size R of the chlorogallium phthalocyanine pigment in the charge generating layer, which was estimated from the particle size distribution obtained using the SEM micrograph, was 142 nm. In the particle size distribution, the volume frequency of the occurrence of particles having a particle size in the range of 60 nm to 200 nm was 77%. From the crystallite correlation length r and the volume average particle size R, parameter k (=r/R) was 0.19.

Example 86

An electrophotographic photosensitive member of Example 86 was produced in the same manner as in Example 85, except that the time for the second milling operation using the ball mill machine was changed from 20 hours to 40 hours. The crystallite correlation length r of the resulting pigment, which was estimated from the peak at 7.4° that was the strongest of the peaks in the CuKα X-ray diffraction spectrum, was 29 nm.

The volume average particle size R of the chlorogallium phthalocyanine pigment in the charge generating layer, which was estimated from the particle size distribution obtained using the SEM micrograph, was 138 nm. In the particle size distribution, the volume frequency of the occurrence of particles having a particle size in the range of 60 nm to 200 nm was 79%. From the crystallite correlation length r and the volume average particle size R, parameter k (=r/R) was 0.21.

Example 87

An electrophotographic photosensitive member of Example 87 was produced in the same manner as in Example 85, except that the time for the second milling operation using the ball mill machine was changed from 20 hours to 100 hours. The crystallite correlation length r of the resulting pigment, which was estimated from the peak at 7.4° that was the strongest of the peaks in the CuKα X-ray diffraction spectrum, was 31 nm.

The volume average particle size R of the chlorogallium phthalocyanine pigment in the charge generating layer, which was estimated from the particle size distribution obtained using the SEM micrograph, was 135 nm. In the particle size distribution, the volume frequency of the occurrence of particles having a particle size in the range of 60 nm to 200 nm was 81%. From the crystallite correlation length r and the volume average particle size R, parameter k (=r/R) was 0.23.

Example 88

An electrophotographic photosensitive member of Example 88 was produced in the same manner as in Example 85, except that the time for the second milling operation using the ball mill machine was changed from 20 hours to 300 hours. The crystallite correlation length r of the resulting pigment, which was estimated from the peak at 7.4° that was the strongest of the peaks in the CuKα X-ray diffraction spectrum, was 31 nm.

The volume average particle size R of the chlorogallium phthalocyanine pigment in the charge generating layer, which was estimated from the particle size distribution obtained using the SEM micrograph, was 131 nm. In the particle size distribution, the volume frequency of the occurrence of particles having a particle size in the range of 60 nm to 200 nm was 84%. From the crystallite correlation length r and the volume average particle size R, parameter k (=r/R) was 0.24.

Example 89

An electrophotographic photosensitive member of Example 89 was produced in the same manner as in Example 85, except that the second milling operation in the process for producing the chlorogallium phthalocyanine pigment was changed as below.

In the first milling operation, 0.5 part of the chlorogallium phthalocyanine pigment produced in Synthesis Example 4 and 10 parts of dimethyl sulfoxide D0798 (manufactured by Tokyo Chemical Industry) were subjected to milling with 15 parts of glass beads of 0.9 mm in diameter with a paint shaker (manufactured by Toyo Seiki) at room temperature (23° C.) for 1 hour. For this operation, a standard bottle PS-6 (manufactured by Hakuyo Glass) was used as the container. The resulting liquid was further subjected to milling (second milling operation) at room temperature (23° C.) for 20 hours by using a ball mill machine. For this operation, the container was set to the ball mill machine as it was without removing the contents therefrom, and the container was rotated at a speed of 120 rpm. Hence, both the first and the second milling operation were performed with the same glass beads. After adding 30 parts of dimethyl sulfoxide to the resulting liquid, the mixture was filtered, and the filtration product remaining on the filter was sufficiently washed with tetrahydrofuran. Then, the washed filtration product was vacuum-dried to yield 0.46 part of a chlorogallium phthalocyanine pigment. The crystallite correlation length r of the resulting pigment, which was estimated from the peak at 7.4° that was the strongest of the peaks in the CuKα X-ray diffraction spectrum, was 29 nm.

The volume average particle size R of the chlorogallium phthalocyanine pigment in the charge generating layer, which was estimated from the particle size distribution obtained using the SEM micrograph, was 138 nm. In the particle size distribution, the volume frequency of the occurrence of particles having a particle size in the range of 60 nm to 200 nm was 82%. From the crystallite correlation length r and the volume average particle size R, parameter k (=r/R) was 0.21.

Example 90

An electrophotographic photosensitive member of Example 90 was produced in the same manner as in Example 89, except that the time for the second milling operation using the ball mill machine was changed from 20 hours to 40 hours. The crystallite correlation length r of the resulting pigment, which was estimated from the peak at 7.4° that was the strongest of the peaks in the CuKα X-ray diffraction spectrum, was 31 nm.

The volume average particle size R of the chlorogallium phthalocyanine pigment in the charge generating layer, which was estimated from the particle size distribution obtained using the SEM micrograph, was 133 nm. In the particle size distribution, the volume frequency of the occurrence of particles having a particle size in the range of 60 nm to 200 nm was 84%. From the crystallite correlation length r and the volume average particle size R, parameter k (=r/R) was 0.23.

Example 91

An electrophotographic photosensitive member of Example 91 was produced in the same manner as in Example 89, except that the time for the second milling operation using the ball mill machine was changed from 20 hours to 100 hours. The crystallite correlation length r of the resulting pigment, which was estimated from the peak at 7.4° that was the strongest of the peaks in the CuKα X-ray diffraction spectrum, was 34 nm.

The volume average particle size R of the chlorogallium phthalocyanine pigment in the charge generating layer, which was estimated from the particle size distribution obtained using the SEM micrograph, was 130 nm. In the particle size distribution, the volume frequency of the occurrence of particles having a particle size in the range of 60 nm to 200 nm was 85%. From the crystallite correlation length r and the volume average particle size R, parameter k (=r/R) was 0.26.

Example 92

An electrophotographic photosensitive member of Example 92 was produced in the same manner as in Example 89, except that the time for the second milling operation using the ball mill machine was changed from 20 hours to 300 hours. The crystallite correlation length r of the resulting pigment, which was estimated from the peak at 7.4° that was the strongest of the peaks in the CuKα X-ray diffraction spectrum, was 34 nm.

The volume average particle size R of the chlorogallium phthalocyanine pigment in the charge generating layer, which was estimated from the particle size distribution obtained using the SEM micrograph, was 122 nm. In the particle size distribution, the volume frequency of the occurrence of particles having a particle size in the range of 60 nm to 200 nm was 86%. From the crystallite correlation length r and the volume average particle size R, parameter k (=r/R) was 0.28.

Example 93

An electrophotographic photosensitive member of Example 93 was produced in the same manner as in Example 1, except that the process for forming the charge generating layer was changed as below.

In the first milling operation, 0.5 part of the titanyl phthalocyanine pigment produced in Synthesis Example 5 and 10 parts of tetrahydrofuran were subjected to milling with 15 parts of glass beads of 0.9 mm in diameter with a paint shaker (manufactured by Toyo Seiki) at room temperature (23° C.) for 3 hours. For this operation, a standard bottle PS-6 (manufactured by Hakuyo Glass) was used as the container. The liquid subjected to the milling operation was filtered through a filter (N-NO. 125T, pore size: 133 μm, manufactured by NBC Meshtec) to remove the glass beads. The resulting liquid was further subjected to milling (second milling operation) at room temperature (23° C.) for 40 hours by using a ball mill machine. This operation was performed in the standard bottle PS-6 (manufactured by Hakuyo Glass) under the condition where the bottle was rotated at a speed of 120 rpm. In this operation, media, such as glass beads, were not used. After adding 30 parts of tetrahydrofuran to the resulting liquid, the mixture was filtered, and the filtration product remaining on the filter was sufficiently washed with methanol and water. Then, the washed filtration product was vacuum-dried to yield 0.44 part of a titanyl phthalocyanine pigment. The resulting pigment was exhibited peaks at a Bragg angle 2θ of 27.2°±0.2° in the CuKα X-ray diffraction spectrum thereof. The crystallite correlation length r, which was estimated from the peak at 27.2°±0.2° that was the strongest peak in the range of 5° to 35°, was 31 nm.

Subsequently, 12 parts of the titanyl phthalocyanine pigment subjected to the above-described milling operation, 10 parts of a polyvinyl butyral S-LEC BX-1 (produced by Sekisui Chemical), and 139 parts of cyclohexanone were dispersed in each other with 354 parts of glass beads of 0.9 mm in diameter in a sand mill K-800 (manufactured by Aimex, disk diameter: 70 mm, 5 disks) for 4 hours with cooling water of 18° C. This operation was performed under the condition where the disks were rotated at 1,800 rpm. To the resulting dispersion liquid were added 326 parts of cyclohexanone and 465 parts of ethyl acetate to yield a coating liquid for forming a charge generating layer. This coating liquid was applied to the surface of the undercoat layer by dipping. The resulting coating film was heated to dry at 100° C. for 10 minutes to yield a 0.14 μm-thick charge generating layer.

The volume average particle size R of the titanyl phthalocyanine pigment in the charge generating layer, which was estimated from the particle size distribution obtained using the SEM micrograph, was 168 nm. In the particle size distribution, the volume frequency of the occurrence of particles having a particle size in the range of 60 nm to 200 nm was 74%. From the crystallite correlation length r and the volume average particle size R, parameter k (=r/R) was 0.19.

Example 94

An electrophotographic photosensitive member of Example 94 was produced in the same manner as in Example 93, except that the time for the second milling operation using the ball mill machine was changed from 40 hours to 100 hours. The crystallite correlation length r of the resulting pigment, which was estimated from the peak at 27.2°±0.2° that was the strongest peak in the CuKα X-ray diffraction spectrum, was 34 nm.

The volume average particle size R of the titanyl phthalocyanine pigment in the charge generating layer, which was estimated from the particle size distribution obtained using the SEM micrograph, was 164 nm. In the particle size distribution, the volume frequency of the occurrence of particles having a particle size in the range of 60 nm to 200 nm was 79%. From the crystallite correlation length r and the volume average particle size R, parameter k (=r/R) was 0.20.

Example 95

An electrophotographic photosensitive member of Example 95 was produced in the same manner as in Example 93, except that the time for the second milling operation using the ball mill machine was changed from 40 hours to 300 hours. The crystallite correlation length r of the resulting pigment, which was estimated from the peak at 27.2°±0.2° that was the strongest peak in the CuKα X-ray diffraction spectrum, was 36 nm.

The volume average particle size R of the titanyl phthalocyanine pigment in the charge generating layer, which was estimated from the particle size distribution obtained using the SEM micrograph, was 158 nm. In the particle size distribution, the volume frequency of the occurrence of particles having a particle size in the range of 60 nm to 200 nm was 83%. From the crystallite correlation length r and the volume average particle size R, parameter k (=r/R) was 0.23.

Example 96

An electrophotographic photosensitive member of Example 96 was produced in the same manner as in Example 93, except that the time for the second milling operation using the ball mill machine was changed from 40 hours to 1,000 hours. The crystallite correlation length r of the resulting pigment, which was estimated from the peak at 27.2°±0.2° that was the strongest peak in the CuKα X-ray diffraction spectrum, was 36 nm.

The volume average particle size R of the titanyl phthalocyanine pigment in the charge generating layer, which was estimated from the particle size distribution obtained using the SEM micrograph, was 154 nm. In the particle size distribution, the volume frequency of the occurrence of particles having a particle size in the range of 60 nm to 200 nm was 85%. From the crystallite correlation length r and the volume average particle size R, parameter k (=r/R) was 0.23.

Example 97

An electrophotographic photosensitive member of Example 97 was produced in the same manner as in Example 93, except that the second milling operation in the process for producing the titanyl phthalocyanine pigment was changed as below.

In the first milling operation, 0.5 part of the titanyl phthalocyanine pigment produced in Synthesis Example 5 and 10 parts of tetrahydrofuran were subjected to milling with 15 parts of glass beads of 0.9 mm in diameter with a paint shaker (manufactured by Toyo Seiki) at room temperature (23° C.) for 3 hours. For this operation, a standard bottle PS-6 (manufactured by Hakuyo Glass) was used as the container. The resulting liquid was further subjected to milling (second milling operation) at room temperature (23° C.) for 40 hours by using a ball mill machine. For this operation, the container was set to the ball mill machine as it was without removing the contents therefrom, and the container was rotated at a speed of 120 rpm. Hence, both the first and the second milling operation were performed with the same glass beads. After adding 30 parts of tetrahydrofuran to the resulting liquid, the mixture was filtered, and the filtration product remaining on the filter was sufficiently washed with methanol and water. Then, the washed filtration product was vacuum-dried to yield 0.45 part of a titanyl phthalocyanine pigment. The crystallite correlation length r of the resulting pigment, which was estimated from the peak at 27.2°±0.2° that was the strongest peak in the CuKα X-ray diffraction spectrum, was 31 nm.

The volume average particle size R of the titanyl phthalocyanine pigment in the charge generating layer, which was estimated from the particle size distribution obtained using the SEM micrograph, was 160 nm. In the particle size distribution, the volume frequency of the occurrence of particles having a particle size in the range of 60 nm to 200 nm was 76%. From the crystallite correlation length r and the volume average particle size R, parameter k (=r/R) was 0.20.

Example 98

An electrophotographic photosensitive member of Example 98 was produced in the same manner as in Example 97, except that the time for the second milling operation using the ball mill machine was changed from 40 hours to 100 hours. The crystallite correlation length r of the resulting pigment, which was estimated from the peak at 27.2°±0.2° that was the strongest peak in the CuKα X-ray diffraction spectrum, was 34 nm.

The volume average particle size R of the titanyl phthalocyanine pigment in the charge generating layer, which was estimated from the particle size distribution obtained using the SEM micrograph, was 150 nm. In the particle size distribution, the volume frequency of the occurrence of particles having a particle size in the range of 60 nm to 200 nm was 81%. From the crystallite correlation length r and the volume average particle size R, parameter k (=r/R) was 0.22.

Example 99

An electrophotographic photosensitive member of Example 99 was produced in the same manner as in Example 97, except that the time for the second milling operation using the ball mill machine was changed from 40 hours to 300 hours. The crystallite correlation length r of the resulting pigment, which was estimated from the peak at 27.2°±0.2° that was the strongest peak in the CuKα X-ray diffraction spectrum, was 36 nm.

The volume average particle size R of the titanyl phthalocyanine pigment in the charge generating layer, which was estimated from the particle size distribution obtained using the SEM micrograph, was 146 nm. In the particle size distribution, the volume frequency of the occurrence of particles having a particle size in the range of 60 nm to 200 nm was 85%. From the crystallite correlation length r and the volume average particle size R, parameter k (=r/R) was 0.25.

Example 100

An electrophotographic photosensitive member of Example 100 was produced in the same manner as in Example 97, except that the time for the second milling operation using the ball mill machine was changed from 40 hours to 1,000 hours. The crystallite correlation length r of the resulting pigment, which was estimated from the peak at 27.2°±0.2° that was the strongest peak in the CuKα X-ray diffraction spectrum, was 39 nm.

The volume average particle size R of the titanyl phthalocyanine pigment in the charge generating layer, which was estimated from the particle size distribution obtained using the SEM micrograph, was 141 nm. In the particle size distribution, the volume frequency of the occurrence of particles having a particle size in the range of 60 nm to 200 nm was 88%. From the crystallite correlation length r and the volume average particle size R, parameter k (=r/R) was 0.27.

Example 101

An electrophotographic photosensitive member of Example 101 was produced in the same manner as in Example 93, except that the process for producing the titanyl phthalocyanine pigment was changed as below.

In the first milling operation, 0.5 part of the titanyl phthalocyanine pigment produced in Synthesis Example 5 and 10 parts of n-butyl ether were subjected to milling with 15 parts of glass beads of 0.9 mm in diameter with a paint shaker (manufactured by Toyo Seiki) at room temperature (23° C.) for 3 hours. For this operation, a standard bottle PS-6 (manufactured by Hakuyo Glass) was used as the container. The liquid subjected to the milling operation was filtered through a filter (N-NO. 125T, pore size: 133 μm, manufactured by NBC Meshtec) to remove the glass beads. The resulting liquid was further subjected to milling (second milling operation) at room temperature (23° C.) for 40 hours by using a ball mill machine. This operation was performed in the standard bottle PS-6 (manufactured by Hakuyo Glass) under the condition where the bottle was rotated at a speed of 120 rpm. In this operation, media, such as glass beads, were not used. After adding 30 parts of n-butyl ether to the resulting liquid, the mixture was filtered, and the filtration product remaining on the filter was sufficiently washed with methanol and water. Then, the washed filtration product was vacuum-dried to yield 0.44 part of a titanyl phthalocyanine pigment. The crystallite correlation length r of the resulting pigment, which was estimated from the peak at 27.2°±0.2° that was the strongest peak in the CuKα X-ray diffraction spectrum, was 31 nm.

The volume average particle size R of the titanyl phthalocyanine pigment in the charge generating layer, which was estimated from the particle size distribution obtained using the SEM micrograph, was 165 nm. In the particle size distribution, the volume frequency of the occurrence of particles having a particle size in the range of 60 nm to 200 nm was 73%. From the crystallite correlation length r and the volume average particle size R, parameter k (=r/R) was 0.19.

Example 102

An electrophotographic photosensitive member of Example 102 was produced in the same manner as in Example 101, except that the time for the second milling operation using the ball mill machine was changed from 40 hours to 100 hours. The crystallite correlation length r of the resulting pigment, which was estimated from the peak at 27.2°±0.2° that was the strongest peak in the CuKα X-ray diffraction spectrum, was 34 nm.

The volume average particle size R of the titanyl phthalocyanine pigment in the charge generating layer, which was estimated from the particle size distribution obtained using the SEM micrograph, was 163 nm. In the particle size distribution, the volume frequency of the occurrence of particles having a particle size in the range of 60 nm to 200 nm was 78%. From the crystallite correlation length r and the volume average particle size R, parameter k (=r/R) was 0.21.

Example 103

An electrophotographic photosensitive member of Example 103 was produced in the same manner as in Example 101, except that the time for the second milling operation using the ball mill machine was changed from 40 hours to 300 hours. The crystallite correlation length r of the resulting pigment, which was estimated from the peak at 27.2°±0.2° that was the strongest peak in the CuKα X-ray diffraction spectrum, was 34 nm.

The volume average particle size R of the titanyl phthalocyanine pigment in the charge generating layer, which was estimated from the particle size distribution obtained using the SEM micrograph, was 156 nm. In the particle size distribution, the volume frequency of the occurrence of particles having a particle size in the range of 60 nm to 200 nm was 83%. From the crystallite correlation length r and the volume average particle size R, parameter k (=r/R) was 0.22.

Example 104

An electrophotographic photosensitive member of Example 104 was produced in the same manner as in Example 101, except that the time for the second milling operation using the ball mill machine was changed from 40 hours to 1,000 hours. The crystallite correlation length r of the resulting pigment, which was estimated from the peak at 27.2°±0.2° that was the strongest peak in the CuKα X-ray diffraction spectrum, was 36 nm.

The volume average particle size R of the titanyl phthalocyanine pigment in the charge generating layer, which was estimated from the particle size distribution obtained using the SEM micrograph, was 154 nm. In the particle size distribution, the volume frequency of the occurrence of particles having a particle size in the range of 60 nm to 200 nm was 84%. From the crystallite correlation length r and the volume average particle size R, parameter k (=r/R) was 0.23.

Example 105

An electrophotographic photosensitive member of Example 105 was produced in the same manner as in Example 101, except that the second milling operation in the process for producing the titanyl phthalocyanine pigment was changed as below.

In the first milling operation, 0.5 part of the titanyl phthalocyanine pigment produced in Synthesis Example 5 and 10 parts of n-butyl ether were subjected to milling with 15 parts of glass beads of 0.9 mm in diameter with a paint shaker (manufactured by Toyo Seiki) at room temperature (23° C.) for 3 hours. For this operation, a standard bottle PS-6 (manufactured by Hakuyo Glass) was used as the container. The resulting liquid was further subjected to milling (second milling operation) at room temperature (23° C.) for 40 hours by using a ball mill machine. For this operation, the container was set to the ball mill machine as it was without removing the contents therefrom, and the container was rotated at a speed of 120 rpm. Hence, both the first and the second milling operation were performed with the same glass beads. The liquid subjected to the milling operation was passed through a filter (N-NO. 125T, pore size: 133 μm, manufactured by NBC Meshtec) to remove the glass beads. After adding 30 parts of n-butyl ether to the resulting liquid, the mixture was filtered, and the filtration product remaining on the filter was sufficiently washed with methanol and water. Then, the washed filtration product was vacuum-dried to yield 0.44 part of a titanyl phthalocyanine pigment. The crystallite correlation length r of the resulting pigment, which was estimated from the peak at 27.2°±0.2° that was the strongest peak in the CuKα X-ray diffraction spectrum, was 34 nm.

The volume average particle size R of the titanyl phthalocyanine pigment in the charge generating layer, which was estimated from the particle size distribution obtained using the SEM micrograph, was 158 nm. In the particle size distribution, the volume frequency of the occurrence of particles having a particle size in the range of 60 nm to 200 nm was 75%. From the crystallite correlation length r and the volume average particle size R, parameter k (=r/R) was 0.21.

Example 106

An electrophotographic photosensitive member of Example 106 was produced in the same manner as in Example 105, except that the time for the second milling operation using the ball mill machine was changed from 40 hours to 100 hours. The crystallite correlation length r of the resulting pigment, which was estimated from the peak at 27.2°±0.2° that was the strongest peak in the CuKα X-ray diffraction spectrum, was 36 nm.

The volume average particle size R of the titanyl phthalocyanine pigment in the charge generating layer, which was estimated from the particle size distribution obtained using the SEM micrograph, was 151 nm. In the particle size distribution, the volume frequency of the occurrence of particles having a particle size in the range of 60 nm to 200 nm was 81%. From the crystallite correlation length r and the volume average particle size R, parameter k (=r/R) was 0.24.

Example 107

An electrophotographic photosensitive member of Example 107 was produced in the same manner as in Example 105, except that the time for the second milling operation using the ball mill machine was changed from 40 hours to 300 hours. The crystallite correlation length r of the resulting pigment, which was estimated from the peak at 27.2°±0.2° that was the strongest peak in the CuKα X-ray diffraction spectrum, was 36 nm.

The volume average particle size R of the titanyl phthalocyanine pigment in the charge generating layer, which was estimated from the particle size distribution obtained using the SEM micrograph, was 148 nm. In the particle size distribution, the volume frequency of the occurrence of particles having a particle size in the range of 60 nm to 200 nm was 83%. From the crystallite correlation length r and the volume average particle size R, parameter k (=r/R) was 0.24.

Example 108

An electrophotographic photosensitive member of Example 108 was produced in the same manner as in Example 105, except that the time for the second milling operation using the ball mill machine was changed from 40 hours to 1,000 hours. The crystallite correlation length r of the resulting pigment, which was estimated from the peak at 27.2°±0.2° that was the strongest peak in the CuKα X-ray diffraction spectrum, was 39 nm.

The volume average particle size R of the titanyl phthalocyanine pigment in the charge generating layer, which was estimated from the particle size distribution obtained using the SEM micrograph, was 144 nm. In the particle size distribution, the volume frequency of the occurrence of particles having a particle size in the range of 60 nm to 200 nm was 84%. From the crystallite correlation length r and the volume average particle size R, parameter k (=r/R) was 0.27.

Comparative Example 1

An electrophotographic photosensitive member of Comparative Example 1 was produced in the same manner as in Example 1, except that the process for producing the hydroxygallium phthalocyanine pigment was changed as below.

Using a ball mill machine, 0.5 part of the hydroxygallium phthalocyanine pigment produced in Synthesis Example 3 and 9.5 parts of N-methylformamide F0059 (manufactured by Tokyo Chemical Industry) were subjected to milling at room temperature (23° C.) for 10 hours. This operation was performed in the standard bottle PS-6 (manufactured by Hakuyo Glass) under the condition where the bottle was rotated at a speed of 120 rpm. In this operation, media, such as glass beads, were not used. After adding 30 parts of N-methylformamide to the resulting liquid, the mixture was filtered, and the filtration product remaining on the filter was sufficiently washed with tetrahydrofuran. Then, the resulting filtration product was vacuum-dried to yield 0.46 part of a hydroxygallium phthalocyanine pigment. The resulting pigment was exhibited peaks at Bragg angles 2θ of 7.5°±0.2°, 9.9°±0.2°, 16.2°±0.2°, 18.6°±0.2°, 25.2°±0.2°, and 28.3°±0.2° in the CuKα X-ray diffraction spectrum thereof. The crystallite correlation length r, which was estimated from the peak at 7.5°±0.2° that was the strongest of the peaks in the range of 5° to 35°, was 23 nm. The content of the amide compound (N-methylformamide) represented by formula (A1) in the hydroxygallium phthalocyanine crystalline particles, which was estimated by $^1$H-NMR analysis, was 3.1% by mass relative to the hydroxygallium phthalocyanine.

The volume average particle size R of the hydroxygallium phthalocyanine pigment in the charge generating layer, which was estimated from the particle size distribution obtained using the SEM micrograph, was 241 nm. In the particle size distribution, the volume frequency of the occurrence of particles having a particle size in the range of 60 nm to 200 nm was 41%. From the crystallite correlation length r and the volume average particle size R, parameter k (=r/R) was 0.10.

Comparative Example 2

An electrophotographic photosensitive member of Comparative Example 2 was produced in the same manner as in Comparative Example 1, except that the time for the milling operation using the ball mill machine was changed from 10 hours to 20 hours. The crystallite correlation length r of the resulting pigment, which was estimated from the peak at 7.5°±0.2° that was the strongest of the peaks in the CuKα

X-ray diffraction spectrum, was 25 nm. The content of the amide compound (N-methylformamide) represented by formula (A1) in the hydroxygallium phthalocyanine crystalline particles, which was estimated by $^1$H-NMR analysis, was 3.0% by mass relative to the hydroxygallium phthalocyanine.

The volume average particle size R of the hydroxygallium phthalocyanine pigment in the charge generating layer, which was estimated from the particle size distribution obtained using the SEM micrograph, was 242 nm. In the particle size distribution, the volume frequency of the occurrence of particles having a particle size in the range of 60 nm to 200 nm was 38%. From the crystallite correlation length r and the volume average particle size R, parameter k (=r/R) was 0.10.

Comparative Example 3

An electrophotographic photosensitive member of Comparative Example 3 was produced in the same manner as in Comparative Example 1, except that the time for the milling operation using the ball mill machine was changed from 10 hours to 30 hours. The crystallite correlation length r of the resulting pigment, which was estimated from the peak at 7.5°±0.2° that was the strongest of the peaks in the CuKα X-ray diffraction spectrum, was 25 nm. The content of the amide compound (N-methylformamide) represented by formula (A1) in the hydroxygallium phthalocyanine crystalline particles, which was estimated by $^1$H-NMR analysis, was 2.8% by mass relative to the hydroxygallium phthalocyanine.

The volume average particle size R of the hydroxygallium phthalocyanine pigment in the charge generating layer, which was estimated from the particle size distribution obtained using the SEM micrograph, was 244 nm. In the particle size distribution, the volume frequency of the occurrence of particles having a particle size in the range of 60 nm to 200 nm was 37%. From the crystallite correlation length r and the volume average particle size R, parameter k (=r/R) was 0.10.

Comparative Example 4

An electrophotographic photosensitive member of Comparative Example 4 was produced in the same manner as in Comparative Example 1, except that the time for the milling operation using the ball mill machine was changed from 10 hours to 40 hours. The crystallite correlation length r of the resulting pigment, which was estimated from the peak at 7.5°±0.2° that was the strongest of the peaks in the CuKα X-ray diffraction spectrum, was 27 nm. The content of the amide compound (N-methylformamide) represented by formula (A1) in the hydroxygallium phthalocyanine crystalline particles, which was estimated by $^1$H-NMR analysis, was 2.8% by mass relative to the hydroxygallium phthalocyanine.

The volume average particle size R of the hydroxygallium phthalocyanine pigment in the charge generating layer, which was estimated from the particle size distribution obtained using the SEM micrograph, was 245 nm. In the particle size distribution, the volume frequency of the occurrence of particles having a particle size in the range of 60 nm to 200 nm was 35%. From the crystallite correlation length r and the volume average particle size R, parameter k (=r/R) was 0.11.

Comparative Example 5

An electrophotographic photosensitive member of Comparative Example 5 was produced in the same manner as in Comparative Example 1, except that the time for the milling operation using the ball mill machine was changed from 10 hours to 100 hours. The crystallite correlation length r of the resulting pigment, which was estimated from the peak at 7.5°±0.2° that was the strongest of the peaks in the CuKα X-ray diffraction spectrum, was 27 nm. The content of the amide compound (N-methylformamide) represented by formula (A1) in the hydroxygallium phthalocyanine crystalline particles, which was estimated by $^1$H-NMR analysis, was 2.7% by mass relative to the hydroxygallium phthalocyanine.

The volume average particle size R of the hydroxygallium phthalocyanine pigment in the charge generating layer, which was estimated from the particle size distribution obtained using the SEM micrograph, was 247 nm. In the particle size distribution, the volume frequency of the occurrence of particles having a particle size in the range of 60 nm to 200 nm was 34%. From the crystallite correlation length r and the volume average particle size R, parameter k (=r/R) was 0.11.

Comparative Example 6

An electrophotographic photosensitive member of Comparative Example 6 was produced in the same manner as in Comparative Example 1, except that the time for the milling operation using the ball mill machine was changed from 10 hours to 140 hours. The crystallite correlation length r of the resulting pigment, which was estimated from the peak at 7.5°±0.2° that was the strongest of the peaks in the CuKα X-ray diffraction spectrum, was 30 nm. The content of the amide compound (N-methylformamide) represented by formula (A1) in the hydroxygallium phthalocyanine crystalline particles, which was estimated by $^1$H-NMR analysis, was 2.7% by mass relative to the hydroxygallium phthalocyanine.

The volume average particle size R of the hydroxygallium phthalocyanine pigment in the charge generating layer, which was estimated from the particle size distribution obtained using the SEM micrograph, was 248 nm. In the particle size distribution, the volume frequency of the occurrence of particles having a particle size in the range of 60 nm to 200 nm was 33%. From the crystallite correlation length r and the volume average particle size R, parameter k (=r/R) was 0.12.

Comparative Example 7

An electrophotographic photosensitive member of Comparative Example 7 was produced in the same manner as in Comparative Example 1, except that the time for the milling operation using the ball mill machine was changed from 10 hours to 300 hours. The crystallite correlation length r of the resulting pigment, which was estimated from the peak at 7.5°±0.2° that was the strongest of the peaks in the CuKα X-ray diffraction spectrum, was 29 nm. The content of the amide compound (N-methylformamide) represented by formula (A1) in the hydroxygallium phthalocyanine crystalline particles, which was estimated by $^1$H-NMR analysis, was 2.6% by mass relative to the mass of the hydroxygallium phthalocyanine.

The volume average particle size R of the hydroxygallium phthalocyanine pigment in the charge generating layer, which was estimated from the particle size distribution obtained using the SEM micrograph, was 282 nm. In the particle size distribution, the volume frequency of the occurrence of particles having a particle size in the range of 60 nm to 200 nm was 24%. From the crystallite correlation length r and the volume average particle size R, parameter k (=r/R) was 0.10.

Comparative Example 8

An electrophotographic photosensitive member of Comparative Example 8 was produced in the same manner as in Comparative Example 1, except that the time for the milling operation using the ball mill machine was changed from 10 hours to 500 hours. The crystallite correlation length r of the resulting pigment, which was estimated from the peak at 7.5°±0.2° that was the strongest of the peaks in the CuKα X-ray diffraction spectrum, was 29 nm. The content of the amide compound (N-methylformamide) represented by formula (A1) in the hydroxygallium phthalocyanine crystalline particles, which was estimated by $^1$H-NMR analysis, was 2.5% by mass relative to the hydroxygallium phthalocyanine.

The volume average particle size R of the hydroxygallium phthalocyanine pigment in the charge generating layer, which was estimated from the particle size distribution obtained using the SEM micrograph, was 353 nm. In the particle size distribution, the volume frequency of the occurrence of particles having a particle size in the range of 60 nm to 200 nm was 18%. From the crystallite correlation length r and the volume average particle size R, parameter k (=r/R) was 0.08.

Comparative Example 9

An electrophotographic photosensitive member of Comparative Example 9 was produced in the same manner as in Comparative Example 1, except that the time for the milling operation using the ball mill machine was changed from 10 hours to 1,000 hours. The crystallite correlation length r of the resulting pigment, which was estimated from the peak at 7.5°±0.2° that was the strongest of the peaks in the CuKα X-ray diffraction spectrum, was 31 nm. The content of the amide compound (N-methylformamide) represented by formula (A1) in the hydroxygallium phthalocyanine crystalline particles, which was estimated by $^1$H-NMR analysis, was 2.5% by mass relative to the hydroxygallium phthalocyanine.

The volume average particle size R of the hydroxygallium phthalocyanine pigment in the charge generating layer, which was estimated from the particle size distribution obtained using the SEM micrograph, was 382 nm. In the particle size distribution, the volume frequency of the occurrence of particles having a particle size in the range of 60 nm to 200 nm was 14%. From the crystallite correlation length r and the volume average particle size R, parameter k (=r/R) was 0.08.

Comparative Example 10

An electrophotographic photosensitive member of Comparative Example 10 was produced in the same manner as in Comparative Example 1, except that the time for the milling operation using the ball mill machine was changed from 10 hours to 2,000 hours. The crystallite correlation length r of the resulting pigment, which was estimated from the peak at 7.5°±0.2° that was the strongest of the peaks in the CuKα X-ray diffraction spectrum, was 34 nm. The content of the amide compound (N-methylformamide) represented by formula (A1) in the hydroxygallium phthalocyanine crystalline particles, which was estimated by $^1$H-NMR analysis, was 2.4% by mass relative to the hydroxygallium phthalocyanine.

The volume average particle size R of the hydroxygallium phthalocyanine pigment in the charge generating layer, which was estimated from the particle size distribution obtained using the SEM micrograph, was 403 nm. In the particle size distribution, the volume frequency of the occurrence of particles having a particle size in the range of 60 nm to 200 nm was 10%. From the crystallite correlation length r and the volume average particle size R, parameter k (=r/R) was 0.08.

Comparative Example 11

An electrophotographic photosensitive member of Comparative Example 11 was produced in the same manner as in Example 1, except that the process for producing the hydroxygallium phthalocyanine pigment was changed as below.

Using a paint shaker (manufactured by Toyo Seiki), 0.5 part of the hydroxygallium phthalocyanine pigment produced in Synthesis Example 3 and 9.5 parts of N-methylformamide F0059 (manufactured by Tokyo Chemical Industry) were subjected to milling with 15 parts of glass beads of 0.9 mm in diameter at room temperature (23° C.) for 20 hours.

For this operation, a standard bottle PS-6 (manufactured by Hakuyo Glass) was used as the container. The liquid subjected to the milling operation was passed through a filter (N-NO. 125T, pore size: 133 μm, manufactured by NBC Meshtec) to remove the glass beads. After adding 30 parts of N-methylformamide to the resulting liquid, the mixture was filtered, and the filtration product remaining on the filter was sufficiently washed with tetrahydrofuran. Then, the resulting filtration product was vacuum-dried to yield 0.46 part of a hydroxygallium phthalocyanine pigment. The resulting pigment was exhibited peaks at Bragg angles 2θ of 7.5°±0.2°, 9.9°±0.2°, 16.2°±0.2°, 18.6°±0.2°, 25.2°±0.2°, and 28.3°±0.2° in the CuKα X-ray diffraction spectrum thereof. The crystallite correlation length r, which was estimated from the peak at 7.5°±0.2° that was the strongest of the peaks in the range of 5° to 35°, was 15 nm. The content of the amide compound (N-methylformamide) represented by formula (A1) in the hydroxygallium phthalocyanine crystalline particles, which was estimated by $^1$H-NMR analysis, was 1.9% by mass relative to the hydroxygallium phthalocyanine.

The volume average particle size R of the hydroxygallium phthalocyanine pigment in the charge generating layer, which was estimated from the particle size distribution obtained using the SEM micrograph, was 115 nm. In the particle size distribution, the volume frequency of the occurrence of particles having a particle size in the range of 60 nm to 200 nm was 68%. From the crystallite correlation length r and the volume average particle size R, parameter k (=r/R) was 0.13.

Comparative Example 12

An electrophotographic photosensitive member of Comparative Example 12 was produced in the same manner as in Comparative Example 11, except that the time for the milling operation using the paint shaker was changed from 20 hours to 30 hours. The crystallite correlation length r of the resulting pigment, which was estimated from the peak at 7.5°±0.2° that was the strongest of the peaks in the CuKα

X-ray diffraction spectrum, was 15 nm. The content of the amide compound (N-methylformamide) represented by formula (A1) in the hydroxygallium phthalocyanine crystalline particles, which was estimated by $^1$H-NMR analysis, was 1.4% by mass relative to the hydroxygallium phthalocyanine.

The volume average particle size R of the hydroxygallium phthalocyanine pigment in the charge generating layer, which was estimated from the particle size distribution obtained using the SEM micrograph, was 109 nm. In the particle size distribution, the volume frequency of the occurrence of particles having a particle size in the range of 60 nm to 200 nm was 63%. From the crystallite correlation length r and the volume average particle size R, parameter k (=r/R) was 0.13.

Comparative Example 13

An electrophotographic photosensitive member of Comparative Example 13 was produced in the same manner as in Example 1, except that the process for producing the hydroxygallium phthalocyanine pigment was changed as below.

Using a ball mill machine, 0.5 part of the hydroxygallium phthalocyanine pigment produced in Synthesis Example 3 and 9.5 parts of N-methylformamide F0059 (manufactured by Tokyo Chemical Industry) were subjected to milling with 15 parts of glass beads of 0.9 mm in diameter at room temperature (23° C.) for 5 hours. This operation was performed in the standard bottle PS-6 (manufactured by Hakuyo Glass) under the condition where the bottle was rotated at a speed of 60 rpm. The liquid subjected to the milling operation was passed through a filter (N-NO. 125T, pore size: 133 μm, manufactured by NBC Meshtec) to remove the glass beads. After adding 30 parts of N-methylformamide to the resulting liquid, the mixture was filtered, and the filtration product remaining on the filter was sufficiently washed with tetrahydrofuran. Then, the resulting filtration product was vacuum-dried to yield 0.47 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 23 nm. The content of the amide compound (N-methylformamide) represented by formula (A1) in the hydroxygallium phthalocyanine crystalline particles, which was estimated by $^1$H-NMR analysis, was 3.1% by mass relative to the hydroxygallium phthalocyanine.

The volume average particle size R of the hydroxygallium phthalocyanine pigment in the charge generating layer, which was estimated from the particle size distribution obtained using the SEM micrograph, was 163 nm. In the particle size distribution, the volume frequency of the occurrence of particles having a particle size in the range of 60 nm to 200 nm was 67%. From the crystallite correlation length r and the volume average particle size R, parameter k (=r/R) was 0.14.

Comparative Example 14

An electrophotographic photosensitive member of Comparative Example 14 was produced in the same manner as in Comparative Example 13, except that the time for the milling operation using the ball mill machine was changed from 5 hours to 10 hours. The crystallite correlation length r of the resulting pigment, which was estimated from the peak at 7.5°±0.2° that was the strongest of the peaks in the CuKα X-ray diffraction spectrum, was 23 nm. The content of the amide compound (N-methylformamide) represented by formula (A1) in the hydroxygallium phthalocyanine crystalline particles, which was estimated by $^1$H-NMR analysis, was 2.7% by mass relative to the hydroxygallium phthalocyanine.

The volume average particle size R of the hydroxygallium phthalocyanine pigment in the charge generating layer, which was estimated from the particle size distribution obtained using the SEM micrograph, was 164 nm. In the particle size distribution, the volume frequency of the occurrence of particles having a particle size in the range of 60 nm to 200 nm was 75%. From the crystallite correlation length r and the volume average particle size R, parameter k (=r/R) was 0.14.

Comparative Example 15

An electrophotographic photosensitive member of Comparative Example 15 was produced in the same manner as in Comparative Example 13, except that the time for the milling operation using the ball mill machine was changed from 5 hours to 30 hours. The crystallite correlation length r of the resulting pigment, which was estimated from the peak at 7.5°±0.2° that was the strongest of the peaks in the CuKα X-ray diffraction spectrum, was 24 nm. The content of the amide compound (N-methylformamide) represented by formula (A1) in the hydroxygallium phthalocyanine crystalline particles, which was estimated by $^1$H-NMR analysis, was 2.6% by mass relative to the mass of the hydroxygallium phthalocyanine.

The volume average particle size R of the hydroxygallium phthalocyanine pigment in the charge generating layer, which was estimated from the particle size distribution obtained using the SEM micrograph, was 159 nm. In the particle size distribution, the volume frequency of the occurrence of particles having a particle size in the range of 60 nm to 200 nm was 81%. From the crystallite correlation length r and the volume average particle size R, parameter k (=r/R) was 0.15.

Comparative Example 16

An electrophotographic photosensitive member of Comparative Example 16 was produced in the same manner as in Comparative Example 13, except that the time for the milling operation using the ball mill machine was changed from 5 hours to 100 hours. The crystallite correlation length r of the resulting pigment, which was estimated from the peak at 7.5°±0.2° that was the strongest of the peaks in the CuKα X-ray diffraction spectrum, was 24 nm. The content of the amide compound (N-methylformamide) represented by formula (A1) in the hydroxygallium phthalocyanine crystalline particles, which was estimated by $^1$H-NMR analysis, was 2.1% by mass relative to the hydroxygallium phthalocyanine.

The volume average particle size R of the hydroxygallium phthalocyanine pigment in the charge generating layer, which was estimated from the particle size distribution obtained using the SEM micrograph, was 153 nm. In the particle size distribution, the volume frequency of range of 60 nm to 200 nm was 86%. From the crystallite correlation length r and the volume average particle size R, parameter k (=r/R) was 0.16.

Comparative Example 17

An electrophotographic photosensitive member of Comparative Example 17 was produced in the same manner as in Example 43, except that the time for the milling operation using the sand mill was changed from 70 hours to 10 hours. The crystallite correlation length r of the resulting pigment, which was estimated from the peak at 7.5°±0.2° that was the strongest of the peaks in the CuKα X-ray diffraction spectrum, was 28 nm. The content of the amide compound (N-methylformamide) represented by formula (A1) in the hydroxygallium phthalocyanine crystalline particles, which was estimated by $^1$H-NMR analysis, was 2.7% by mass relative to the hydroxygallium phthalocyanine.

The volume average particle size R of the hydroxygallium phthalocyanine pigment in the charge generating layer, which was estimated from the particle size distribution obtained using the SEM micrograph, was 181 nm. In the particle size distribution, the volume frequency of the occurrence of particles having a particle size in the range of 60 nm to 200 nm was 65%. From the crystallite correlation length r and the volume average particle size R, parameter k (=r/R) was 0.15.

Comparative Example 18

An electrophotographic photosensitive member of Comparative Example 18 was produced in the same manner as in Example 43, except that the time for the milling operation using the sand mill was changed from 70 hours to 500 hours. The crystallite correlation length r of the resulting pigment, which was estimated from the peak at 7.5°±0.2° that was the strongest of the peaks in the CuKα X-ray diffraction spectrum, was 27 nm. The content of the amide compound (N-methylformamide) represented by formula (A1) in the hydroxygallium phthalocyanine crystalline particles, which was estimated by $^1$H-NMR analysis, was 0.8% by mass relative to the hydroxygallium phthalocyanine.

The volume average particle size R of the hydroxygallium phthalocyanine pigment in the charge generating layer, which was estimated from the particle size distribution obtained using the SEM micrograph, was 174 nm. In the particle size distribution, the volume frequency of the occurrence of particles having a particle size in the range of 60 nm to 200 nm was 74%. From the crystallite correlation length r and the volume average particle size R, parameter k (=r/R) was 0.15.

Comparative Example 19

An electrophotographic photosensitive member of Comparative Example 19 was produced in the same manner as in Example 1, except that the process for producing the hydroxygallium phthalocyanine pigment was changed as below.

Using a magnetic stirrer, 0.5 part of the hydroxygallium phthalocyanine pigment produced in Synthesis Example 3 and 9.5 parts of N-methylformamide F0059 (manufactured by Tokyo Chemical Industry) were subjected to milling at room temperature (23° C.) for 1 hour. This operation was performed in the standard bottle PS-6 (manufactured by Hakuyo Glass) under the condition where the stirring bar was rotated at a speed of 1,500 rpm. After adding 30 parts of N-methylformamide to the resulting liquid, the mixture was filtered, and the filtration product remaining on the filter was sufficiently washed with tetrahydrofuran. Then, the resulting filtration product was vacuum-dried to yield 0.47 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 23 nm. The content of the amide compound (N-methylformamide) represented by formula (A1) in the hydroxygallium phthalocyanine crystalline particles, which was estimated by $^1$H-NMR analysis, was 2.4% by mass relative to the hydroxygallium phthalocyanine.

The volume average particle size R of the hydroxygallium phthalocyanine pigment in the charge generating layer, which was estimated from the particle size distribution obtained using the SEM micrograph, was 214 nm. In the particle size distribution, the volume frequency of the occurrence of particles having a particle size in the range of 60 nm to 200 nm was 43%. From the crystallite correlation length r and the volume average particle size R, parameter k (=r/R) was 0.11.

Comparative Example 20

An electrophotographic photosensitive member of Comparative Example 20 was produced in the same manner as in Comparative Example 19, except that the time for the milling operation using the magnetic stirrer was changed from 1 hour to 5 hours. The crystallite correlation length r of the resulting pigment, which was estimated from the peak at 7.5°±0.2° that was the strongest of the peaks in the CuKα X-ray diffraction spectrum, was 25 nm. The content of the amide compound (N-methylformamide) represented by formula (A1) in the hydroxygallium phthalocyanine crystalline particles, which was estimated by $^1$H-NMR analysis, was 2.9% by mass relative to the hydroxygallium phthalocyanine.

The volume average particle size R of the hydroxygallium phthalocyanine pigment in the charge generating layer, which was estimated from the particle size distribution obtained using the SEM micrograph, was 205 nm. In the particle size distribution, the volume frequency of the occurrence of particles having a particle size in the range of 60 nm to 200 nm was 49%. From the crystallite correlation length r and the volume average particle size R, parameter k (=r/R) was 0.12.

Comparative Example 21

An electrophotographic photosensitive member of Comparative Example 21 was produced in the same manner as in Comparative Example 19, except that the time for the milling operation using the magnetic stirrer was changed from 1 hour to 10 hours. The crystallite correlation length r of the resulting pigment, which was estimated from the peak at 7.5°±0.2° that was the strongest of the peaks in the CuKα X-ray diffraction spectrum, was 25 nm. The content of the amide compound (N-methylformamide) represented by formula (A1) in the hydroxygallium phthalocyanine crystalline particles, which was estimated by $^1$H-NMR analysis, was 2.8% by mass relative to the hydroxygallium phthalocyanine.

The volume average particle size R of the hydroxygallium phthalocyanine pigment in the charge generating layer, which was estimated from the particle size distribution obtained using the SEM micrograph, was 201 nm. In the particle size distribution, the volume frequency of the occurrence of particles having a particle size in the range of 60 nm to 200 nm was 53%. From the crystallite correlation length r and the volume average particle size R, parameter k (=r/R) was 0.12.

Comparative Example 22

An electrophotographic photosensitive member of Comparative Example 22 was produced in the same manner as in Example 1, except that the process for producing the hydroxygallium phthalocyanine pigment was changed as below.

Using an ultrasonic disperser UT-205 (manufactured by Sharp), 0.5 part of the hydroxygallium phthalocyanine pigment produced in Synthesis Example 3 and 9.5 parts of N-methylformamide F0059 (manufactured by Tokyo Chemical Industry) were subjected to milling at room temperature (23° C.) for 1 hour. For this operation, a standard bottle PS-6 (manufactured by Hakuyo Glass) was used as the container, and the power of the ultrasonic disperser was 100%. In this operation, media, such as glass beads, were not used. After adding 30 parts of N-methylformamide to the resulting liquid, the mixture was filtered, and the filtration product remaining on the filter was sufficiently washed with tetrahydrofuran. Then, the resulting filtration product was vacuum-dried to yield 0.47 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 25 nm. The content of the amide compound (N-methylformamide) represented by formula (A1) in the hydroxygallium phthalocyanine crystalline particles, which was estimated by $^1$H-NMR analysis, was 2.7% by mass relative to the hydroxygallium phthalocyanine.

The volume average particle size R of the hydroxygallium phthalocyanine pigment in the charge generating layer, which was estimated from the particle size distribution obtained using the SEM micrograph, was 220 nm. In the particle size distribution, the volume frequency of the occurrence of particles having a particle size in the range of 60 nm to 200 nm was 44%. From the crystallite correlation length r and the volume average particle size R, parameter k (=r/R) was 0.11.

Comparative Example 23

An electrophotographic photosensitive member of Comparative Example 23 was produced in the same manner as in Comparative Example 22, except that the time for the milling operation using the ultrasonic disperser was changed from 1 hour to 5 hours. The crystallite correlation length r of the resulting pigment, which was estimated from the peak at 7.5°±0.2° that was the strongest of the peaks in the CuKα X-ray diffraction spectrum, was 25 nm. The content of the amide compound (N-methylformamide) represented by formula (A1) in the hydroxygallium phthalocyanine crystalline particles, which was estimated by $^1$H-NMR analysis, was 2.5% by mass relative to the hydroxygallium phthalocyanine.

The volume average particle size R of the hydroxygallium phthalocyanine pigment in the charge generating layer, which was estimated from the particle size distribution obtained using the SEM micrograph, was 210 nm. In the particle size distribution, the volume frequency of the occurrence of particles having a particle size in the range of 60 nm to 200 nm was 50%. From the crystallite correlation length r and the volume average particle size R, parameter k (=r/R) was 0.12.

Comparative Example 24

An electrophotographic photosensitive member of Comparative Example 24 was produced in the same manner as in Comparative Example 22, except that the time for the milling operation using the ultrasonic disperser was changed from 1 hour to 10 hours. The crystallite correlation length r of the resulting pigment, which was estimated from the peak at 7.5°±0.2° that was the strongest of the peaks in the CuKα X-ray diffraction spectrum, was 25 nm. The content of the amide compound (N-methylformamide) represented by formula (A1) in the hydroxygallium phthalocyanine crystalline particles, which was estimated by $^1$H-NMR analysis, was 2.3% by mass relative to the hydroxygallium phthalocyanine.

The volume average particle size R of the hydroxygallium phthalocyanine pigment in the charge generating layer, which was estimated from the particle size distribution obtained using the SEM micrograph, was 202 nm. In the particle size distribution, the volume frequency of the occurrence of particles having a particle size in the range of 60 nm to 200 nm was 51%. From the crystallite correlation length r and the volume average particle size R, parameter k (=r/R) was 0.12.

Comparative Example 25

An electrophotographic photosensitive member of Comparative Example 25 was produced in the same manner as in Example 1, except that the first and the second milling operation in the process for producing the hydroxygallium phthalocyanine pigment were reversed as below.

In the first milling operation, 0.5 part of the hydroxygallium phthalocyanine pigment produced in Synthesis Example 3 and 9.5 parts of N-methylformamide F0059 (manufactured by Tokyo Chemical Industry) were subjected to milling at room temperature (23° C.) for 40 hours by using a boll mill machine. This operation was performed in the standard bottle PS-6 (manufactured by Hakuyo Glass) under the condition where the bottle was rotated at a speed of 120 rpm. In this operation, media, such as glass beads, were not used. The liquid thus subjected to the milling operation was further subjected to milling (second milling operation) with 15 parts of glass beads of 0.9 mm in diameter with a paint shaker (manufactured by Toyo Seiki) at room temperature (23° C.) for 6 hours. For this operation, the standard bottle PS-6 (manufactured by Hakuyo Glass) was used as it was without removing the contents therefrom. The liquid subjected to such milling operation was passed through a filter (N-NO. 125T, pore size: 133 μm, manufactured by NBC Meshtec) to remove the glass beads. After adding 30 parts of N-methylformamide to the resulting liquid, the mixture was filtered, and the filtration product remaining on the filter was sufficiently washed with tetrahydrofuran. Then, the resulting filtration product was vacuum-dried to yield 0.46 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 26 nm. The content of the amide compound (N-methylformamide) represented by formula (A1) in the hydroxygallium phthalocyanine crystalline particles, which was estimated by $^1$H-NMR analysis, was 2.2% by mass relative to the hydroxygallium phthalocyanine.

The volume average particle size R of the hydroxygallium phthalocyanine pigment in the charge generating layer, which was estimated from the particle size distribution obtained using the SEM micrograph, was 211 nm. In the particle size distribution, the volume frequency of the occurrence of particles having a particle size in the range of 60 nm

Comparative Example 26

An electrophotographic photosensitive member of Comparative Example 26 was produced in the same manner as in Example 19, except that the first and the second milling operation in the process for producing the hydroxygallium phthalocyanine pigment were reversed as below.

In the first milling operation, 0.5 part of the hydroxygallium phthalocyanine pigment produced in Synthesis Example 3 and 9.5 parts of N-methylformamide F0059 (manufactured by Tokyo Chemical Industry) were subjected to milling with 15 parts of glass beads of 0.9 mm in diameter at room temperature (23° C.) for 40 hours by using a ball mill machine. This operation was performed in a standard bottle PS-6 (manufactured by Hakuyo Glass) under the condition where the bottle was rotated at a speed of 120 rpm. The liquid thus subjected to the milling operation was further subjected to milling (second milling operation) with a paint shaker (manufactured by Toyo Seiki) at room temperature (23° C.) for 6 hours. For this operation, the container was set to the paint shaker as it was without removing the contents therefrom. Hence, both the first and the second milling operation were performed with the same glass beads. The liquid subjected to such milling operation was passed through a filter (N-NO. 125T, pore size: 133 μm, manufactured by NBC Meshtec) to remove the glass beads. After adding 30 parts of N-methylformamide to the resulting liquid, the mixture was filtered, and the filtration product remaining on the filter was sufficiently washed with tetrahydrofuran. Then, the resulting filtration product was vacuum-dried to yield 0.46 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 25 nm. The content of the amide compound (N-methylformamide) represented by formula (A1) in the hydroxygallium phthalocyanine crystalline particles, which was estimated by $^1$H-NMR analysis, was 2.0% by mass relative to the hydroxygallium phthalocyanine.

The volume average particle size R of the hydroxygallium phthalocyanine pigment in the charge generating layer, which was estimated from the particle size distribution obtained using the SEM micrograph, was 171 nm. In the particle size distribution, the volume frequency of the occurrence of particles having a particle size in the range of 60 nm to 200 nm was 79%. From the crystallite correlation length r and the volume average particle size R, parameter k (=r/R) was 0.15.

Comparative Example 27

An electrophotographic photosensitive member of Comparative Example 27 was produced in the same manner as in Example 45, except that the process for producing the hydroxygallium phthalocyanine pigment was changed as below.

Using a ball mill machine, 0.5 part of the hydroxygallium phthalocyanine pigment produced in Synthesis Example 3 and 9.5 parts of N,N-dimethylformamide D0722 (manufactured by Tokyo Chemical Industry) were subjected to milling with 15 parts of glass beads of 0.9 mm in diameter at room temperature (23° C.) for 100 hours. This operation was performed in a standard bottle PS-6 (manufactured by Hakuyo Glass) under the condition where the bottle was rotated at a speed of 60 rpm. The liquid subjected to the milling operation was passed through a filter (N-NO. 125T, pore size: 133 μm, manufactured by NBC Meshtec) to remove the glass beads. After adding 30 parts of N,N-dimethylformamide to the resulting liquid, the mixture was filtered, and the filtration product remaining on the filter was sufficiently washed with tetrahydrofuran. Then, the resulting filtration product was vacuum-dried to yield 0.48 part of a hydroxygallium phthalocyanine pigment. The resulting pigment was exhibited peaks at Bragg angles 2θ of 7.5°±0.2°, 9.9°±0.2°, 16.2°±0.2°, 18.6°±0.2°, 25.2°±0.2°, and 28.3°±0.2° in the CuKα X-ray diffraction spectrum thereof. The crystallite correlation length r, which was estimated from the peak at 7.5°±0.2° that was the strongest of the peaks in the range of 5° to 35°, was 24 nm.

The volume average particle size R of the hydroxygallium phthalocyanine pigment in the charge generating layer, which was estimated from the particle size distribution obtained using the SEM micrograph, was 154 nm. In the particle size distribution, the volume frequency of the occurrence of particles having a particle size in the range of 60 nm to 200 nm was 76%. From the crystallite correlation length r and the volume average particle size R, parameter k (=r/R) was 0.16.

Comparative Example 28

An electrophotographic photosensitive member of Comparative Example 28 was produced in the same manner as in Example 45, except that the process for producing the hydroxygallium phthalocyanine pigment was changed as below.

Using a ball mill machine, 0.5 part of the hydroxygallium phthalocyanine pigment produced in Synthesis Example 7 and 10 parts of N,N-dimethylformamide D0722 (manufactured by Tokyo Chemical Industry) were subjected to milling with 33 parts of glass beads of 0.3 mm in diameter at 25° C. for 48 hours. This operation was performed in a standard bottle PS-6 (manufactured by Hakuyo Glass) under the condition where the bottle was rotated at a speed of 60 rpm. The liquid subjected to the milling operation was passed through a filter (N-NO. 125T, pore size: 133 μm, manufactured by NBC Meshtec) to remove the glass beads. After adding 30 parts of N,N-dimethylformamide to the resulting liquid, the mixture was filtered, and the filtration product remaining on the filter was sufficiently washed with acetone. Then, the resulting filtration product was vacuum-dried to yield 0.46 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 13 nm.

The volume average particle size R of the hydroxygallium phthalocyanine pigment in the charge generating layer, which was estimated from the particle size distribution obtained using the SEM micrograph, was 98 nm. In the particle size distribution, the volume frequency of the occurrence of particles having a particle size in the range of 60 nm to 200 nm was 83%. From the crystallite correlation length r and the volume average particle size R, parameter k (=r/R) was 0.13.

Comparative Example 29

An electrophotographic photosensitive member of Comparative Example 29 was produced in the same manner as in Comparative Example 28, except that the process for producing the hydroxygallium phthalocyanine pigment was changed as below.

Using a ball mill machine, 0.5 part of the hydroxygallium phthalocyanine pigment produced in Synthesis Example 7 and 7.5 parts of N,N-dimethylformamide D0722 (manufactured by Tokyo Chemical Industry) were subjected to milling with 29 parts of glass beads of 0.9 mm in diameter at 25° C. for 48 hours. This operation was performed in a standard bottle PS-6 (manufactured by Hakuyo Glass) under the condition where the bottle was rotated at a speed of 60 rpm. The liquid subjected to the milling operation was passed through a filter (N-NO. 125T, pore size: 133 μm, manufactured by NBC Meshtec) to remove the glass beads. After adding 30 parts of N,N-dimethylformamide to the resulting liquid, the mixture was filtered, and the filtration product remaining on the filter was sufficiently washed with acetone. Then, the resulting filtration product was vacuum-dried to yield 0.46 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 13 nm.

The volume average particle size R of the hydroxygallium phthalocyanine pigment in the charge generating layer, which was estimated from the particle size distribution obtained using the SEM micrograph, was 101 nm. In the particle size distribution, the volume frequency of the occurrence of particles having a particle size in the range of 60 nm to 200 nm was 81%. From the crystallite correlation length r and the volume average particle size R, parameter k (=r/R) was 0.13.

Comparative Example 30

An electrophotographic photosensitive member of Comparative Example 30 was produced in the same manner as in Comparative Example 29, except that the time for the milling operation using the ball mill machine was changed from 48 hours to 96 hours. The crystallite correlation length r of the resulting pigment, which was estimated from the peak at 7.5°±0.2° that was the strongest of the peaks in the CuKα X-ray diffraction spectrum, was 12 nm.

The volume average particle size R of the hydroxygallium phthalocyanine pigment in the charge generating layer, which was estimated from the particle size distribution obtained using the SEM micrograph, was 91 nm. In the particle size distribution, the volume frequency of the occurrence of particles having a particle size in the range of 60 nm to 200 nm was 86%. From the crystallite correlation length r and the volume average particle size R, parameter k (=r/R) was 0.13.

Comparative Example 31

An electrophotographic photosensitive member of Comparative Example 31 was produced in the same manner as in Comparative Example 29, except that the time for the milling operation using the ball mill machine was changed from 48 hours to 192 hours. The crystallite correlation length r of the resulting pigment, which was estimated from the peak at 7.5°±0.2° that was the strongest of the peaks in the CuKα X-ray diffraction spectrum, was 16 nm.

The volume average particle size R of the hydroxygallium phthalocyanine pigment in the charge generating layer, which was estimated from the particle size distribution obtained using the SEM micrograph, was 121 nm. In the particle size distribution, the volume frequency of the occurrence of particles having a particle size in the range of 60 nm to 200 nm was 84%. From the crystallite correlation length r and the volume average particle size R, parameter k (=r/R) was 0.13.

Comparative Example 32

An electrophotographic photosensitive member of Comparative Example 32 was produced in the same manner as in Comparative Example 29, except that the process for producing the hydroxygallium phthalocyanine pigment was changed as below.

Using a ball mill machine, 0.5 part of the hydroxygallium phthalocyanine pigment produced in Synthesis Example 7 and 7.5 parts of N,N-dimethylformamide D0722 (manufactured by Tokyo Chemical Industry) were subjected to milling with 29 parts of glass beads of 1.0 mm in diameter at 25° C. for 200 hours. This operation was performed in a standard bottle PS-6 (manufactured by Hakuyo Glass) under the condition where the bottle was rotated at a speed of 60 rpm. The liquid subjected to the milling operation was passed through a filter (N-NO. 125T, pore size: 133 μm, manufactured by NBC Meshtec) to remove the glass beads. After adding 30 parts of N,N-dimethylformamide to the resulting liquid, the product was washed with 25 parts of acetone on a ceramic filter having a pore size of 1.0 μm. Then, the washed filtration product was dried in a light shield dryer at 80° C. for 24 hours and then vacuum-dried at 110° C. for 2 hours under a reduced pressure of −0.98 kPa to yield 0.46 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 16 nm.

The volume average particle size R of the hydroxygallium phthalocyanine pigment in the charge generating layer, which was estimated from the particle size distribution obtained using the SEM micrograph, was 125 nm. In the particle size distribution, the volume frequency of the occurrence of particles having a particle size in the range of 60 nm to 200 nm was 84%. From the crystallite correlation length r and the volume average particle size R, parameter k (=r/R) was 0.13.

Comparative Example 33

An electrophotographic photosensitive member of Comparative Example 33 was produced in the same manner as in Comparative Example 29, except that 29 parts of the glass beads of 0.9 mm in diameter used in the process for producing the hydroxygallium phthalocyanine pigment was replaced with 29 parts of glass beads of 5.0 mm in diameter. The crystallite correlation length r of the resulting pigment, which was estimated from the peak at 7.5°±0.2° that was the strongest of the peaks in the CuKα X-ray diffraction spectrum, was 13 nm.

The volume average particle size R of the hydroxygallium phthalocyanine pigment in the charge generating layer, which was estimated from the particle size distribution obtained using the SEM micrograph, was 172 nm. In the particle size distribution, the volume frequency of the occurrence of particles having a particle size in the range of 60 nm to 200 nm was 78%. From the crystallite correlation length r and the volume average particle size R, parameter k (=r/R) was 0.08.

Comparative Example 34

An electrophotographic photosensitive member of Comparative Example 34 was produced in the same manner as in Example 45, except that the process for producing the hydroxygallium phthalocyanine pigment was changed as below.

Using a ball mill machine, 0.5 part of the hydroxygallium phthalocyanine pigment produced in Synthesis Example 8 and 7.5 parts of N,N-dimethylformamide D0722 (manufactured by Tokyo Chemical Industry) were subjected to milling with 29 parts of glass beads of 0.9 mm in diameter at 25° C. for 24 hours. This operation was performed in a standard bottle PS-6 (manufactured by Hakuyo Glass) under the condition where the bottle was rotated at a speed of 60 rpm. The liquid subjected to the milling operation was passed through a filter (N-NO. 125T, pore size: 133 µm, manufactured by NBC Meshtec) to remove the glass beads. After adding 30 parts of N,N-dimethylformamide to the resulting liquid, the mixture was filtered, and the filtration product remaining on the filter was sufficiently washed with n-butyl acetate. Then, the resulting filtration product was vacuum-dried to yield 0.45 part of a hydroxygallium phthalocyanine pigment. The crystallite correlation length r of the resulting pigment, which was estimated from the peak at $7.5°±0.2°$ that was the strongest of the peaks in the CuKα X-ray diffraction spectrum, was 13 nm.

The volume average particle size R of the hydroxygallium phthalocyanine pigment in the charge generating layer, which was estimated from the particle size distribution obtained using the SEM micrograph, was 115 nm. In the particle size distribution, the volume frequency of the occurrence of particles having a particle size in the range of 60 nm to 200 nm was 81%. From the crystallite correlation length r and the volume average particle size R, parameter k (=r/R) was 0.11.

Comparative Example 35

An electrophotographic photosensitive member of Comparative Example 35 was produced in the same manner as in Comparative Example 34, except that 0.5 parts of the hydroxygallium phthalocyanine pigment produced in Synthesis Example 8 was replaced with 0.5 parts of the hydroxygallium phthalocyanine pigment produced in Synthesis Example 9. The crystallite correlation length r of the resulting pigment, which was estimated from the peak at $7.5°±0.2°$ that was the strongest of the peaks in the CuKα X-ray diffraction spectrum, was 13 nm.

The volume average particle size R of the hydroxygallium phthalocyanine pigment in the charge generating layer, which was estimated from the particle size distribution obtained using the SEM micrograph, was 118 nm. In the particle size distribution, the volume frequency of the occurrence of particles having a particle size in the range of 60 nm to 200 nm was 80%. From the crystallite correlation length r and the volume average particle size R, parameter k (=r/R) was 0.11.

Comparative Example 36

An electrophotographic photosensitive member of Comparative Example 36 was produced in the same manner as in Example 45, except that the process for producing the hydroxygallium phthalocyanine pigment was changed as below.

In a sand mill K-800 (manufactured by Aimex, disk diameter: 70 mm, 5 disks) with cooling water of 18° C., 1 part of the hydroxygallium phthalocyanine pigment produced in Synthesis Example 3 and 9 parts of N,N-dimethylformamide D0722 (manufactured by Tokyo Chemical Industry) were subjected to milling for 30 hours with 15 parts of glass beads of 0.9 mm in diameter. This operation was performed under the condition where the disks were rotated at 600 rpm. The liquid subjected to the milling operation was passed through a filter (N-NO. 125T, pore size: 133 µm, manufactured by NBC Meshtec) to remove the glass beads. After adding 30 parts of N,N-dimethylformamide to the resulting liquid, the mixture was filtered, and the filtration product remaining on the filter was sufficiently washed with tetrahydrofuran. Then, the resulting filtration product was vacuum-dried to yield 0.45 part of a hydroxygallium phthalocyanine pigment. The crystallite correlation length r of the resulting pigment, which was estimated from the peak at $7.5°±0.2°$ that was the strongest of the peaks in the CuKα X-ray diffraction spectrum, was 25 nm.

The volume average particle size R of the hydroxygallium phthalocyanine pigment in the charge generating layer, which was estimated from the particle size distribution obtained using the SEM micrograph, was 158 nm. In the particle size distribution, the volume frequency of the occurrence of particles having a particle size in the range of 60 nm to 200 nm was 77%. From the crystallite correlation length r and the volume average particle size R, parameter k (=r/R) was 0.16.

Comparative Example 37

An electrophotographic photosensitive member of Comparative Example 37 was produced in the same manner as in Example 45, except that the process for producing the hydroxygallium phthalocyanine pigment was changed as below.

Using a paint shaker (manufactured by Toyo Seiki), 0.5 part of the hydroxygallium phthalocyanine pigment produced in Synthesis Example 3 and 9.5 parts of N,N-dimethylformamide D0722 (manufactured by Tokyo Chemical Industry) were subjected to milling with 15 parts of glass beads of 0.9 mm in diameter at room temperature (23° C.) for 4 hours. For this operation, a standard bottle PS-6 (manufactured by Hakuyo Glass) was used as the container. The liquid subjected to the milling operation was passed through a filter (N-NO. 125T, pore size: 133 µm, manufactured by NBC Meshtec) to remove the glass beads. After adding 30 parts of N,N-dimethylformamide to the resulting liquid, the mixture was filtered, and the filtration product remaining on the filter was sufficiently washed with tetrahydrofuran. Then, the resulting filtration product was vacuum-dried to yield 0.44 part of a hydroxygallium phthalocyanine pigment. The crystallite correlation length r of the resulting pigment, which was estimated from the peak at $7.5°±0.2°$ that was the strongest of the peaks in the CuKα X-ray diffraction spectrum, was 18 nm.

The volume average particle size R of the hydroxygallium phthalocyanine pigment in the charge generating layer, which was estimated from the particle size distribution obtained using the SEM micrograph, was 123 nm. In the particle size distribution, the volume frequency of the occurrence of particles having a particle size in the range of 60 nm to 200 nm was 71%. From the crystallite correlation length r and the volume average particle size R, parameter k (=r/R) was 0.14.

Comparative Example 38

An electrophotographic photosensitive member of Comparative Example 38 was produced in the same manner as in Example 55, except that the process for producing the hydroxygallium phthalocyanine pigment was changed as below.

Using a ball mill machine, 0.5 part of the hydroxygallium phthalocyanine pigment produced in Synthesis Example 3 and 9.5 parts of dimethyl sulfoxide D0798 (manufactured by Tokyo Chemical Industry) were subjected to milling with 15 parts of glass beads of 0.9 mm in diameter at room temperature (23° C.) for 48 hours. This operation was performed in a standard bottle PS-6 (manufactured by Hakuyo Glass) under the condition where the bottle was rotated at a speed of 60 rpm. The liquid subjected to the milling operation was passed through a filter (N-NO. 125T, pore size: 133 μm, manufactured by NBC Meshtec) to remove the glass beads. After adding 30 parts of dimethyl sulfoxide to the resulting liquid, the mixture was filtered, and the filtration product remaining on the filter was sufficiently washed with tetrahydrofuran. Then, the resulting filtration product was vacuum-dried to yield 0.44 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 23 nm.

The volume average particle size R of the hydroxygallium phthalocyanine pigment in the charge generating layer, which was estimated from the particle size distribution obtained using the SEM micrograph, was 183 nm. In the particle size distribution, the volume frequency of the occurrence of particles having a particle size in the range of 60 nm to 200 nm was 63%. From the crystallite correlation length r and the volume average particle size R, parameter k (=r/R) was 0.13.

Comparative Example 39

An electrophotographic photosensitive member of Comparative Example 39 was produced in the same manner as in Comparative Example 38, except that the time for the milling operation using the ball mill machine was changed from 48 hours to 100 hours. The crystallite correlation length r of the resulting pigment, which was estimated from the peak at 7.5°±0.2° that was the strongest of the peaks in the CuKα X-ray diffraction spectrum, was 23 nm.

The volume average particle size R of the hydroxygallium phthalocyanine pigment in the charge generating layer, which was estimated from the particle size distribution obtained using the SEM micrograph, was 178 nm. In the particle size distribution, the volume frequency of the occurrence of particles having a particle size in the range of 60 nm to 200 nm was 66%. From the crystallite correlation length r and the volume average particle size R, parameter k (=r/R) was 0.13.

Comparative Example 40

An electrophotographic photosensitive member of Comparative Example 40 was produced in the same manner as in Comparative Example 38, except that the time for the milling operation using the ball mill machine was changed from 48 hours to 192 hours. The crystallite correlation length r of the resulting pigment, which was estimated from the peak at 7.5°±0.2° that was the strongest of the peaks in the CuKα X-ray diffraction spectrum, was 23 nm.

The volume average particle size R of the hydroxygallium phthalocyanine pigment in the charge generating layer, which was estimated from the particle size distribution obtained using the SEM micrograph, was 176 nm. In the particle size distribution, the volume frequency of the occurrence of particles having a particle size in the range of 60 nm to 200 nm was 67%. From the crystallite correlation length r and the volume average particle size R, parameter k (=r/R) was 0.13.

Comparative Example 41

An electrophotographic photosensitive member of Comparative Example 41 was produced in the same manner as in Example 45, except that the process for producing the hydroxygallium phthalocyanine pigment was changed as below.

In the first milling operation, 0.5 part of the hydroxygallium phthalocyanine pigment produced in Synthesis Example 7 and 8 parts of N,N-dimethylformamide D0722 (manufactured by Tokyo Chemical Industry) were subjected to milling at 30° C. for 24 hours by using a magnetic stirrer. This operation was performed in a standard bottle PS-6 (manufactured by Hakuyo Glass) under the condition where the stirring bar was rotated at a speed of 1,500 rpm. After adding 30 parts of N,N-dimethylformamide to the resulting liquid, the mixture was filtered, and the filtration product remaining on the filter was sufficiently washed with ion exchanged water. Then, the resulting filtration product was vacuum-dried to yield 0.45 part of a hydroxygallium phthalocyanine pigment. Subsequently, 0.5 part of the resulting hydroxygallium phthalocyanine pigment was subjected to milling (second milling operation) with 5 parts of zirconia beads of 5.0 mm in diameter at room temperature (23° C.) for 5 minutes by using a small vibration mill MB-0 (manufactured by Chuo Kakohki). For this operation, an alumina pot was used as the container. Thus, 0.48 part of a hydroxygallium phthalocyanine pigment was produced. The crystallite correlation length r of the resulting pigment, which was estimated from the peak at 7.5°±0.2° that was the strongest of the peaks in the CuKα X-ray diffraction spectrum, was 21 nm.

The volume average particle size R of the hydroxygallium phthalocyanine pigment in the charge generating layer, which was estimated from the particle size distribution obtained using the SEM micrograph, was 248 nm. In the particle size distribution, the volume frequency of the occurrence of particles having a particle size in the range of 60 nm to 200 nm was 54%. From the crystallite correlation length r and the volume average particle size R, parameter k (=r/R) was 0.09.

Comparative Example 42

An electrophotographic photosensitive member of Comparative Example 42 was produced in the same manner as in Comparative Example 41, except that the time for the second milling operation using the small vibration mill was changed from 5 minutes to 20 minutes. The crystallite correlation length r of the resulting pigment, which was estimated from the peak at 7.5°±0.2° that was the strongest of the peaks in the CuKα X-ray diffraction spectrum, was 21 nm.

The volume average particle size R of the hydroxygallium phthalocyanine pigment in the charge generating layer, which was estimated from the particle size distribution obtained using the SEM micrograph, was 194 nm. In the particle size distribution, the volume frequency of the occurrence of particles having a particle size in the range of 60 nm to 200 nm was 59%. From the crystallite correlation length r and the volume average particle size R, parameter k (=r/R) was 0.11.

Comparative Example 43

An electrophotographic photosensitive member of Comparative Example 43 was produced in the same manner as in Comparative Example 41, except that the time for the second milling operation using the small vibration mill was changed from 5 minutes to 40 minutes. The crystallite correlation length r of the resulting pigment, which was estimated from the peak at 7.5°±0.2° that was the strongest of the peaks in the CuKα X-ray diffraction spectrum, was 17 nm.

The volume average particle size R of the hydroxygallium phthalocyanine pigment in the charge generating layer, which was estimated from the particle size distribution obtained using the SEM micrograph, was 142 nm. In the particle size distribution, the volume frequency of the occurrence of particles having a particle size in the range of 60 nm to 200 nm was 63%. From the crystallite correlation length r and the volume average particle size R, parameter k (=r/R) was 0.12.

Comparative Example 44

An electrophotographic photosensitive member of Comparative Example 44 was produced in the same manner as in Comparative Example 41, except that the time for the second milling operation using the small vibration mill was changed from 5 minutes to 1 hour. The crystallite correlation length r of the resulting pigment, which was estimated from the peak at 7.5°±0.2° that was the strongest of the peaks in the CuKα X-ray diffraction spectrum, was 8 nm.

The volume average particle size R of the hydroxygallium phthalocyanine pigment in the charge generating layer, which was estimated from the particle size distribution obtained using the SEM micrograph, was 112 nm. In the particle size distribution, the volume frequency of the occurrence of particles having a particle size in the range of 60 nm to 200 nm was 67%. From the crystallite correlation length r and the volume average particle size R, parameter k (=r/R) was 0.07.

Comparative Example 45

An electrophotographic photosensitive member of Comparative Example 45 was produced in the same manner as in Comparative Example 41, except that the time for the second milling operation using the small vibration mill was changed from 5 minutes to 2 hours. The crystallite correlation length r of the resulting pigment, which was estimated from the peak at 7.5°±0.2° that was the strongest of the peaks in the CuKα X-ray diffraction spectrum, was 5 nm.

The volume average particle size R of the hydroxygallium phthalocyanine pigment in the charge generating layer, which was estimated from the particle size distribution obtained using the SEM micrograph, was 104 nm. In the particle size distribution, the volume frequency of the occurrence of particles having a particle size in the range of 60 nm to 200 nm was 70%. From the crystallite correlation length r and the volume average particle size R, parameter k (=r/R) was 0.05.

Comparative Example 46

An electrophotographic photosensitive member of Comparative Example 46 was produced in the same manner as in Comparative Example 41, except that the second milling operation in the process for producing the hydroxygallium phthalocyanine pigment was changed as below.

In the first milling operation, 0.5 part of the hydroxygallium phthalocyanine pigment produced in Synthesis Example 7 and 8 parts of N,N-dimethylformamide D0722 (manufactured by Tokyo Chemical Industry) were subjected to milling at 30° C. for 24 hours by using a magnetic stirrer. This operation was performed in a standard bottle PS-6 (manufactured by Hakuyo Glass) under the condition where the stirring bar was rotated at a speed of 1,500 rpm. After adding 30 parts of N,N-dimethylformamide to the resulting liquid, the mixture was filtered, and the filtration product remaining on the filter was sufficiently washed with ion exchanged water. Then, the resulting filtration product was vacuum-dried to yield 0.45 part of a hydroxygallium phthalocyanine pigment. Subsequently, a slurry was prepared by mixing 0.5 part of the resulting hydroxygallium phthalocyanine pigment with 5 parts of ion exchanged water having an electrical conductivity of 0.1 μS/cm. The slurry was then subjected to milling (second milling operation) at room temperature (23° C.) for 5 minutes by using a microparticulation emulsification dispersion machine (manufactured by Sugino Machine). This operation was performed at a pressure of 1,500 kg/cm$^2$ and an ejection rate of 350 mL/min. The resulting slurry was subjected to centrifugation to remove water and then vacuum-dried to yield 0.41 part of a hydroxygallium phthalocyanine pigment. The crystallite correlation length r of the resulting pigment, which was estimated from the peak at 7.5°±0.2° that was the strongest of the peaks in the CuKα X-ray diffraction spectrum, was 20 nm.

The volume average particle size R of the hydroxygallium phthalocyanine pigment in the charge generating layer, which was estimated from the particle size distribution obtained using the SEM micrograph, was 153 nm. In the particle size distribution, the volume frequency of the occurrence of particles having a particle size in the range of 60 nm to 200 nm was 70%. From the crystallite correlation length r and the volume average particle size R, parameter k (=r/R) was 0.13.

Comparative Example 47

An electrophotographic photosensitive member of Comparative Example 47 was produced in the same manner as in Comparative Example 46, except that the time for the second milling operation using the small vibration mill was changed from 5 minutes to 20 minutes. The crystallite correlation length r of the resulting pigment, which was estimated from the peak at 7.5°±0.2° that was the strongest of the peaks in the CuKα X-ray diffraction spectrum, was 18 nm.

The volume average particle size R of the hydroxygallium phthalocyanine pigment in the charge generating layer, which was estimated from the particle size distribution obtained using the SEM micrograph, was 131 nm. In the particle size distribution, the volume frequency of the occurrence of particles having a particle size in the range of 60 nm to 200 nm was 74%. From the crystallite correlation length r and the volume average particle size R, parameter k (=r/R) was 0.14.

Comparative Example 48

An electrophotographic photosensitive member of Comparative Example 48 was produced in the same manner as in Comparative Example 46, except that the time for the milling operation using the small vibration mill was changed from 5 minutes to 1 hour. The crystallite correlation length r of the resulting pigment, which was estimated from the peak at 7.5°±0.2° that was the strongest of the peaks in the CuKα X-ray diffraction spectrum, was 7 nm.

The volume average particle size R of the hydroxygallium phthalocyanine pigment in the charge generating layer, which was estimated from the particle size distribution obtained using the SEM micrograph, was 98 nm. In the particle size distribution, the volume frequency of the occurrence of particles having a particle size in the range of 60 nm to 200 nm was 82%. From the crystallite correlation length r and the volume average particle size R, parameter k (=r/R) was 0.07.

Comparative Example 49

An electrophotographic photosensitive member of Comparative Example 49 was produced in the same manner as in Example 64, except that the process for producing the chlorogallium phthalocyanine pigment was changed as below.

Using a paint shaker (manufactured by Toyo Seiki), 0.5 part of the chlorogallium phthalocyanine pigment produced in Synthesis Example 4 and 10 parts of N,N-dimethylformamide D0722 (manufactured by Tokyo Chemical Industry) were subjected to milling with 15 parts of glass beads of 0.9 mm in diameter at room temperature (23° C.) for 50 hours. For this operation, a standard bottle PS-6 (manufactured by Hakuyo Glass) was used as the container. The liquid subjected to the milling operation was passed through a filter (N-NO. 125T, pore size: 133 μm, manufactured by NBC Meshtec) to remove the glass beads. After adding 30 parts of N,N-dimethylformamide to the resulting liquid, the mixture was filtered, and the filtration product remaining on the filter was sufficiently washed with tetrahydrofuran. Then, the washed filtration product was vacuum-dried to yield 0.47 part of a chlorogallium phthalocyanine pigment. The crystallite correlation length r of the resulting pigment, which was estimated from the peak at 7.4° that was the strongest of the peaks in the CuKα X-ray diffraction spectrum, was 16 nm.

The volume average particle size R of the chlorogallium phthalocyanine pigment in the charge generating layer, which was estimated from the particle size distribution obtained using the SEM micrograph, was 114 nm. In the particle size distribution, the volume frequency of the occurrence of particles having a particle size in the range of 60 nm to 200 nm was 51%. From the crystallite correlation length r and the volume average particle size R, parameter k (=r/R) was 0.14.

Comparative Example 50

An electrophotographic photosensitive member of Comparative Example 50 was produced in the same manner as in Comparative Example 49, except that the time for the milling operation using the paint shaker was changed from 50 hours to 100 hours. The crystallite correlation length r of the resulting pigment, which was estimated from the peak at 7.4° that was the strongest of the peaks in the CuKα X-ray diffraction spectrum, was 15 nm.

The volume average particle size R of the chlorogallium phthalocyanine pigment in the charge generating layer, which was estimated from the particle size distribution obtained using the SEM micrograph, was 105 nm. In the particle size distribution, the volume frequency of the occurrence of particles having a particle size in the range of 60 nm to 200 nm was 42%. From the crystallite correlation length r and the volume average particle size R, parameter k (=r/R) was 0.14.

Comparative Example 51

An electrophotographic photosensitive member of Comparative Example 51 was produced in the same manner as in Example 85, except that the process for producing the chlorogallium phthalocyanine pigment was changed as below.

Using a ball mill machine, 0.5 part of the chlorogallium phthalocyanine pigment produced in Synthesis Example 4 and 10 parts of dimethyl sulfoxide D0798 (manufactured by Tokyo Chemical Industry) were subjected to milling with 15 parts of glass beads of 5.0 mm in diameter at room temperature (23° C.) for 24 hours. This operation was performed in a standard bottle PS-6 (manufactured by Hakuyo Glass) under the condition where the bottle was rotated at a speed of 120 rpm. The liquid subjected to the milling operation was passed through a filter (N-NO. 125T, pore size: 133 μm, manufactured by NBC Meshtec) to remove the glass beads. After adding 30 parts of dimethyl sulfoxide to the resulting liquid, the mixture was filtered, and the filtration product remaining on the filter was sufficiently washed with tetrahydrofuran. Then, the washed filtration product was vacuum-dried to yield 0.46 part of a chlorogallium phthalocyanine pigment. The crystallite correlation length r of the resulting pigment, which was estimated from the peak at 7.4° that was the strongest of the peaks in the CuKα X-ray diffraction spectrum, was 23 nm.

The volume average particle size R of the chlorogallium phthalocyanine pigment in the charge generating layer, which was estimated from the particle size distribution obtained using the SEM micrograph, was 184 nm. In the particle size distribution, the volume frequency of the occurrence of particles having a particle size in the range of 60 nm to 200 nm was 64%. From the crystallite correlation length r and the volume average particle size R, parameter k (=r/R) was 0.12.

Comparative Example 52

An electrophotographic photosensitive member of Comparative Example 52 was produced in the same manner as in Example 85, except that the process for producing the chlorogallium phthalocyanine pigment was changed as below.

In the first milling operation, 0.5 part of the chlorogallium phthalocyanine pigment produced in Synthesis Example 6 was subjected to milling with 10 parts of alumina beads of 5.0 mm in diameter at room temperature (23° C.) for 180 hours by using a vibration mill MB-1 (manufactured by Chuo Kakohki). For this operation, an alumina pot was used as the container. Thus, 0.45 part of a chlorogallium phthalocyanine pigment was produced. Subsequently, 0.5 part of the resulting chlorogallium phthalocyanine pigment and 10 parts of dimethyl sulfoxide D0798 (manufactured by Tokyo Chemical Industry) were subjected to milling (second milling operation) with 29 parts of glass beads of 1.0 mm in diameter at 25° C. for 72 hours by using a ball mill machine.

This operation was performed in a standard bottle PS-6 (manufactured by Hakuyo Glass) under the condition where the bottle was rotated at a speed of 60 rpm. The liquid subjected to the milling operation was passed through a filter (N-NO. 125T, pore size: 133 µm, manufactured by NBC Meshtec) to remove the glass beads. After adding 30 parts of dimethyl sulfoxide to the resulting liquid, the mixture was filtered, and the filtration product remaining on the filter was sufficiently washed with acetone. Then, the washed filtration product was dried by heating at 80° C. for 24 hours under reduced pressure (vacuum) to yield 0.46 part of a chlorogallium phthalocyanine pigment. The crystallite correlation length r of the resulting pigment, which was estimated from the peak at 7.4° that was the strongest of the peaks in the CuKα X-ray diffraction spectrum, was 13 nm.

The volume average particle size R of the chlorogallium phthalocyanine pigment in the charge generating layer, which was estimated from the particle size distribution obtained using the SEM micrograph, was 103 nm. In the particle size distribution, the volume frequency of the occurrence of particles having a particle size in the range of 60 nm to 200 nm was 74%. From the crystallite correlation length r and the volume average particle size R, parameter k (=r/R) was 0.13.

Comparative Example 53

An electrophotographic photosensitive member of Comparative Example 53 was produced in the same manner as in Comparative Example 52, except that second milling operation using the ball mill machine, which was performed with 29 parts of glass beads of 1.0 mm in diameter for 72 hours in Comparative Example 52, was performed with 29 parts of glass beads of 1.5 mm in diameter for 96 hours. The crystallite correlation length r of the resulting pigment, which was estimated from the peak at 7.4° that was the strongest of the peaks in the CuKα X-ray diffraction spectrum, was 13 nm.

The volume average particle size R of the chlorogallium phthalocyanine pigment in the charge generating layer, which was estimated from the particle size distribution obtained using the SEM micrograph, was 138 nm. In the particle size distribution, the volume frequency of the occurrence of particles having a particle size in the range of 60 nm to 200 nm was 77%. From the crystallite correlation length r and the volume average particle size R, parameter k (=r/R) was 0.10.

Comparative Example 54

An electrophotographic photosensitive member of Comparative Example 54 was produced in the same manner as in Comparative Example 53, except that the time for the second milling operation using the ball mill machine was changed from 96 hours to 120 hours. The crystallite correlation length r of the resulting pigment, which was estimated from the peak at 7.4° that was the strongest of the peaks in the CuKα X-ray diffraction spectrum, was 12 nm.

The volume average particle size R of the chlorogallium phthalocyanine pigment in the charge generating layer, which was estimated from the particle size distribution obtained using the SEM micrograph, was 153 nm. In the particle size distribution, the volume frequency of the occurrence of particles having a particle size in the range of 60 nm to 200 nm was 68%. From the crystallite correlation length r and the volume average particle size R, parameter k (=r/R) was 0.08.

Comparative Example 55

An electrophotographic photosensitive member of Comparative Example 55 was produced in the same manner as in Comparative Example 52, except that second milling operation, which was performed with 10 parts of dimethyl sulfoxide and 29 parts of glass beads of 1.0 mm in diameter in the standard bottle PS-6 (manufactured by Hakuyo Glass) in Comparative Example 52, was performed with 13 parts of dimethyl sulfoxide and 37 parts of glass beads of 0.3 mm in diameter in a 110 mL stainless (SUS-304) pot (manufactured by Irie Shokai).

The crystallite correlation length r of the resulting pigment, which was estimated from the peak at 7.4° that was the strongest of the peaks in the CuKα X-ray diffraction spectrum, was 12 nm.

The volume average particle size R of the chlorogallium phthalocyanine pigment in the charge generating layer, which was estimated from the particle size distribution obtained using the SEM micrograph, was 88 nm. In the particle size distribution, the volume frequency of the occurrence of particles having a particle size in the range of 60 nm to 200 nm was 63%. From the crystallite correlation length r and the volume average particle size R, parameter k (=r/R) was 0.13.

Comparative Example 56

An electrophotographic photosensitive member of Comparative Example 56 was produced in the same manner as in Comparative Example 52, except that the process for producing the chlorogallium phthalocyanine pigment was changed as below.

In the first milling operation, 0.5 part of the chlorogallium phthalocyanine pigment produced in Synthesis Example 10 was subjected to milling with 10 parts of alumina beads of 5.0 mm in diameter at room temperature (23° C.) for 180 hours by using a vibration mill MB-1 (manufactured by Chuo Kakohki). For this operation, an alumina pot was used as the container. Thus, 0.45 part of a chlorogallium phthalocyanine pigment was produced. Subsequently, 0.5 part of the resulting chlorogallium phthalocyanine pigment and 50 parts of dimethyl sulfoxide D0798 (manufactured by Tokyo Chemical Industry) were subjected to milling (second milling operation) for 24 hours by using a stirring vessel equipped with a tilted stirring paddle and a baffle plate in a thermostatic bath of 20° C. This operation was performed under the condition where the stirring paddle was rotated at 250 rpm. After adding 30 parts of dimethyl sulfoxide to the resulting liquid, the mixture was filtered, and the filtration product remaining on the filter was sufficiently washed with ion exchanged water. Then, the washed filtration product was dried by heating at 80° C. for 24 hours under reduced pressure (vacuum) and heating at 150° C. for 5 hours under reduced pressure (vacuum) to yield 0.46 part of a chlorogallium phthalocyanine pigment. The crystallite correlation length r of the resulting pigment, which was estimated from the peak at 7.4° that was the strongest of the peaks in the CuKα X-ray diffraction spectrum, was 17 nm.

The volume average particle size R of the chlorogallium phthalocyanine pigment in the charge generating layer, which was estimated from the particle size distribution obtained using the SEM micrograph, was 132 nm. In the particle size distribution, the volume frequency of the occurrence of particles having a particle size in the range of 60 nm to 200 nm was 63%. From the crystallite correlation length r and the volume average particle size R, parameter k (=r/R) was 0.13.

Comparative Example 57

An electrophotographic photosensitive member of Comparative Example 57 was produced in the same manner as in Comparative Example 56, except that the temperature of the thermostatic bath used in the second milling operation was changed from 20° C. to 28° C. The crystallite correlation length r of the resulting pigment, which was estimated from the peak at 7.4° that was the strongest of the peaks in the CuKα X-ray diffraction spectrum, was 18 nm.

The volume average particle size R of the chlorogallium phthalocyanine pigment in the charge generating layer, which was estimated from the particle size distribution obtained using the SEM micrograph, was 153 nm. In the particle size distribution, the volume frequency of the occurrence of particles having a particle size in the range of 60 nm to 200 nm was 63%. From the crystallite correlation length r and the volume average particle size R, parameter k (=r/R) was 0.12.

Comparative Example 58

An electrophotographic photosensitive member of Comparative Example 58 was produced in the same manner as in Comparative Example 56, except that the second milling operation in the process for producing the chlorogallium phthalocyanine pigment was changed as below.

In the first milling operation, 0.5 part of the chlorogallium phthalocyanine pigment produced in Synthesis Example 10 was subjected to milling with 10 parts of alumina beads of 5.0 mm in diameter at room temperature (23° C.) for 180 hours by using a vibration mill MB-1 (manufactured by Chuo Kakohki). For this operation, an alumina pot was used as the container. Thus, 0.45 part of a chlorogallium phthalocyanine pigment was produced. Subsequently, 0.5 part of the resulting chlorogallium phthalocyanine pigment and 50 parts of benzyl alcohol B2378 (manufactured by Tokyo Chemical Industry) were subjected to milling (second milling operation) for 24 hours by using a stirring vessel equipped with a tilted stirring paddle and a baffle plate in a thermostatic bath of 5° C. This operation was performed under the condition where the stirring paddle was rotated at 200 rpm. The resulting liquid was filtered through a monolith ceramic membrane filter (37 holes of 3 mm in diameter, manufactured by NGK) using ethyl acetate and then dried by heating at 80° C. for 24 hours under reduced pressure (vacuum) in a vibration fluidizing vacuum dryer VFD (manufactured by Mitsubishi Materials Techno). The resulting product was further dried by heating at 150° C. for 5 hours under reduced pressure (vacuum) to yield 0.47 part of a chlorogallium phthalocyanine pigment. The crystallite correlation length r of the resulting pigment, which was estimated from the peak at 7.4° that was the strongest of the peaks in the CuKα X-ray diffraction spectrum, was 18 nm.

The volume average particle size R of the chlorogallium phthalocyanine pigment in the charge generating layer, which was estimated from the particle size distribution obtained using the SEM micrograph, was 128 nm. In the particle size distribution, the volume frequency of the occurrence of particles having a particle size in the range of 60 nm to 200 nm was 63%. From the crystallite correlation length r and the volume average particle size R, parameter k (=r/R) was 0.14.

Comparative Example 59

An electrophotographic photosensitive member of Comparative Example 59 was produced in the same manner as in Example 93, except that the process for producing the titanyl phthalocyanine pigment was changed as below.

In a sand mill K-800 (manufactured by Aimex, disk diameter: 70 mm, 5 disks) with cooling water of 18° C., 0.5 part of the titanyl phthalocyanine pigment produced in Synthesis Example 5 and 10 parts of tetrahydrofuran were subjected to milling for 1 hour with 15 parts of glass beads of 0.9 mm in diameter. This operation was performed under the condition where the disks were rotated at 500 rpm. The liquid subjected to the milling operation was passed through a filter (N-NO. 125T, pore size: 133 µm, manufactured by NBC Meshtec) to remove the glass beads. After adding 30 parts of tetrahydrofuran to the resulting liquid, the mixture was filtered, and the filtration product remaining on the filter was sufficiently washed with methanol and water. Then, the washed filtration product was vacuum-dried to yield 0.45 part of a titanyl phthalocyanine pigment.

The crystallite correlation length r of the resulting pigment, which was estimated from the peak at 27.2°±0.2° that was the strongest peak in the CuKα X-ray diffraction spectrum, was 23 nm.

The volume average particle size R of the titanyl phthalocyanine pigment in the charge generating layer, which was estimated from the particle size distribution obtained using the SEM micrograph, was 248 nm. In the particle size distribution, the volume frequency of the occurrence of particles having a particle size in the range of 60 nm to 200 nm was 64%. From the crystallite correlation length r and the volume average particle size R, parameter k (=r/R) was 0.09.

Comparative Example 60

An electrophotographic photosensitive member of Comparative Example 60 was produced in the same manner as in Comparative Example 59, except that the time for the milling operation using the sand mill was changed from 1 hour to 5 hours. The crystallite correlation length r of the resulting pigment, which was estimated from the peak at 27.2°±0.2° that was the strongest peak in the CuKα X-ray diffraction spectrum, was 27 nm.

The volume average particle size R of the chlorogallium phthalocyanine pigment in the charge generating layer, which was estimated from the particle size distribution obtained using the SEM micrograph, was 238 nm. In the particle size distribution, the volume frequency of the occurrence of particles having a particle size in the range of 60 nm to 200 nm was 69%. From the crystallite correlation length r and the volume average particle size R, parameter k (=r/R) was 0.11.

Comparative Example 61

An electrophotographic photosensitive member of Comparative Example 61 was produced in the same manner as in Comparative Example 59, except that the time for the milling operation using the sand mill was changed from 1 hour to 10 hours. The crystallite correlation length r of the resulting pigment, which was estimated from the peak at 27.2°±0.2° that was the strongest peak in the CuKα X-ray diffraction spectrum, was 29 nm.

The volume average particle size R of the chlorogallium phthalocyanine pigment in the charge generating layer, which was estimated from the particle size distribution obtained using the SEM micrograph, was 230 nm. In the particle size distribution, the volume frequency of the occurrence of particles having a particle size in the range of 60 nm to 200 nm was 71%. From the crystallite correlation length r and the volume average particle size R, parameter k (=r/R) was 0.13.

Comparative Example 62

An electrophotographic photosensitive member of Comparative Example 62 was produced in the same manner as in Comparative Example 59, except that the time for the milling operation using the sand mill was changed from 1 hour to 20 hours. The crystallite correlation length r of the resulting pigment, which was estimated from the peak at 27.2°±0.2° that was the strongest peak in the CuKα X-ray diffraction spectrum, was 31 nm.

The volume average particle size R of the chlorogallium phthalocyanine pigment in the charge generating layer, which was estimated from the particle size distribution obtained using the SEM micrograph, was 221 nm. In the particle size distribution, the volume frequency of the occurrence of particles having a particle size in the range of 60 nm to 200 nm was 74%. From the crystallite correlation length r and the volume average particle size R, parameter k (=r/R) was 0.14.

Comparative Example 63

An electrophotographic photosensitive member of Comparative Example 63 was produced in the same manner as in Comparative Example 59, except that the time for the milling operation using the sand mill was changed from 1 hour to 48 hours. The crystallite correlation length r of the resulting pigment, which was estimated from the peak at 27.2°±0.2° that was the strongest peak in the CuKα X-ray diffraction spectrum, was 34 nm.

The volume average particle size R of the chlorogallium phthalocyanine pigment in the charge generating layer, which was estimated from the particle size distribution obtained using the SEM micrograph, was 210 nm. In the particle size distribution, the volume frequency of the occurrence of particles having a particle size in the range of 60 nm to 200 nm was 75%. From the crystallite correlation length r and the volume average particle size R, parameter k (=r/R) was 0.16.

Comparative Example 64

An electrophotographic photosensitive member of Comparative Example 64 was produced in the same manner as in Comparative Example 59, except that the time for the milling operation using the sand mill was changed from 1 hour to 100 hours. The crystallite correlation length r of the resulting pigment, which was estimated from the peak at 27.2°±0.2° that was the strongest peak in the CuKα X-ray diffraction spectrum, was 34 nm.

The volume average particle size R of the chlorogallium phthalocyanine pigment in the charge generating layer, which was estimated from the particle size distribution obtained using the SEM micrograph, was 205 nm. In the particle size distribution, the volume frequency of the occurrence of particles having a particle size in the range of 60 nm to 200 nm was 77%. From the crystallite correlation length r and the volume average particle size R, parameter k (=r/R) was 0.16.

Comparative Example 65

An electrophotographic photosensitive member of Comparative Example 65 was produced in the same manner as in Comparative Example 59, except that the time for the milling operation using the sand mill was changed from 1 hour to 300 hours. The crystallite correlation length r of the resulting pigment, which was estimated from the peak at 27.2°±0.2° that was the strongest peak in the CuKα X-ray diffraction spectrum, was 33 nm.

The volume average particle size R of the chlorogallium phthalocyanine pigment in the charge generating layer, which was estimated from the particle size distribution obtained using the SEM micrograph, was 201 nm. In the particle size distribution, the volume frequency of the occurrence of particles having a particle size in the range of 60 nm to 200 nm was 78%. From the crystallite correlation length r and the volume average particle size R, parameter k (=r/R) was 0.16.

Comparative Example 66

An electrophotographic photosensitive member of Comparative Example 66 was produced in the same manner as in Example 101, except that the process for producing the titanyl phthalocyanine pigment was changed as below.

In a sand mill K-800 (manufactured by Aimex, disk diameter: 70 mm, 5 disks) with cooling water of 18° C., 0.5 part of the titanyl phthalocyanine pigment produced in Synthesis Example 5 and 10 parts of n-butyl ether were subjected to milling for 20 hours with 15 parts of glass beads of 0.9 mm in diameter. This operation was performed under the condition where the disks were rotated at 500 rpm. The liquid subjected to the milling operation was passed through a filter (N-NO. 125T, pore size: 133 μm, manufactured by NBC Meshtec) to remove the glass beads. After adding 30 parts of n-butyl ether to the resulting liquid, the mixture was filtered, and the filtration product remaining on the filter was sufficiently washed with methanol and water. Then, the washed filtration product was vacuum-dried to yield 0.45 part of a titanyl phthalocyanine pigment. The crystallite correlation length r of the resulting pigment, which was estimated from the peak at 27.2°±0.2° that was the strongest peak in the CuKα X-ray diffraction spectrum, was 27 nm.

The volume average particle size R of the titanyl phthalocyanine pigment in the charge generating layer, which was estimated from the particle size distribution obtained using the SEM micrograph, was 181 nm. In the particle size distribution, the volume frequency of the occurrence of particles having a particle size in the range of 60 nm to 200 nm was 66%. From the crystallite correlation length r and the volume average particle size R, parameter k (=r/R) was 0.15.

Comparative Example 67

An electrophotographic photosensitive member of Comparative Example 67 was produced in the same manner as in Comparative Example 63, except that the process for forming the charge generating layer was changed as below.

In a sand mill K-800 (manufactured by Aimex, disk diameter: 70 mm, 5 disks) with cooling water of 18° C., 0.5 part of the titanyl phthalocyanine pigment produced in Synthesis Example 5 and 10 parts of tetrahydrofuran were subjected to milling for 48 hours with 15 parts of glass beads of 0.9 mm in diameter. This operation was performed under the condition where the disks were rotated at 500 rpm. The liquid subjected to the milling operation was passed through a filter (N-NO. 125T, pore size: 133 µm, manufactured by NBC Meshtec) to remove the glass beads. After adding 30 parts of tetrahydrofuran to the resulting liquid, the mixture was filtered, and the filtration product remaining on the filter was sufficiently washed with methanol and water. Then, the washed filtration product was vacuum-dried to yield 0.45 part of a titanyl phthalocyanine pigment. The crystallite correlation length r of the resulting pigment, which was estimated from the peak at 27.2°±0.2° that was the strongest of the peaks in the CuKα X-ray diffraction spectrum, was 34 nm. Subsequently, 12 parts of the titanyl phthalocyanine pigment subjected to the above-described milling operation and 10 parts of a polyvinyl butyral S-LEC BX-1 (produced by Sekisui Chemical) were dispersed in 304 parts of 9:1 mixed solution of 1,2-dimethoxyethane and 4-methoxy-4-methyl-2-pentanone with 716 parts of zirconia beads of 0.03 mm in diameter for 60 minutes by using Ultra Apex Mill UAM-015 (mill capacity: about 0.15 L, manufactured by Kotobuki Industries) with cooling water of 10° C. This dispersing operation was performed at a rotor peripheral speed of 8 m/s and a flow rate of 10 kg/hour. The liquid thus subjected to the milling operation was filtered through a filter (N-NO. 508S, pore size: 20 µm, manufactured by NBC Meshtec) to remove the zirconia beads. The materials in the resulting liquid were dispersed with an ultrasonic disperser UT-205 (manufactured by Sharp) at room temperature (23° C.) for 150 minutes. For this operation, a standard bottle PS-6 (manufactured by Hakuyo Glass) was used as the container, and the power of the ultrasonic disperser was 100%. In this dispersing operation, no media, such as zirconia beads, were used. Thus, a coating liquid for forming a charge generating layer was prepared. This coating liquid was applied to the surface of the undercoat layer by dipping. The resulting coating film was heated to dry at 100° C. for 10 minutes to yield a 0.14 µm-thick charge generating layer.

This charge generating layer was removed and powdered. The powder was agitated with an ultrasonic disperser and subjected to powder X-ray diffraction analysis. The crystallite correlation length r of the resulting pigment, which was estimated from the peak at 27.2°±0.2° that was the strongest peak in the CuKα X-ray diffraction spectrum, was 23 nm. This result suggests that the crystallite correlation length of the phthalocyanine pigment in this case was reduced by the above-described dispersing operation.

The volume average particle size R of the titanyl phthalocyanine pigment in the charge generating layer, which was estimated from the particle size distribution obtained using the SEM micrograph, was 155 nm. In the particle size distribution, the volume frequency of the occurrence of particles having a particle size in the range of 60 nm to 200 nm was 81%. From the crystallite correlation length r and the volume average particle size R, parameter k (=r/R) was 0.15.

Comparative Example 68

An electrophotographic photosensitive member of Comparative Example 68 was produced in the same manner as in Comparative Example 62, except that the process for forming the charge generating layer was changed as below.

In a sand mill K-800 (manufactured by Aimex, disk diameter: 70 mm, 5 disks) with cooling water of 18° C., 0.5 part of the titanyl phthalocyanine pigment produced in Synthesis Example 5 and 10 parts of tetrahydrofuran were subjected to milling for 20 hours with 15 parts of glass beads of 0.9 mm in diameter. This operation was performed under the condition where the disks were rotated at 500 rpm. The liquid subjected to the milling operation was passed through a filter (N-NO. 125T, pore size: 133 µm, manufactured by NBC Meshtec) to remove the glass beads. After adding 30 parts of tetrahydrofuran to the resulting liquid, the mixture was filtered, and the filtration product remaining on the filter was sufficiently washed with methanol and water. Then, the washed filtration product was vacuum-dried to yield 0.45 part of a titanyl phthalocyanine pigment. The crystallite correlation length r of the resulting pigment, which was estimated from the peak at 27.2°±0.2° that was the strongest peak in the CuKα X-ray diffraction spectrum, was 31 nm. Subsequently, 10 parts of the titanyl phthalocyanine pigment subjected to the above-described milling operation and 10 parts of a polyvinyl butyral S-LEC BM-1 (produced by Sekisui Chemical) were dispersed in 278 parts of cyclohexanone with 250 parts of glass beads of 0.5 mm in diameter at room temperature (23° C.) for 20 hours by using a ball mill machine. This dispersing operation was performed in a standard bottle PS-6 (manufactured by Hakuyo Glass) under the condition where the bottle was rotated at a speed of 200 rpm. Thus, a coating liquid for forming a charge generating layer was prepared. This coating liquid was applied to the surface of the undercoat layer by dipping. The resulting coating film was heated to dry at 100° C. for 10 minutes to yield a 0.14 µm-thick charge generating layer.

This charge generating layer was removed and powdered. The powder was agitated with an ultrasonic disperser and subjected to powder X-ray diffraction analysis. The crystallite correlation length r of the resulting pigment, which was estimated from the peak at 27.2°±0.2° that was the strongest peak in the CuKα X-ray diffraction spectrum, was 27 nm. This result suggests that the crystallite correlation length of the phthalocyanine pigment in this case was reduced by the above-described dispersing operation.

The volume average particle size R of the titanyl phthalocyanine pigment in the charge generating layer, which was estimated from the particle size distribution obtained using the SEM micrograph, was 201 nm. In the particle size distribution, the volume frequency of the occurrence of particles having a particle size in the range of 60 nm to 200 nm was 68%. From the crystallite correlation length r and the volume average particle size R, parameter k (=r/R) was 0.13.

Comparative Example 69

An electrophotographic photosensitive member of Comparative Example 69 was produced in the same manner as in Example 1, except that the process for producing the hydroxygallium phthalocyanine pigment was changed as below.

Using a ball mill machine, 0.5 part of the hydroxygallium phthalocyanine pigment produced in Synthesis Example 3 and 9.5 parts of acetone were subjected to milling at room temperature (23° C.) for 40 hours. This operation was performed in a standard bottle PS-6 (manufactured by Hakuyo Glass) under the condition where the bottle was rotated at a speed of 120 rpm. In this operation, media, such as glass beads, were not used. After adding 30 parts of acetone to the resulting liquid, the mixture was filtered, and the filtration product remaining on the filter was sufficiently washed with tetrahydrofuran. Then, the resulting filtration product was vacuum-dried to yield 0.43 part of a hydroxygallium phthalocyanine pigment. The crystallite correlation length r of the resulting pigment, which was estimated from the peak at 7.5°±0.2° that was the strongest peak in the CuKα X-ray diffraction spectrum, was 189 nm.

The volume average particle size R of the hydroxygallium phthalocyanine pigment in the charge generating layer, which was estimated from the particle size distribution obtained using the SEM micrograph, was 383 nm. In the particle size distribution, the volume frequency of the occurrence of particles having a particle size in the range of 60 nm to 200 nm was 12%. From the crystallite correlation length r and the volume average particle size R, parameter k (=r/R) was 0.49.

Comparative Example 70

An electrophotographic photosensitive member of Comparative Example 70 was produced in the same manner as in Comparative Example 69, except that the time for the milling operation using the ball mill machine was changed from 40 hours to 300 hours. The crystallite correlation length r of the resulting pigment, which was estimated from the peak at 7.5°±0.2° that was the strongest peak in the CuKα X-ray diffraction spectrum, was 265 nm.

The volume average particle size R of the hydroxygallium phthalocyanine pigment in the charge generating layer, which was estimated from the particle size distribution obtained using the SEM micrograph, was 425 nm. In the particle size distribution, the volume frequency of the occurrence of particles having a particle size in the range of 60 nm to 200 nm was 8%. From the crystallite correlation length r and the volume average particle size R, parameter k (=r/R) was 0.62.

Comparative Example 71

An electrophotographic photosensitive member of Comparative Example 71 was produced in the same manner as in Comparative Example 69, except that the process for producing the hydroxygallium phthalocyanine pigment was changed as below.

In the first milling operation, 0.5 part of the hydroxygallium phthalocyanine pigment produced in Synthesis Example 3 and 9.5 parts of acetone were subjected to milling at room temperature (23° C.) for 40 hours by using a ball mill machine. This operation was performed in a standard bottle PS-6 (manufactured by Hakuyo Glass) under the condition where the bottle was rotated at a speed of 120 rpm. In this operation, media, such as glass beads, were not used. The liquid thus subjected to the milling operation was further subjected to milling (second milling operation) with 15 parts of glass beads of 0.9 mm in diameter with a paint shaker (manufactured by Toyo Seiki) at room temperature (23° C.) for 6 hours. For this operation, the standard bottle PS-6 (manufactured by Hakuyo Glass) was used as it was without removing the contents therefrom. The liquid subjected to such milling operation was passed through a filter (N-NO. 125T, pore size: 133 μm, manufactured by NBC Meshtec) to remove the glass beads. After adding 30 parts of acetone to the resulting liquid, the mixture was filtered, and the filtration product remaining on the filter was sufficiently washed with tetrahydrofuran. Then, the resulting filtration product was vacuum-dried to yield 0.43 part of a hydroxygallium phthalocyanine pigment. The crystallite correlation length r of the resulting pigment, which was estimated from the peak at 7.5°±0.2° that was the strongest peak in the CuKα X-ray diffraction spectrum, was 53 nm.

The volume average particle size R of the hydroxygallium phthalocyanine pigment in the charge generating layer, which was estimated from the particle size distribution obtained using the SEM micrograph, was 325 nm. In the particle size distribution, the volume frequency of the occurrence of particles having a particle size in the range of 60 nm to 200 nm was 31%. From the crystallite correlation length r and the volume average particle size R, parameter k (=r/R) was 0.16.

Comparative Example 72

An electrophotographic photosensitive member of Comparative Example 72 was produced in the same manner as in Comparative Example 69, except that the process for producing the hydroxygallium phthalocyanine pigment was changed as below.

In the first milling operation, 0.5 part of the hydroxygallium phthalocyanine pigment produced in Synthesis Example 3 and 9.5 parts of acetone were subjected to milling with 15 parts of glass beads of 0.9 mm in diameter at room temperature (23° C.) for 24 hours by using a ball mill machine. This operation was performed in a standard bottle PS-6 (manufactured by Hakuyo Glass) under the condition where the bottle was rotated at a speed of 60 rpm. After adding 30 parts of acetone to the resulting liquid, the mixture was filtered, and the filtration product remaining on the filter was sufficiently washed with tetrahydrofuran. Then, the resulting filtration product was vacuum-dried to yield 0.43 part of a hydroxygallium phthalocyanine pigment. Subsequently, 0.5 part of the resulting hydroxygallium phthalocyanine pigment was subjected to milling (second milling operation) with 15 parts of glass beads of 0.9 mm in diameter with a paint shaker (manufactured by Toyo Seiki) at room temperature (23° C.) for 20 minutes. For this operation, the standard bottle PS-6 (manufactured by Hakuyo Glass) was used as the container. Thus, 0.48 part of a hydroxygallium phthalocyanine pigment was produced. The crystallite correlation length r of the resulting pigment, which was estimated from the peak at 7.5°±0.2° that was the strongest of the peaks in the CuKα X-ray diffraction spectrum, was 77 nm.

The volume average particle size R of the hydroxygallium phthalocyanine pigment in the charge generating layer, which was estimated from the particle size distribution obtained using the SEM micrograph, was 102 nm. In the particle size distribution, the volume frequency of the occurrence of particles having a particle size in the range of 60 nm to 200 nm was 44%. From the crystallite correlation length r and the volume average particle size R, parameter k (=r/R) was 0.76.

Comparative Example 73

An electrophotographic photosensitive member of Comparative Example 73 was produced in the same manner as in Comparative Example 72, except that the acetone used in the process for producing the hydroxygallium phthalocyanine pigment was replaced with tetrahydrofuran. The crystallite correlation length r of the resulting pigment, which was estimated from the peak at 7.5°±0.2° that was the strongest of the peaks in the CuKα X-ray diffraction spectrum, was 72 nm.

The volume average particle size R of the hydroxygallium phthalocyanine pigment in the charge generating layer, which was estimated from the particle size distribution obtained using the SEM micrograph, was 105 nm. In the particle size distribution, the volume frequency of the occurrence of particles having a particle size in the range of 60 nm to 200 nm was 45%. From the crystallite correlation length r and the volume average particle size R, parameter k (=r/R) was 0.69.

Comparative Example 74

An electrophotographic photosensitive member of Comparative Example 74 was produced in the same manner as in Example 64, except that the process for producing the chlorogallium phthalocyanine pigment was changed as below.

Using a paint shaker (manufactured by Toyo Seiki), 0.5 part of the chlorogallium phthalocyanine produced in Synthesis Example 1 was subjected to milling with 15 parts of glass beads of 0.9 mm in diameter at room temperature (23° C.) for 20 minutes. For this operation, a standard bottle PS-6 (manufactured by Hakuyo Glass) was used as the container. Thus, 0.47 part of a chlorogallium phthalocyanine pigment was produced. The crystallite correlation length r of the resulting pigment, which was estimated from the peak at 7.4° that was the strongest of the peaks in the CuKα X-ray diffraction spectrum, was 100 nm.

The volume average particle size R of the chlorogallium phthalocyanine pigment in the charge generating layer, which was estimated from the particle size distribution obtained using the SEM micrograph, was 128 nm. In the particle size distribution, the volume frequency of the occurrence of particles having a particle size in the range of 60 nm to 200 nm was 56%. From the crystallite correlation length r and the volume average particle size R, parameter k (=r/R) was 0.78.

Evaluation

For the electrophotographic photosensitive members produced in the above-described Examples and Comparative Examples, it was examined in an environment of normal temperature and normal humidity (23° C., 50% RH) and an environment of low temperature and low humidity (15° C., 10% RH) whether ghosting was reduced.

In this examination, a laser beam printer Color Laser Jet CP3525dn manufactured by Hewlett-Packard, modified as below, was used as the testing electrophotographic apparatus. More specifically, the printer was modified so that it could be operated without lighting the preexposure light and in a state where the charging conditions and the amount of laser exposure could be varied. Also, the cyan process cartridge of the laser beam printer in which the electrophotographic photosensitive member was installed was attached to the station of the cyan process cyan. Furthermore, the printer was modified so that it was able to be operated without other process cartridges (for magenta, yellow, and black).

For outputting images, only the cyan process cartridge was mounted to the laser beam printer, and cyan single-color images were formed.

The surface potential of the electrophotographic photosensitive member was set so that the initial potential could be −650 V at a dark portion and −105 V at a light portion.

For measuring the surface potential of the electrophotographic photosensitive member, a potential probe Model 6000B-8 (manufactured by Trek Japan) was put at the developing position of the process cartridge, and the surface potential at the longitudinal center of the electrophotographic photosensitive member was measured with a surface electrometer Model 344 (manufactured by Trek Japan).

First, ghosting in the normal-temperature normal-humidity environment was examined. Then, immediately after a durability test of feeding 1,000 sheets in the same environment, ghosting was examined.

Subsequently, after the electrophotographic photosensitive member and the testing electrophotographic apparatus were allowed to stand in a low-temperature low-humidity environment (15° C., 10% RH) for three days, ghosting was examined. Then, immediately after a durability test of feeding 1,000 sheets in the same environment, ghosting was examined.

Figure 5:
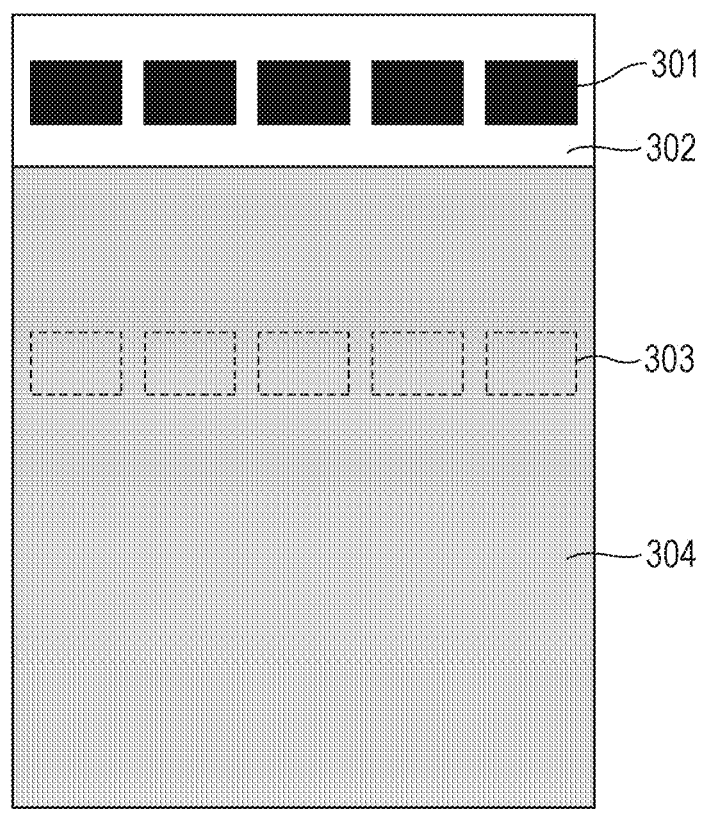
FIG. 5 is an illustrative representation of a pattern used for examining ghosting.

For the durability test, cyan single-color images of a letter E pattern were formed on A4 plain paper sheets at a print coverage of 1%. For examining ghosting, as shown in FIG. 5, a pattern of solid rectangles 301 was formed in a white solid region 302 at the head of the sheet, and then, a halftone dot pattern 304 like chess knight (Shogi keima) movement was formed. First, after a white solid pattern was formed on the first sheet, the ghosting examination pattern was continuously formed on five sheets. Subsequently, after a solid image pattern was formed on the subsequent sheet, the ghosting examination pattern was formed again on 5 sheets. Thus, 10 sheets of the ghosting examination pattern in total were evaluated.

For this evaluation, the difference in density between the halftone chess knight movement pattern and the ghosting portion 303 (where ghosting could occur) was measured with a spectroscopic densitometer X-Rite 504/508 (manufactured by X-Rite). For each sheet of the ghosting examination pattern, 10 points were measured, and the results were averaged. After all of the 10 sheets of the ghosting examination pattern were measured, the average of the 10 sheets was calculated. The average was shown in the Tables as "density difference". The smaller the density difference, the more effectively ghosting was reduced. The "Initial" in the Tables represents the density difference before the durability test performed by feeding 1,000 sheets of paper in the normal-temperature normal-humidity environment or the low-temperature low-humidity environment, and the "After durability test" represents the density difference after the 1,000-sheet durability test in the normal-temperature normal-humidity environment or the low-temperature low-humidity environment.

In the Tables, "HOGaPc" represents a hydroxygallium phthalocyanine pigment; "ClGaPc" represents a chlorogallium phthalocyanine pigment; and "TiOPc" represents a titanyl phthalocyanine pigment.

TABLE 1

Physical Properties and Test Results of Phthalocyanine Pigments

| Example No. | Pigment | Crystallite correlation length r (nm) | Crystalline particle size R (nm) | k = r/R | Volume frequency v (%) of 60-200 nm particles | Amide compound (A1) content (mass %) | Density difference |||| 
|---|---|---|---|---|---|---|---|---|---|---|
| | | | | | | | Normal temperature normal humidity || Low temperature low humidity ||
| | | | | | | | Initial | After durability test | Initial | After durability test |
| Example 1 | HOGaPc | 31 | 125 | 0.25 | 88 | 2.6 | 0.023 | 0.025 | 0.027 | 0.027 |
| Example 2 | HOGaPc | 31 | 118 | 0.26 | 89 | 2.4 | 0.022 | 0.023 | 0.025 | 0.026 |
| Example 3 | HOGaPc | 34 | 111 | 0.30 | 90 | 2.2 | 0.019 | 0.021 | 0.023 | 0.024 |
| Example 4 | HOGaPc | 34 | 105 | 0.32 | 91 | 2.0 | 0.018 | 0.020 | 0.022 | 0.024 |
| Example 5 | HOGaPc | 36 | 102 | 0.35 | 92 | 1.9 | 0.018 | 0.021 | 0.022 | 0.023 |
| Example 6 | HOGaPc | 27 | 148 | 0.18 | 77 | 3.2 | 0.027 | 0.026 | 0.031 | 0.030 |
| Example 7 | HOGaPc | 27 | 145 | 0.19 | 79 | 3.1 | 0.027 | 0.026 | 0.031 | 0.030 |
| Example 8 | HOGaPc | 29 | 138 | 0.21 | 83 | 2.7 | 0.025 | 0.025 | 0.028 | 0.028 |
| Example 9 | HOGaPc | 31 | 133 | 0.23 | 85 | 2.4 | 0.023 | 0.025 | 0.026 | 0.027 |
| Example 10 | HOGaPc | 31 | 121 | 0.26 | 88 | 2.3 | 0.023 | 0.024 | 0.026 | 0.027 |
| Example 11 | HOGaPc | 34 | 115 | 0.29 | 89 | 2.1 | 0.023 | 0.024 | 0.026 | 0.027 |
| Example 12 | HOGaPc | 34 | 110 | 0.31 | 90 | 2.0 | 0.022 | 0.023 | 0.025 | 0.026 |
| Example 13 | HOGaPc | 25 | 143 | 0.17 | 77 | 3.2 | 0.027 | 0.026 | 0.030 | 0.030 |
| Example 14 | HOGaPc | 27 | 141 | 0.19 | 81 | 2.8 | 0.025 | 0.025 | 0.028 | 0.028 |
| Example 15 | HOGaPc | 27 | 140 | 0.19 | 83 | 2.7 | 0.024 | 0.025 | 0.028 | 0.028 |
| Example 16 | HOGaPc | 29 | 139 | 0.21 | 85 | 2.4 | 0.023 | 0.024 | 0.026 | 0.026 |
| Example 17 | HOGaPc | 31 | 137 | 0.23 | 87 | 2.2 | 0.023 | 0.024 | 0.026 | 0.026 |
| Example 18 | HOGaPc | 31 | 135 | 0.23 | 88 | 2.0 | 0.023 | 0.024 | 0.026 | 0.027 |
| Example 19 | HOGaPc | 27 | 121 | 0.22 | 89 | 2.3 | 0.024 | 0.025 | 0.027 | 0.028 |
| Example 20 | HOGaPc | 29 | 110 | 0.26 | 90 | 1.9 | 0.021 | 0.023 | 0.025 | 0.025 |
| Example 21 | HOGaPc | 29 | 93 | 0.31 | 91 | 1.5 | 0.018 | 0.020 | 0.022 | 0.023 |
| Example 22 | HOGaPc | 31 | 83 | 0.38 | 93 | 0.7 | 0.018 | 0.021 | 0.022 | 0.024 |
| Example 23 | HOGaPc | 34 | 81 | 0.41 | 95 | 0.6 | 0.019 | 0.020 | 0.022 | 0.023 |
| Example 24 | HOGaPc | 27 | 131 | 0.21 | 86 | 2.1 | 0.025 | 0.025 | 0.028 | 0.028 |
| Example 25 | HOGaPc | 29 | 125 | 0.23 | 87 | 2.0 | 0.023 | 0.024 | 0.026 | 0.027 |
| Example 26 | HOGaPc | 31 | 115 | 0.27 | 88 | 1.8 | 0.022 | 0.024 | 0.026 | 0.027 |
| Example 27 | HOGaPc | 31 | 111 | 0.28 | 90 | 1.5 | 0.021 | 0.023 | 0.025 | 0.025 |
| Example 28 | HOGaPc | 34 | 110 | 0.31 | 93 | 1.3 | 0.020 | 0.022 | 0.024 | 0.025 |
| Example 29 | HOGaPc | 25 | 124 | 0.20 | 85 | 2.0 | 0.025 | 0.024 | 0.028 | 0.029 |
| Example 30 | HOGaPc | 27 | 115 | 0.23 | 88 | 1.7 | 0.023 | 0.024 | 0.026 | 0.026 |
| Example 31 | HOGaPc | 29 | 95 | 0.31 | 91 | 1.3 | 0.019 | 0.021 | 0.023 | 0.024 |
| Example 32 | HOGaPc | 31 | 87 | 0.36 | 92 | 0.8 | 0.019 | 0.021 | 0.023 | 0.023 |
| Example 33 | HOGaPc | 34 | 84 | 0.40 | 94 | 0.6 | 0.019 | 0.020 | 0.023 | 0.024 |
| Example 34 | HOGaPc | 29 | 132 | 0.22 | 77 | 3.2 | 0.026 | 0.025 | 0.029 | 0.030 |
| Example 35 | HOGaPc | 31 | 128 | 0.24 | 79 | 3.1 | 0.025 | 0.025 | 0.029 | 0.028 |
| Example 36 | HOGaPc | 34 | 126 | 0.27 | 81 | 2.8 | 0.025 | 0.024 | 0.028 | 0.027 |

TABLE 2

Physical Properties and Test Results of Phthalocyanine Pigments

| | | Crystallite | | | Volume | Amide compound | Density difference | | | |
|---|---|---|---|---|---|---|---|---|---|---|
| | | | | | | | Normal temperature normal humidity | | Low temperature low humidity | |
| Example No. | Pigment | correlation length r (nm) | Crystalline particle size R (nm) | k = r/R | frequency v (%) of 60-200 nm particles | (A1) content (mass %) | Initial | After durability test | Initial | After durability test |
| Example 37 | HOGaPc | 34 | 125 | 0.27 | 82 | 2.7 | 0.023 | 0.025 | 0.027 | 0.026 |
| Example 38 | HOGaPc | 34 | 122 | 0.28 | 85 | 2.5 | 0.022 | 0.024 | 0.025 | 0.026 |
| Example 39 | HOGaPc | 27 | 143 | 0.19 | 74 | 3.3 | 0.027 | 0.026 | 0.030 | 0.030 |
| Example 40 | HOGaPc | 27 | 139 | 0.19 | 76 | 3.1 | 0.026 | 0.025 | 0.030 | 0.030 |
| Example 41 | HOGaPc | 29 | 137 | 0.21 | 82 | 2.9 | 0.025 | 0.024 | 0.029 | 0.028 |
| Example 42 | HOGaPc | 29 | 134 | 0.22 | 83 | 2.7 | 0.025 | 0.024 | 0.028 | 0.029 |
| Example 43 | HOGaPc | 27 | 122 | 0.22 | 86 | 1.5 | 0.023 | 0.025 | 0.026 | 0.028 |
| Example 44 | HOGaPc | 27 | 143 | 0.19 | 91 | 0.9 | 0.022 | 0.025 | 0.027 | 0.027 |
| Example 45 | HOGaPc | 31 | 158 | 0.19 | 77 | 0 | 0.028 | 0.028 | 0.032 | 0.032 |
| Example 46 | HOGaPc | 31 | 155 | 0.20 | 78 | 0 | 0.028 | 0.028 | 0.033 | 0.032 |
| Example 47 | HOGaPc | 34 | 152 | 0.22 | 80 | 0 | 0.026 | 0.026 | 0.031 | 0.031 |
| Example 48 | HOGaPc | 36 | 148 | 0.24 | 81 | 0 | 0.026 | 0.026 | 0.030 | 0.031 |
| Example 49 | HOGaPc | 36 | 147 | 0.25 | 81 | 0 | 0.026 | 0.026 | 0.030 | 0.030 |
| Example 50 | HOGaPc | 31 | 148 | 0.21 | 78 | 0 | 0.028 | 0.027 | 0.032 | 0.032 |
| Example 51 | HOGaPc | 34 | 147 | 0.23 | 79 | 0 | 0.028 | 0.027 | 0.032 | 0.032 |
| Example 52 | HOGaPc | 36 | 143 | 0.25 | 81 | 0 | 0.026 | 0.027 | 0.030 | 0.030 |
| Example 53 | HOGaPc | 36 | 140 | 0.26 | 81 | 0 | 0.026 | 0.026 | 0.030 | 0.031 |
| Example 54 | HOGaPc | 39 | 136 | 0.28 | 82 | 0 | 0.026 | 0.026 | 0.030 | 0.030 |
| Example 55 | HOGaPc | 32 | 168 | 0.19 | 73 | 0 | 0.028 | 0.028 | 0.033 | 0.032 |
| Example 56 | HOGaPc | 31 | 166 | 0.19 | 75 | 0 | 0.029 | 0.028 | 0.032 | 0.032 |
| Example 57 | HOGaPc | 34 | 164 | 0.20 | 78 | 0 | 0.028 | 0.028 | 0.033 | 0.032 |
| Example 58 | HOGaPc | 36 | 163 | 0.22 | 79 | 0 | 0.028 | 0.027 | 0.032 | 0.031 |
| Example 59 | HOGaPc | 31 | 162 | 0.19 | 72 | 0 | 0.028 | 0.028 | 0.032 | 0.032 |
| Example 60 | HOGaPc | 31 | 161 | 0.19 | 74 | 0 | 0.028 | 0.027 | 0.032 | 0.033 |
| Example 61 | HOGaPc | 34 | 158 | 0.21 | 76 | 0 | 0.028 | 0.027 | 0.032 | 0.032 |
| Example 62 | HOGaPc | 34 | 155 | 0.22 | 79 | 0 | 0.028 | 0.027 | 0.032 | 0.032 |
| Example 63 | HOGaPc | 36 | 151 | 0.24 | 81 | 0 | 0.026 | 0.027 | 0.031 | 0.031 |
| Example 64 | ClGaPc | 29 | 132 | 0.22 | 79 | 0 | 0.028 | 0.033 | 0.034 | 0.044 |
| Example 65 | ClGapc | 31 | 128 | 0.24 | 81 | 0 | 0.026 | 0.032 | 0.032 | 0.042 |
| Example 66 | ClGaPc | 34 | 123 | 0.27 | 82 | 0 | 0.025 | 0.033 | 0.031 | 0.042 |
| Example 67 | ClGaPc | 34 | 120 | 0.28 | 84 | 0 | 0.024 | 0.031 | 0.031 | 0.042 |
| Example 68 | ClGaPc | 31 | 127 | 0.25 | 81 | 0 | 0.025 | 0.032 | 0.032 | 0.042 |
| Example 69 | ClGaPc | 34 | 124 | 0.27 | 83 | 0 | 0.025 | 0.032 | 0.031 | 0.042 |
| Example 70 | ClGapc | 36 | 120 | 0.30 | 86 | 0 | 0.024 | 0.031 | 0.029 | 0.041 |

TABLE 2-continued

Physical Properties and Test Results of Phthalocyanine Pigments

|  |  | Crystallite |  |  | Volume | Amide compound | Density difference |  |  |  |
|---|---|---|---|---|---|---|---|---|---|---|
|  |  |  |  |  |  |  | Normal temperature normal humidity |  | Low temperature low humidity |  |
| Example No. | Pigment | correlation length r (nm) | Crystalline particle size R (nm) | k = r/R | frequency v (%) of 60-200 nm particles | (A1) content (mass %) | Initial | After durability test | Initial | After durability test |
| Example 71 | ClGaPc | 36 | 118 | 0.31 | 88 | 0 | 0.024 | 0.031 | 0.028 | 0.040 |
| Example 72 | ClGaPc | 27 | 135 | 0.20 | 78 | 0 | 0.028 | 0.033 | 0.034 | 0.043 |

TABLE 3

Physical Properties and Test Results of Phthalocyanine Pigments

|  |  | Crystallite |  |  | Volume | Amide compound (A1) content (mass %) | Density difference |  |  |  |
|---|---|---|---|---|---|---|---|---|---|---|
|  |  |  |  |  |  |  | Normal temperature normal humidity |  | Low temperature low humidity |  |
| Example No. | Pigment | correlation length r (nm) | Crystalline particle size R (nm) | k = r/R | frequency v (%) of 60-200 nm particles |  | Initial | After durability test | Initial | After durability test |
| Example 73 | ClGaPc | 29 | 133 | 0.22 | 80 | 0 | 0.026 | 0.033 | 0.032 | 0.043 |
| Example 74 | ClGaPc | 29 | 130 | 0.22 | 82 | 0 | 0.026 | 0.033 | 0.032 | 0.043 |
| Example 75 | ClGaPc | 29 | 134 | 0.22 | 81 | 0 | 0.026 | 0.033 | 0.032 | 0.043 |
| Example 76 | ClGaPc | 31 | 127 | 0.25 | 82 | 0 | 0.025 | 0.032 | 0.031 | 0.042 |
| Example 77 | ClGaPc | 27 | 144 | 0.19 | 74 | 0 | 0.028 | 0.034 | 0.034 | 0.044 |
| Example 78 | ClGaPc | 27 | 141 | 0.19 | 77 | 0 | 0.028 | 0.034 | 0.034 | 0.044 |
| Example 79 | ClGaPc | 29 | 139 | 0.21 | 79 | 0 | 0.027 | 0.034 | 0.033 | 0.043 |
| Example 80 | ClGaPc | 31 | 135 | 0.23 | 82 | 0 | 0.025 | 0.033 | 0.031 | 0.042 |
| Example 81 | ClGaPc | 29 | 140 | 0.21 | 78 | 0 | 0.027 | 0.033 | 0.034 | 0.044 |
| Example 82 | ClGaPc | 29 | 137 | 0.21 | 79 | 0 | 0.027 | 0.033 | 0.033 | 0.043 |
| Example 83 | ClGaPc | 31 | 135 | 0.23 | 81 | 0 | 0.025 | 0.032 | 0.031 | 0.041 |
| Example 84 | ClGaPc | 34 | 131 | 0.26 | 83 | 0 | 0.025 | 0.031 | 0.031 | 0.040 |
| Example 85 | ClGaPc | 27 | 142 | 0.19 | 77 | 0 | 0.027 | 0.033 | 0.033 | 0.044 |
| Example 86 | ClGaPc | 29 | 138 | 0.21 | 79 | 0 | 0.026 | 0.033 | 0.032 | 0.043 |
| Example 87 | ClGaPc | 31 | 135 | 0.23 | 81 | 0 | 0.024 | 0.032 | 0.030 | 0.041 |
| Example 88 | ClGaPc | 31 | 131 | 0.24 | 84 | 0 | 0.025 | 0.032 | 0.030 | 0.040 |
| Example 89 | ClGaPc | 29 | 138 | 0.21 | 82 | 0 | 0.025 | 0.032 | 0.031 | 0.042 |
| Example 90 | ClGaPc | 31 | 133 | 0.23 | 84 | 0 | 0.025 | 0.031 | 0.030 | 0.041 |
| Example 91 | ClGaPc | 34 | 130 | 0.26 | 85 | 0 | 0.024 | 0.030 | 0.029 | 0.040 |
| Example 92 | ClGaPc | 34 | 122 | 0.28 | 86 | 0 | 0.023 | 0.030 | 0.028 | 0.040 |
| Example 93 | TiOPc | 31 | 168 | 0.19 | 74 | 0 | 0.029 | 0.034 | 0.034 | 0.044 |
| Example 94 | TiOPc | 34 | 164 | 0.20 | 79 | 0 | 0.027 | 0.033 | 0.033 | 0.043 |
| Example 95 | TiOPc | 36 | 158 | 0.23 | 83 | 0 | 0.026 | 0.032 | 0.032 | 0.042 |

TABLE 3-continued

Physical Properties and Test Results of Phthalocyanine Pigments

| Example No. | Pigment | Crystallite correlation length r (nm) | Crystalline particle size R (nm) | k = r/R | Volume frequency v (%) of 60-200 nm particles | Amide compound (A1) content (mass %) | Density difference Normal temperature normal humidity Initial | Density difference Normal temperature normal humidity After durability test | Density difference Low temperature low humidity Initial | Density difference Low temperature low humidity After durability test |
|---|---|---|---|---|---|---|---|---|---|---|
| Example 96 | TiOPc | 36 | 154 | 0.23 | 85 | 0 | 0.025 | 0.031 | 0.030 | 0.041 |
| Example 97 | TiOPc | 31 | 160 | 0.20 | 76 | 0 | 0.028 | 0.034 | 0.033 | 0.044 |
| Example 98 | TiOPc | 34 | 150 | 0.22 | 81 | 0 | 0.024 | 0.032 | 0.031 | 0.041 |
| Example 99 | TiOPc | 36 | 146 | 0.25 | 85 | 0 | 0.024 | 0.030 | 0.029 | 0.040 |
| Example 100 | TiOPc | 39 | 141 | 0.27 | 88 | 0 | 0.023 | 0.030 | 0.029 | 0.040 |
| Example 101 | TiOPc | 31 | 165 | 0.19 | 73 | 0 | 0.028 | 0.034 | 0.034 | 0.045 |
| Example 102 | TiOPc | 34 | 163 | 0.21 | 78 | 0 | 0.028 | 0.034 | 0.034 | 0.044 |
| Example 103 | TiOPc | 34 | 156 | 0.22 | 83 | 0 | 0.026 | 0.033 | 0.032 | 0.043 |
| Example 104 | TiOPc | 36 | 154 | 0.23 | 84 | 0 | 0.026 | 0.033 | 0.032 | 0.042 |
| Example 105 | TiOPc | 34 | 158 | 0.21 | 75 | 0 | 0.028 | 0.034 | 0.034 | 0.043 |
| Example 106 | TiOPc | 36 | 151 | 0.24 | 81 | 0 | 0.025 | 0.032 | 0.031 | 0.042 |
| Example 107 | TiOPc | 36 | 148 | 0.24 | 83 | 0 | 0.025 | 0.031 | 0.030 | 0.041 |
| Example 108 | TiOPc | 39 | 144 | 0.27 | 84 | 0 | 0.024 | 0.031 | 0.029 | 0.040 |

TABLE 4

Physical Properties and Test Results of Phthalocyanine Pigments

| Example No. | Pigment | Crystallite correlation length r (nm) | Crystalline particle size R (nm) | k = r/R | Volume frequency v (%) of 60-200 nm particles | Amide compound (A1) content (mass %) | Density difference Normal temperature normal humidity Initial | Density difference Normal temperature normal humidity After durability test | Density difference Low temperature low humidity Initial | Density difference Low temperature low humidity After durability test |
|---|---|---|---|---|---|---|---|---|---|---|
| Comparative Example 1 | HOGaPc | 23 | 241 | 0.10 | 41 | 3.1 | 0.041 | 0.064 | 0.050 | 0.109 |
| Comparative Example 2 | HOGaPc | 25 | 242 | 0.10 | 38 | 3.0 | 0.040 | 0.064 | 0.048 | 0.103 |
| Comparative Example 3 | HOGaPc | 25 | 244 | 0.10 | 37 | 2.8 | 0.039 | 0.061 | 0.047 | 0.103 |
| Comparative Example 4 | HOGaPc | 27 | 245 | 0.11 | 35 | 2.8 | 0.038 | 0.064 | 0.049 | 0.103 |
| Comparative Example 5 | HOGaPc | 27 | 247 | 0.11 | 34 | 2.7 | 0.038 | 0.063 | 0.048 | 0.103 |
| Comparative Example 6 | HOGaPc | 30 | 248 | 0.12 | 33 | 2.7 | 0.038 | 0.060 | 0.048 | 0.100 |
| Comparative Example 7 | HOGaPc | 29 | 282 | 0.10 | 24 | 2.6 | 0.037 | 0.061 | 0.047 | 0.099 |
| Comparative Example 8 | HOGaPc | 29 | 353 | 0.08 | 18 | 2.5 | 0.036 | 0.061 | 0.048 | 0.099 |
| Comparative Example 9 | HOGaPc | 31 | 382 | 0.08 | 14 | 2.5 | 0.038 | 0.062 | 0.048 | 0.098 |
| Comparative Example 10 | HOGaPc | 34 | 403 | 0.08 | 10 | 2.4 | Not charged | | | |
| Comparative Example 11 | HOGaPc | 15 | 115 | 0.13 | 68 | 1.9 | 0.039 | 0.063 | 0.051 | 0.108 |
| Comparative Example 12 | HOGaPc | 15 | 109 | 0.13 | 63 | 1.4 | 0.044 | 0.065 | 0.051 | 0.113 |

TABLE 4-continued

Physical Properties and Test Results of Phthalocyanine Pigments

| | | | | | | | Density difference | | | |
|---|---|---|---|---|---|---|---|---|---|---|
| | | | | | | | Normal temperature normal humidity | | Low temperature low humidity | |
| | | Crystallite correlation length r (nm) | Crystalline particle size R (nm) | k = r/R | Volume frequency v (%) of 60-200 nm particles | Amide compound (A1) content (mass %) | Initial | After durability test | Initial | After durability test |
| Example No. | Pigment | | | | | | | | | |
| Comparative Example 13 | HOGaPc | 23 | 163 | 0.14 | 67 | 3.1 | 0.038 | 0.063 | 0.047 | 0.103 |
| Comparative Example 14 | HOGaPc | 23 | 164 | 0.14 | 75 | 2.7 | 0.038 | 0.060 | 0.047 | 0.100 |
| Comparative Example 15 | HOGaPc | 24 | 159 | 0.15 | 81 | 2.6 | 0.038 | 0.060 | 0.048 | 0.100 |
| Comparative Example 16 | HOGaPc | 24 | 153 | 0.16 | 86 | 2.1 | 0.037 | 0.061 | 0.047 | 0.097 |
| Comparative Example 17 | HOGaPc | 28 | 181 | 0.15 | 65 | 2.7 | 0.036 | 0.061 | 0.045 | 0.097 |
| Comparative Example 18 | HOGaPc | 27 | 174 | 0.15 | 74 | 0.8 | 0.038 | 0.061 | 0.047 | 0.099 |
| Comparative Example 19 | HOGaPc | 23 | 214 | 0.11 | 43 | 2.4 | 0.045 | 0.065 | 0.052 | 0.114 |
| Comparative Example 20 | HOGaPc | 25 | 205 | 0.12 | 49 | 2.9 | 0.038 | 0.063 | 0.049 | 0.101 |
| Comparative Example 21 | HOGaPc | 25 | 201 | 0.12 | 53 | 2.8 | 0.039 | 0.062 | 0.048 | 0.103 |
| Comparative Example 22 | HOGaPc | 25 | 220 | 0.11 | 44 | 2.7 | 0.045 | 0.067 | 0.052 | 0.118 |
| Comparative Example 23 | HOGaPc | 25 | 210 | 0.12 | 50 | 2.5 | 0.037 | 0.060 | 0.046 | 0.100 |
| Comparative Example 24 | HOGaPc | 25 | 202 | 0.12 | 51 | 2.3 | 0.039 | 0.062 | 0.048 | 0.103 |
| Comparative Example 25 | HOGaPc | 26 | 211 | 0.12 | 71 | 2.2 | 0.038 | 0.062 | 0.048 | 0.101 |
| Comparative Example 26 | HOGaPc | 25 | 171 | 0.15 | 79 | 2.0 | 0.036 | 0.061 | 0.048 | 0.099 |
| Comparative Example 27 | HOGaPc | 24 | 154 | 0.16 | 76 | 0 | 0.036 | 0.060 | 0.046 | 0.099 |
| Comparative Example 28 | HOGaPc | 13 | 98 | 0.13 | 83 | 0 | 0.038 | 0.062 | 0.046 | 0.099 |
| Comparative Example 29 | HOGaPc | 13 | 101 | 0.13 | 81 | 0 | 0.037 | 0.060 | 0.047 | 0.099 |
| Comparative Example 30 | HOGaPc | 12 | 91 | 0.13 | 86 | 0 | 0.037 | 0.062 | 0.048 | 0.099 |
| Comparative Example 31 | HOGaPc | 16 | 121 | 0.13 | 84 | 0 | 0.036 | 0.060 | 0.048 | 0.099 |
| Comparative Example 32 | HOGaPc | 16 | 125 | 0.13 | 84 | 0 | 0.038 | 0.062 | 0.047 | 0.101 |
| Comparative Example 33 | HOGaPc | 13 | 172 | 0.08 | 78 | 0 | 0.038 | 0.063 | 0.048 | 0.104 |
| Comparative Example 34 | HOGaPc | 13 | 115 | 0.11 | 81 | 0 | 0.039 | 0.064 | 0.051 | 0.107 |
| Comparative Example 35 | HOGaPc | 13 | 118 | 0.11 | 80 | 0 | 0.040 | 0.065 | 0.049 | 0.105 |
| Comparative Example 36 | HOGaPc | 25 | 158 | 0.16 | 77 | 0 | 0.036 | 0.060 | 0.047 | 0.100 |
| Comparative Example 37 | HOGaPc | 18 | 123 | 0.14 | 71 | 0 | 0.038 | 0.061 | 0.048 | 0.104 |

TABLE 5

Physical Properties and Test Results of Phthalocyanine Pigments

| Example No. | Pigment | Crystallite correlation length r (nm) | Crystalline particle size R (nm) | k = r/R | Volume frequency v (%) of 60-200 nm particles | Amide compound (A1) content (mass %) | Density difference Normal temperature normal humidity Initial | Density difference Normal temperature normal humidity After durability test | Density difference Low temperature low humidity Initial | Density difference Low temperature low humidity After durability test |
|---|---|---|---|---|---|---|---|---|---|---|
| Comparative Example 38 | HOGaPc | 23 | 183 | 0.13 | 63 | 0 | 0.038 | 0.061 | 0.049 | 0.103 |
| Comparative Example 39 | HOGaPc | 23 | 178 | 0.13 | 66 | 0 | 0.038 | 0.061 | 0.046 | 0.101 |
| Comparative Example 40 | HOGaPc | 23 | 176 | 0.13 | 67 | 0 | 0.038 | 0.063 | 0.049 | 0.101 |
| Comparative Example 41 | HOGaPc | 21 | 248 | 0.09 | 54 | 0 | 0.043 | 0.066 | 0.051 | 0.115 |
| Comparative Example 42 | HOGaPc | 21 | 194 | 0.11 | 59 | 0 | 0.042 | 0.066 | 0.051 | 0.112 |
| Comparative Example 43 | HOGaPc | 17 | 142 | 0.12 | 63 | 0 | 0.044 | 0.065 | 0.052 | 0.113 |
| Comparative Example 44 | HOGaPc | 8 | 112 | 0.07 | 67 | 0 | 0.044 | 0.066 | 0.052 | 0.117 |
| Comparative Example 45 | HOGaPc | 5 | 104 | 0.05 | 70 | 0 | 0.047 | 0.067 | 0.054 | 0.122 |
| Comparative Example 46 | HOGaPc | 20 | 153 | 0.13 | 70 | 0 | 0.044 | 0.065 | 0.053 | 0.118 |
| Comparative Example 47 | HOGaPc | 18 | 131 | 0.14 | 74 | 0 | 0.042 | 0.067 | 0.052 | 0.112 |
| Comparative Example 48 | HOGaPc | 7 | 98 | 0.07 | 82 | 0 | 0.048 | 0.070 | 0.057 | 0.126 |
| Comparative Example 49 | ClGaPc | 16 | 114 | 0.14 | 51 | 0 | 0.044 | 0.068 | 0.052 | 0.122 |
| Comparative Example 50 | ClGaPc | 15 | 105 | 0.14 | 42 | 0 | 0.047 | 0.069 | 0.055 | 0.124 |
| Comparative Example 51 | ClGaPc | 23 | 184 | 0.12 | 64 | 0 | 0.047 | 0.069 | 0.056 | 0.129 |
| Comparative Example 52 | ClGaPc | 13 | 103 | 0.13 | 74 | 0 | 0.040 | 0.065 | 0.048 | 0.111 |
| Comparative Example 53 | ClGaPc | 13 | 138 | 0.10 | 77 | 0 | 0.040 | 0.066 | 0.049 | 0.110 |
| Comparative Example 54 | ClGaPc | 12 | 153 | 0.08 | 68 | 0 | 0.044 | 0.069 | 0.051 | 0.122 |
| Comparative Example 55 | ClGaPc | 12 | 88 | 0.13 | 63 | 0 | 0.037 | 0.064 | 0.048 | 0.108 |
| Comparative Example 56 | ClGaPc | 17 | 132 | 0.13 | 63 | 0 | 0.040 | 0.065 | 0.049 | 0.111 |
| Comparative Example 57 | ClGaPc | 18 | 153 | 0.12 | 63 | 0 | 0.040 | 0.066 | 0.050 | 0.113 |
| Comparative Example 58 | ClGaPc | 18 | 128 | 0.14 | 63 | 0 | 0.039 | 0.064 | 0.049 | 0.111 |
| Comparative Example 59 | TiOPc | 23 | 248 | 0.09 | 64 | 0 | 0.048 | 0.070 | 0.057 | 0.133 |
| Comparative Example 60 | TiOPc | 27 | 238 | 0.11 | 69 | 0 | 0.043 | 0.067 | 0.053 | 0.121 |
| Comparative Example 61 | TiOPc | 29 | 230 | 0.13 | 71 | 0 | 0.041 | 0.064 | 0.051 | 0.114 |
| Comparative Example 62 | TiOPc | 31 | 221 | 0.14 | 74 | 0 | 0.039 | 0.063 | 0.048 | 0.108 |
| Comparative Example 63 | TiOPc | 34 | 210 | 0.16 | 75 | 0 | 0.038 | 0.064 | 0.049 | 0.109 |
| Comparative Example 64 | TiOPc | 34 | 205 | 0.16 | 77 | 0 | 0.039 | 0.062 | 0.049 | 0.107 |
| Comparative Example 65 | TiOPc | 33 | 201 | 0.16 | 78 | 0 | 0.038 | 0.064 | 0.047 | 0.107 |
| Comparative Example 66 | TiOPc | 27 | 181 | 0.15 | 66 | 0 | 0.038 | 0.064 | 0.049 | 0.109 |
| Comparative Example 67 | TiOPc | 23 | 155 | 0.15 | 81 | 0 | 0.038 | 0.063 | 0.048 | 0.108 |
| Comparative Example 68 | TiOPc | 27 | 201 | 0.13 | 68 | 0 | 0.037 | 0.063 | 0.050 | 0.110 |
| Comparative Example 69 | HOGaPc | 189 | 383 | 0.49 | 12 | 0 | 0.052 | 0.073 | 0.059 | 0.130 |
| Comparative Example 70 | HOGaPc | 265 | 425 | 0.62 | 8 | 0 | Not charged | | | |
| Comparative Example 71 | HOGaPc | 53 | 325 | 0.16 | 31 | 0 | 0.043 | 0.065 | 0.052 | 0.113 |

TABLE 5-continued

Physical Properties and Test Results of Phthalocyanine Pigments

| Example No. | Pigment | Crystallite correlation length r (nm) | Crystalline particle size R (nm) | k = r/R | Volume frequency v (%) of 60-200 nm particles | Amide compound (A1) content (mass %) | Density difference Normal temperature normal humidity Initial | Density difference Normal temperature normal humidity After durability test | Density difference Low temperature low humidity Initial | Density difference Low temperature low humidity After durability test |
|---|---|---|---|---|---|---|---|---|---|---|
| Comparative Example 72 | HOGaPc | 77 | 102 | 0.76 | 44 | 0 | Not charged | | | |
| Comparative Example 73 | HOGaPc | 72 | 105 | 0.69 | 45 | 0 | Not charged | | | |
| Comparative Example 74 | ClGaPc(G) | 100 | 128 | 0.78 | 56 | 0 | Not charged | | | |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-212042, filed Oct. 28, 2015, which is hereby incorporated by reference herein in its entirety.

What is claimed is:

1. An electrophotographic photosensitive member comprising:
a support member; and
a photosensitive layer containing a phthalocyanine pigment comprising crystalline particles having a crystallite correlation length r and a particle size R of 400 nm or less,
wherein a parameter k defined by r/R is in the range of 0.17 to 0.42, and
wherein the phthalocyanine pigment is a hydroxygallium phthalocyanine pigment comprising the crystalline particles, and the crystalline particles have a crystal form exhibiting peaks at Bragg angles 2θ of 7.4°±0.3° and 28.2°±0.3° in a CuKαX-ray diffraction spectrum thereof and contain therein an amide compound represented by formula (A1):

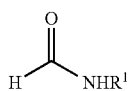

(A1)

wherein $R^1$ represents a group selected from the group consisting of a methyl group, a propyl group, and a vinyl group.

2. The electrophotographic photosensitive member according to claim 1, wherein the crystalline particles have a particle size distribution in which a volume frequency v of occurrence of crystalline particles having a particle size in the range of 60 nm to 200 nm is 80% or more.

3. The electrophotographic photosensitive member according to claim 1, wherein the amide compound content in the crystalline particles is in the range of 0.1% by mass to 1.4% by mass relative to the mass of the crystalline particles.

4. A process cartridge capable of being removably attached to an electrophotographic apparatus, the process cartridge comprising:
an electrophotographic photosensitive member including a support member and a photosensitive layer containing a phthalocyanine pigment; and
at least one device selected from the group consisting of a charging device, a developing device, and a cleaning device, the at least one device being held together with the electrophotographic photosensitive member in one body,
wherein the phthalocyanine pigment comprises crystalline particles having a crystallite correlation length r and a particle size R of 400 nm or less, and a parameter k defined by r/R is in the range of 0.17 to 0.42, and
wherein the phthalocyanine pigment is a hydroxygallium phthalocyanine pigment comprising the crystalline particles, and the crystalline particles have a crystal form exhibiting peaks at Bragg angles 2θ of 7.4°±0.3° and 28.2°±0.3° in a CuKαX-ray diffraction spectrum thereof and contain therein an amide compound represented by formula (A1):

(A1)

wherein $R^1$ represents a group selected from the group consisting of a methyl group, a propyl group, and a vinyl group.

5. An electrophotographic apparatus comprising:
an electrophotographic photosensitive member comprising a support member and a photosensitive layer containing a phthalocyanine pigment;
a charging device;
an exposure device; and
a developing device,
wherein the phthalocyanine pigment comprises crystalline particles having a crystallite correlation length r and a particle size R of 400 nm or less, and a parameter k defined by r/R is in the range of 0.17 to 0.42, and
wherein the phthalocyanine pigment is a hydroxygallium phthalocyanine pigment comprising the crystalline particles, and the crystalline particles have a crystal form exhibiting peaks at Bragg angles 2θ of 7.4°±0.3° and 28.2°±0.3° in a CuKαX-ray diffraction spectrum thereof and contain therein an amide compound represented by formula (A1):

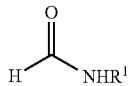

(A1)

wherein $R^1$ represents a group selected from the group consisting of a methyl group, a propyl group, and a vinyl group.

6. A phthalocyanine pigment comprising crystalline particles, the crystalline particles having a crystallite correlation length r and a particle size R of 400 nm or less, wherein a parameter k defined by r/R is in the range of 0.17 to 0.42, wherein the phthalocyanine pigment is a hydroxygallium phthalocyanine pigment comprising the crystalline particles, and the crystalline particles have a crystal form exhibiting peaks at Bragg angles 2θ of 7.4°±0.3° and 28.2°±0.3° in a CuKαX-ray diffraction spectrum thereof and contain therein an amide compound represented by formula (A1):

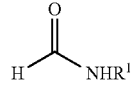

(A1)

wherein $R^1$ represents a group selected from the group consisting of a methyl group, a propyl group, and a vinyl group.

7. The phthalocyanine pigment according to claim 6, wherein the crystalline particles have a particle size distribution in which a volume frequency v of occurrence of crystalline particles having a particle size in the range of 60 nm to 200 nm is 80% or more.

8. The phthalocyanine pigment according to claim 6, wherein the amide compound content in the crystalline particles is in the range of 0.1% by mass to 1.4% by mass relative to the mass of the crystalline particles.

* * * * *